(12) United States Patent
Nonoguchi et al.

(10) Patent No.: US 10,299,461 B2
(45) Date of Patent: *May 28, 2019

(54) WATER ABSORBENT SHEET RETAINING MAT

(75) Inventors: Seiji Nonoguchi, Osaka (JP); Tsuyoshi Nakata, Osaka (JP)

(73) Assignee: EARTH PET CO., LTD., Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 14/375,343

(22) PCT Filed: May 21, 2012

(86) PCT No.: PCT/JP2012/062913
§ 371 (c)(1),
(2), (4) Date: Jul. 29, 2014

(87) PCT Pub. No.: WO2013/114641
PCT Pub. Date: Aug. 8, 2013

(65) Prior Publication Data
US 2015/0007777 A1     Jan. 8, 2015

(30) Foreign Application Priority Data

Jan. 30, 2012   (WO) .................. PCT/JP2012/052036

(51) Int. Cl.
*A01K 1/015*   (2006.01)
*A01K 1/01*    (2006.01)

(52) U.S. Cl.
CPC .......... *A01K 1/0157* (2013.01); *A01K 1/0107* (2013.01)

(58) Field of Classification Search
CPC .... A01K 1/0157; A01K 1/0107; A01K 1/011; A01K 1/015; A01K 1/035; A01K 1/0353

(Continued)

(56) References Cited

U.S. PATENT DOCUMENTS 2,052,973 A * 9/1936 Furtzaig ............. A41D 13/0556
                                                        182/230
2,492,890 A * 12/1949 Sameth .................. A41D 27/26
                                                          2/268

(Continued)

FOREIGN PATENT DOCUMENTS

CN       1274570       11/2000
CN       2927672       8/2007

(Continued)

OTHER PUBLICATIONS

China Office action, dated Mar. 19, 2015.
EPO Search Report dated Jun. 2, 2015 in European Patent Application No. 12867329.0.

*Primary Examiner* — Tien Q Dinh
*Assistant Examiner* — Ebony E Evans
(74) *Attorney, Agent, or Firm* — Greenblum & Bernstein, P.L.C.

(57) ABSTRACT

Provided is a water absorbent sheet retaining mat which can retain a water absorbent sheet easily and surely. A water absorbent sheet retaining mat for retaining a water absorbent sheet having a first polygonal contour, includes: a mat member having a second polygonal contour defined by mutually opposing a first main plane and a second main plane; and at least one retaining member having a slit member including at least one slit formed in a top surface at a predetermined height from the first main plane for accepting a part of perimeter of the water absorbent sheet being inserted therein, wherein the water absorbent sheet is laid on the first main plane, and then the above purpose is accomplished.

11 Claims, 79 Drawing Sheets

(58) Field of Classification Search
USPC .............. 119/161, 162, 165, 166, 168, 169;
199/169, 28.5
See application file for complete search history.

(56) References Cited

U.S. PATENT DOCUMENTS

| | | | | |
|---|---|---|---|---|
| 3,099,855 A * | 8/1963 | Nash | ........................ | A47L 13/29 |
| | | | | 15/231 |
| 3,237,904 A * | 3/1966 | Abruzese | ................ | E04H 15/62 |
| | | | | 135/118 |
| 3,416,495 A * | 12/1968 | Wilson | ................. | A01K 1/0107 |
| | | | | 119/169 |
| 3,516,111 A * | 6/1970 | Heyman | .................... | F16L 5/00 |
| | | | | 16/2.1 |
| 3,537,116 A * | 11/1970 | Kain | .................... | A47G 9/0246 |
| | | | | 4/585 |
| 3,785,451 A * | 1/1974 | McCord | .................. | B32B 17/04 |
| | | | | 180/69.1 |
| 4,599,754 A * | 7/1986 | Mairs, III | ................ | A47G 9/06 |
| | | | | 135/96 |
| 5,092,010 A * | 3/1992 | Wong | .................... | A47G 9/0284 |
| | | | | 5/493 |
| 5,211,133 A * | 5/1993 | Foley | .................... | A01K 1/0114 |
| | | | | 119/165 |
| 5,311,837 A * | 5/1994 | Mamer-Boellstorff | ...................... | |
| | | | | A01K 1/0353 |
| | | | | 119/28.5 |
| 5,567,916 A * | 10/1996 | Napiorkowski | ....... | H02G 3/083 |
| | | | | 16/2.1 |
| 5,966,757 A * | 10/1999 | Sullivan | ................. | A47G 9/062 |
| | | | | 5/417 |
| 6,199,230 B1 * | 3/2001 | Parikh | .................. | A47D 13/063 |
| | | | | 5/420 |
| 6,405,394 B1 * | 6/2002 | Rosenberg | ........... | A47D 15/003 |
| | | | | 5/484 |
| 6,450,119 B1 * | 9/2002 | Holt, Jr. | ................ | A01K 1/0353 |
| | | | | 119/28.5 |
| 6,550,423 B1 * | 4/2003 | Pope | .................... | A01K 1/0107 |
| | | | | 119/161 |
| 6,802,281 B2 * | 10/2004 | Otsuji | ................. | A01K 1/0157 |
| | | | | 119/168 |
| 7,367,621 B1 * | 5/2008 | Han-Dressor | ........... | B62B 3/144 |
| | | | | 297/219.12 |
| 7,473,817 B1 | 1/2009 | Tanaka et al. | | |
| 8,225,748 B2 * | 7/2012 | Crawford | ............. | A01K 1/0107 |
| | | | | 119/161 |
| 8,973,530 B2 * | 3/2015 | Spreitzer | ................ | A01K 1/0114 |
| | | | | 119/165 |
| 9,776,033 B2 * | 10/2017 | Fasullo | ................ | A63B 21/4037 |
| 2002/0138934 A1 * | 10/2002 | Petner | ................... | A47L 13/254 |
| | | | | 15/229.6 |
| 2003/0232175 A1 * | 12/2003 | Zahler | ................ | A47G 27/0231 |
| | | | | 428/163 |
| 2008/0178818 A1 | 7/2008 | Aley | | |
| 2011/0146581 A1 | 6/2011 | Sasano et al. | | |
| 2011/0270204 A1 | 11/2011 | Fukudome et al. | | |
| 2012/0000428 A1 * | 1/2012 | Keating | ................ | A01K 1/015 |
| | | | | 119/28.5 |
| 2013/0014325 A1 * | 1/2013 | Argento | ................ | A47G 9/062 |
| | | | | 5/417 |
| 2014/0053785 A1 * | 2/2014 | Christianson | ........ | A01K 1/0107 |
| | | | | 119/169 |
| 2014/0068858 A1 * | 3/2014 | Wambeke | ............. | A47G 9/062 |
| | | | | 5/420 |
| 2014/0338607 A1 * | 11/2014 | Takagi | ................. | A01K 1/0157 |
| | | | | 119/161 |

FOREIGN PATENT DOCUMENTS

| | | | | |
|---|---|---|---|---|
| CN | 101273710 | | 10/2008 | |
| CN | 201444803 | | 5/2010 | |
| CN | 201577376 | | 9/2010 | |
| CN | 201798333 | | 4/2011 | |
| CN | 102186335 | | 9/2011 | |
| CN | 102271913 | | 12/2011 | |
| GB | 2470646 A | | 1/2010 | |
| JP | 6-34447 | | 5/1994 | |
| JP | 3068906 | | 5/2000 | |
| JP | 2003-225111 | | 8/2003 | |
| JP | 2007-110929 | | 5/2007 | |
| JP | 4079648 | | 4/2008 | |
| WO | WO 0167850 A1 * | 9/2001 | .......... | A01K 1/0107 |
| WO | WO 2014122696 A1 * | 8/2014 | .......... | A01K 1/0157 |

* cited by examiner

Fig. 28

Result of Tension Test

Test TOOL: IMADA CO., LTD's MODEL PSS-0.5K
Test Condition: Test Mode : 500gf
Load Unit: 1g=1gf

| Water absorbent sheet Sa1 is inserted both in Slit Members S3 and S4 (Executed 10 times) | | | | | Water absorbent sheet Sa1 is inserted only in Slit Member S3 (Executed 10 times) | | | | |
|---|---|---|---|---|---|---|---|---|---|
| 425gf | 465gf | 470gf | 455gf | 495gf | 125gf | 175gf | 210gf | 220gf | 275gf |
| 420gf | 425gf | 445gf | 435gf | 500gf and over | 255gf | 160gf | 260gf | 240gf | 140gf |
| | | | Average | 453.5gf | | | | Average | 206gf |

WATER ABSORBENT SHEET RETAINING MAT

FIELD

The present invention relates to a mat used for retaining a water absorbent sheet, and more particularly, to a water absorbent sheet retaining mat for retaining a water absorbent sheet for a pet.

BACKGROUND

When handling a liquid indoors, usually a sheet having a capacity to absorb or soak up water (hereinafter referred to as a "water absorbent sheet") is laid on an object which would be suffered from being wet such as a floor or a table for protecting it from the water. However, such aim will not be achieved when a liquid amount to be absorbed exceeds the capacity of the water absorbent sheet or when the water absorbent sheet shifts from the proper position. Typical cases of such shifts are that a pet moves the water absorbent sheet during feeding or excreting thereon. The water absorbent sheet which is broken by the pet comes upon the same situation in which the liquid amount to be absorbed exceeds the capacity thereof.

A toilet mat for a pet is proposed by Patent Literature 1 for proactively counter the above cases. As shown in FIG. 78 and FIG. 79, the toilet mat for a pet proposed by Patent Literature 1 is used in a state in which a toilet sheet for a pet is laid on an upper surface thereof. The toilet mat for a pet 1001 includes a main body formed in almost a rectangular shape, and a pair of fixtures 1011a and 1011b for retaining the toilet sheet for a pet 1002 on the main body. The main body is made with a material, preferably has water repellency, which is well durable and easy to change the shape for convenience of carrying. Provided with are magnets 112 to the main body, and magnets 111 to the fixtures 1011a and 1011b.

Installation of the toilet sheet for a pet 1002 in the toilet mat for a pet 1001 is made in a manner below. After the toilet sheet for a pet (hereinafter referred to as a "toilet sheet") 1002 is laid on the upper surface of the main body, the fixtures 1011a and 1011b are located in the positions over the laid sheet 1002 so that the magnets 111 position above the magnets 112. Then, the fixtures 1011a and 1011b are let down toward the main body so that the magnets 111 and 112 stick to each other. An attraction force working between the magnets 111 and 112 generates a frictional force between the toilet sheet 1002 and the magnets 111 and 112. The toilet sheet 1002 is fixed on and retained by the toilet mat for a pet 1001 by the frictional force. The toilet sheet 1002 can be removed from the main body after the fixtures 1011a and 1011b are detached from the main body.

The fixtures 1011a and 1011b, when the magnets 111 and 112 are not provided therein, press the toilet sheet 1002 against the toilet mat for a pet 1001 by the self weight thereof, causing the frictional force between the toilet sheet 1002 and the fixtures 1011a and 1011b to fix the toilet sheet 1002 thereat. To prevent the toilet sheet 1002 from shifting due to the pet's motion, it is devised that the frictional force is increased by increasing the weight of the fixtures 1011a and 1011b to increase the fixing force of the toilet sheet 1002. When the magnets 111 and 112 are provided, it is devised to increase the magnetism thereof to increase the frictional force.

CITATION LIST

Patent Literature

Patent Literature 1: Japanese Patent Application Laid-Open No. 2007-110929

SUMMARY

Technical Problem

Patent Literature 1 discloses a toilet mat for a pet which forces a user to remove and install fixtures every time to get on and off a toilet sheet. The fixtures are separately provided from the main body of toilet mat, and are placed on a toilet sheet when in use. Thus, the fixtures would become dirty by pet's excrements, and cleaning is required. There is a possibility that the fixtures, separately provided from the main body of the toilet mat, are lost during cleaning the fixtures or exchanging the toilet sheet.

Furthermore, although the magnets are provided as a means for positioning the fixtures on the main body of the toilet mat, the magnets provided in the main body of the toilet mat sit under the toilet sheet, disabling the user to visually observe thereof during the installation of the fixtures. In addition to this, the toilet sheet should be greater than the distance between the magnets to be fixed on the toilet mat by the fixtures, limiting the size of toilet sheet could be used.

For preventing the position shifting, it is required to increase the weight of fixtures or to strengthen the magnets. The weight of fixtures is increased, lessened is the portability of the toilet mat as well as increased is the load to the operator during the installation or uninstallation of the fixtures. Although strengthening of the magnets will not affect the portability of the toilet mat, a high-strength magnetism makes the working load of installing or removing the fixtures heavier and requires a consideration of the influence on the magnetic products therearound.

In the light of the above mentioned problems, an object of the present invention is to provide a water absorbent sheet retaining mat which can retain a water absorbent sheet easily and surely.

Solution to Problem

In order to achieve the above-described object, the water absorbent sheet retaining mat for retaining a water absorbent sheet having a first polygonal contour according to the present invention, comprises a mat member having a second polygonal contour defined by mutually opposing a first main plane and a second main plane; and at least one retaining member having a slit member comprised of at least one slit formed in a top surface at a first predetermined height from the first main plane for accepting a part of perimeter of the water absorbent sheet being inserted therein, wherein the water absorbent sheet is laid on the first main plane.

Advantageous Effects of Invention

The present invention can provide a water absorbent sheet retaining mat which can retain a water absorbent sheet easily and surely.

BRIEF DESCRIPTION OF DRAWINGS

FIG. 28 is a table showing a result of Tension Test applied to the water absorbent sheet retaining mat according to the present invention.

DESCRIPTION OF EMBODIMENTS

Before specifically describing a water absorbent sheet retaining mat according to the embodiments of the present invention individually, a technical concept of the present invention is explained with reference to FIG. 1. The water absorbent sheet retaining mat M according to the present invention, aiming to be able to retain a water absorbent sheet having a predetermined polygonal contour easily and surely, includes a mat member Pm with a plane St on which a water absorbent sheet Sa is laid (hereinafter referred to as a "laying plane St"), and a retaining member Pr which retains the water absorbent sheet Sa. The mat member Pm has a predetermined polygonal contour and is formed in a flat plate like shape having a thickness t1 and being defined by the laying plane St which is the first main plane and the second main plane Sb opposed to and apart from the first main plane St by a predetermined distance t1. The second main plane Sb (hereinafter referred to as a "sitting plane Sb") of the mat member Pm is a plane which contacts a place where the water absorbent sheet retaining mat M is sit. At least one of the retaining member Pr, formed in a block like shape having a predetermined height t2, is provided on the laying plane St or adjacent to the mat member Pm. A cut S is provided in a top surface of the retaining member Pr high above the sitting plane Sb by a predetermined distance t3(t3=t1+t2).

Figure 1:
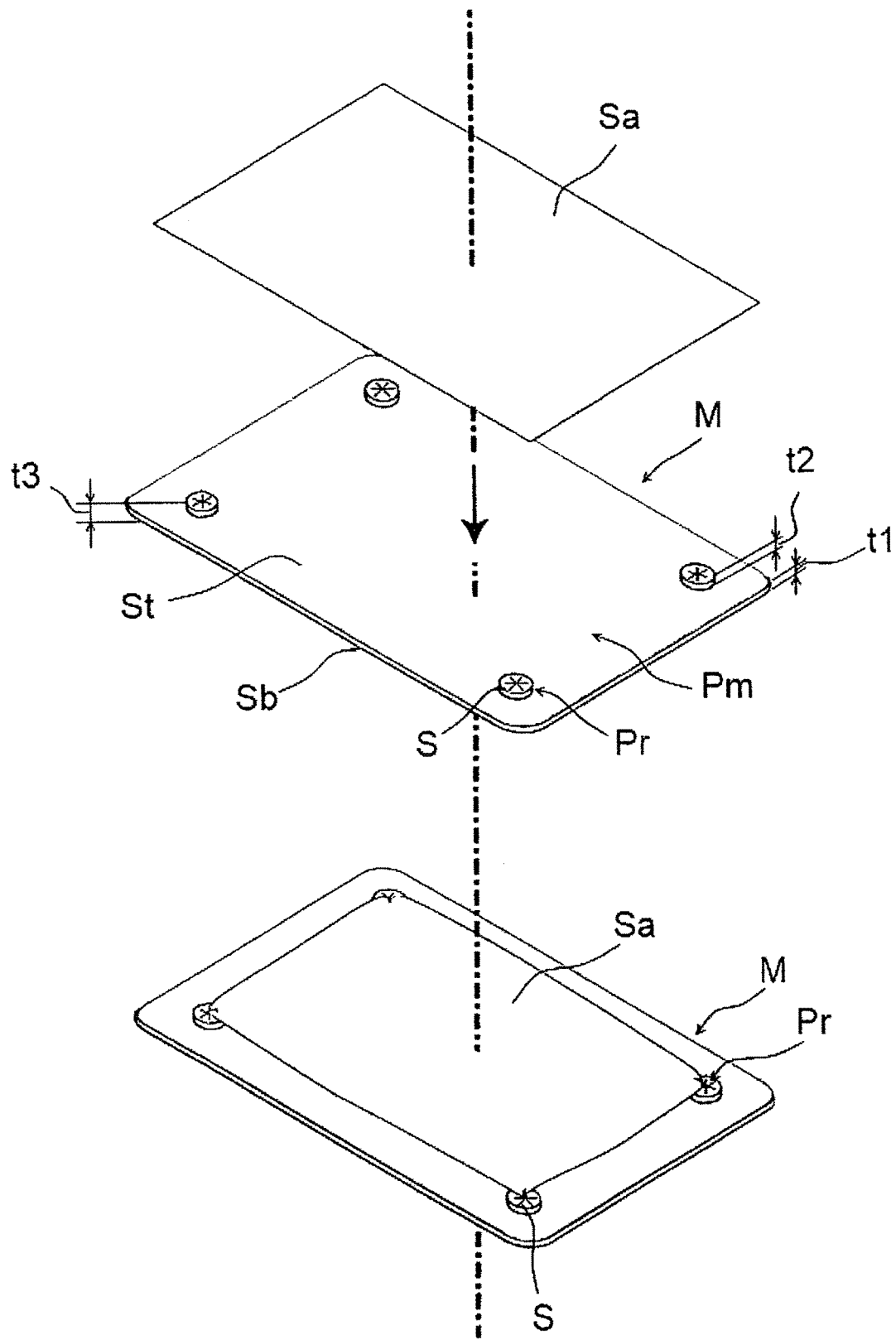
FIG. 1 is a perspective view showing a state in which a water absorbent sheet retaining mat according to the present invention is used.

Note that the water absorbent sheet Sa and the mat member Pm each could be formed in arbitrary shapes other than a rectangular shape depicted in FIG. 1. The mat member Pm is basically configured to have an inner shape greater than an outer shape of the water absorbent sheet Sa. The retaining member Pr is provided so as to be located in a position inner by a predetermined distance L (FIG. 3) from an outer perimeter of the water absorbent sheet Sa when the water absorbent sheet Sa is laid on the laying plane St. Note that the water absorbent sheet Sa and the mat member Pm are described as being formed in a rectangular shape as shown in FIG. 1 for convenience of explanation in this specification. In this case, the water absorbent sheet Sa should be laid on the mat such that at least one portion of the tips of four corners thereof would be inserted in the cut S by the predetermined length L.

As described above, in the water absorbent sheet retaining mat M, the retaining members Pr (the fixtures) with the cut S formed in the top surface thereof are provided not separately from the mat member Pm (a toilet mat for a pet) but in a position above the laying plane St of the mat member Pm. As a result, workings of installing or removing the fixtures required every time for fixing and unfixing the water absorbent sheet Sa becomes unnecessary as well as the risk of losing the retaining member Pr during the cleaning is eliminated. Retaining of the water absorbent sheet Sa is achieved by inserting a portion of the water absorbent sheet Sa in the cut S in the top surface of the retaining member Pr. Thus, both the cut S and the to-be inserted portion of the water absorbent sheet Sa can be visually observed without difficulty and the working of retaining (insertion) of the water absorbent sheet Sa can be carried out easily and surely.

Further, the water absorbent sheet Sa is pinched by the cut S provided in the retaining member Pr at the top surface where the friction with the water absorbent sheet Sa is produced, and is retained. Thus, no weight increasing of the fixtures or magnetism strengthening for securing enough retaining force is necessary.

Furthermore, the retaining members Pr can be provided in any position as long as they can be located inner area of the water absorbent sheet Sa; the mat member Pm is basically bigger than the water absorbent sheet Sa to be retained, and is therefore formed as bigger than the biggest one of the water absorbent sheet Sa; the retaining members Pr are arranged in an area corresponding to the water absorbent sheet Sa in a size range from the biggest size to the smallest. Thus, a single of the mat member Pm can retain any of the water absorbent sheet Sa in all sizes.

The water absorbent sheet retaining mat M is constructed of a waterproof and flexible material. The waterproofness is required for preventing a liquid from permeating, and the flexibility is required for surely and stably retaining the water absorbent sheet Sa by being deformed along a shape of the place on which the water absorbent sheet retaining mat M is laid. Further, safety and corrosion proof is preferably required for the material of which the water absorbent sheet retaining mat M is made. The safety comes from a consideration of that a pet may lick the water absorbent sheet retaining mat M used for the same purposes as the conventional toilet mat for a pet. The corrosion proof is for withstanding the applied liquid (such as a pet's urine and so on). The water absorbent sheet retaining mat M, according to the embodiments of the present invention, is implemented of silicon rubber.

First Embodiment

Figure 2:
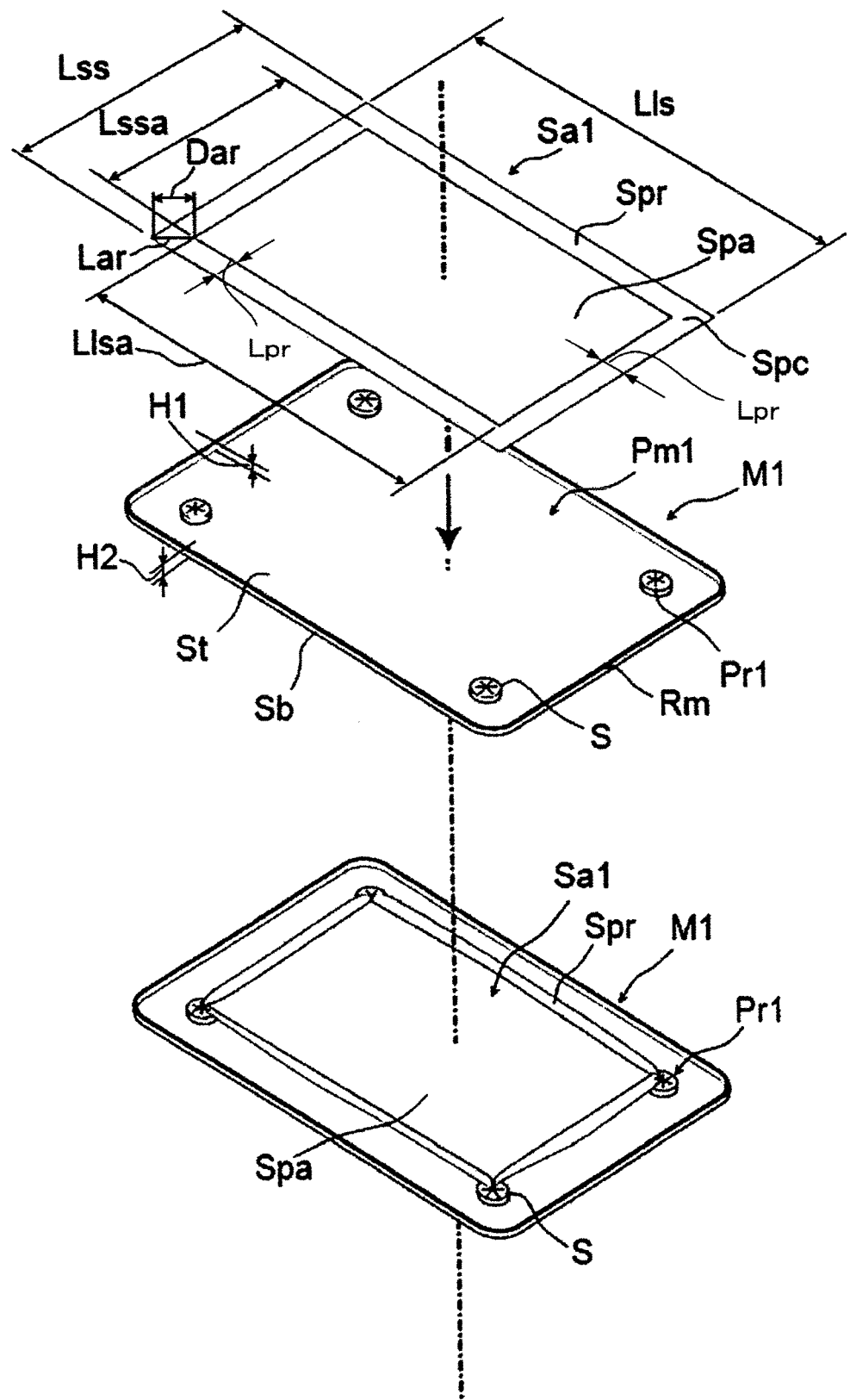
FIG. 2 is a perspective view showing a state in which a water absorbent sheet retaining mat according to a first embodiment of the present invention is used.

With reference to FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, a water absorbent sheet retaining mat according to a first embodiment of the present invention is described below. FIG. 2 shows a state in which a water absorbent sheet retaining mat M1 is used. The water absorbent sheet retaining mat M1 has a construction similar to that of the water absorbent sheet retaining mat M except that the mat member Pm and the retaining member Pr are replaced with a mat member Pm1 and a retaining member Pr1, respectively. The mat member Pm1 and the retaining member Pr1 are intensively described below.

The mat member Pm1 is integrally provided with a mat frame member Rm vertically extending from an edge of the laying plane St of the mat member Pm by a predetermined height H1. Thus, the mat member Pm1 is formed in a pan-like shape with the laying plane St and the mat frame member Rm corresponding to a bottom and a circumferential wall, respectively. Thanks to this pan-like construction, the mat member Pm1 can hold a liquid not absorbed by the water absorbent sheet inside.

The mat member Pm1 can be made by adhering the mat frame member Rm and the retaining member Pr to the mat member Pm, but more preferably by integrally forming the mat member Pm and the retaining member Pr. In the mat member Pm1, the mat frame member Rm is constructed so as to satisfy a relationship defined by an equation of $H1=t2$.

The retaining members Pr1 have a construction similar to that of the retaining members Pr except the arrangements in the mat member Pm1. The arrangement of retaining members Pr1 are determined according to the construction of the water absorbent sheet Sa1 to be retained. Therefore, before describing the arrangement of the retaining members Pr1, the construction of the water absorbent sheet Sa1 is explained below.

The water absorbent sheet Sa1 includes an area served for water absorption (hereinafter referred to as an "absorption area" Spa and a sheet brim member Spr. The absorption area Spa has a polygonal contour smaller than that of the water absorbent sheet Sa1, and is provided substantially at the center thereof. A width of the sheet brim member Spr, a distance between the absorption area Spa and the outer perimeter of the water absorbent sheet Sa1 is designated as a sheet brim width Lpr. According to this embodiment, the absorption area Spa is formed in a rectangular shape defined by a short side Lssa and a long side Llsa. The sheet brim member Spr is provided to surround the absorption area Spa. The water absorbent sheet Sa1 is constructed with a front surface made of a liquid permeable material such as a non-woven fabrics, and a back surface made of a liquid non-permeable material such as nylon and a vinyl. Included in the absorption area Spa is an absorbent material such as a high polymer.

As the water absorbent sheet Sa1, suitable goods on the market can be used. The water absorbent sheets on the market fall roughly into two groups with respect to the size. One is a regular size group including regular sized sheets, and the other is a wide size group including wide, greater than the regular, sized sheets. The water absorbent sheets Sa1 in the regular size have the outer contours as large as about a rectangular whose short side Lss is 310 mm to 330 mm, and long side Lls is 440 mm to 450 mm. The water absorbent sheets Sa1 in the wide size have the outer contours as large as about a rectangular whose short side Lss is 430 mm to 450 mm, and long side Lls is 590 mm to 600 mm. The width Lpr of the sheet brim member Spr is about 20 mm to 30 mm.

The absorption area Spa is located such that the center point thereof is common with the outer contour of the water absorbent sheet Sa1. The water absorbent sheet Sa1 has 4 corner portions Spc. A line connecting corner ridges of the absorption area Spa and the water absorbent sheet Sa1 is designated as a connection line Lar, and a length thereof is designated as a separation distance Dar. The retaining member Pr1 is preferably located in the below described position when the water absorbent sheet Sa1 is laid on the laying plane St. Specifically, the center of the retaining member Pr1 (a slit member S) is preferably located in the position corresponding to the corner of the absorption area Spa each. Although some shifts toward the center of the water absorbent sheet Sa1 on the extended connection line Lar is allowed, no shift toward the centrifugal direction (close to the side of outer contour of the water absorbent sheet Sa1) is allowed.

The retaining member Pr1 is provided on such a position that the absorption area Spa on the front surface of the water absorbent sheet Sa1 is not covered with the retaining member Pr1 when the water absorbent sheet Sa1 constructed as above is laid with the back surface thereof in contact with the laying plane St of the mat member Pm1. Specifically, firstly, the back surface of the water absorbent sheet Sa1 is laid on the laying plane St of the mat member Pm1. Then, at least a part of the corner portion Spc of the water absorbent sheet Sa1 is inserted in the slit member S of the retaining member Pr1. By being the corner portion Spc inserted in the slit member S, the water absorbent sheet Sa1 is positioned and retained on the water absorbent sheet retaining mat M1. Note that the sheet brim member Spr whose portions, not being caught by the slit member S, hang down so as to contact with the laying plane St, and then rise up from and surround the absorption area Spa.

The positions in which the retaining members Pr1 are arranged is determined in consideration of that the effect of the sheet brim member Spr rising from and surrounding the absorption area Spa to suppress the splash from the absorption area Spa or to the case when the liquid falls in a direction not perpendicular to the absorption area Spa.

Note that at least one of the retaining members Pr1 is enough for retaining the water absorbent sheet Sa1 on the water absorbent sheet retaining mat M1. To prevent a pet's foot being caught by the water absorbent sheet Sa1 while the pet is sitting on the water absorbent sheet retaining mat M1, the edge of water absorbent sheet Sa1 is preferably retained. With reference to FIG. 5, FIG. 6, FIG. 7, FIG. 8, FIG. 9, and FIG. 10, shapes of the retaining member Pr1 and the slit member S will be described later.

Figure 3:
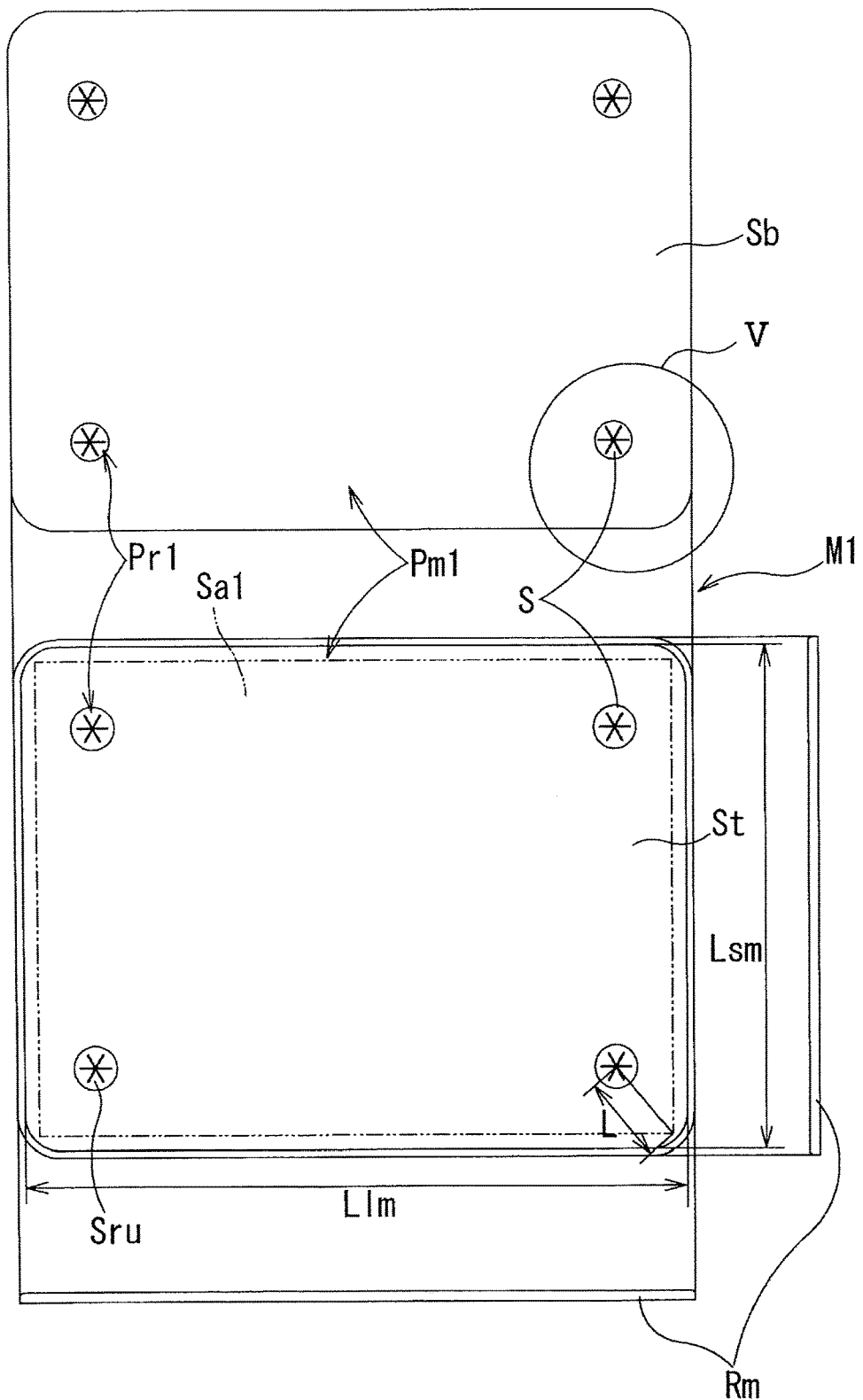
FIG. 3 is a diagram showing a construction of the water absorbent sheet retaining mat according to the first embodiment of the present invention.
Figure 4:
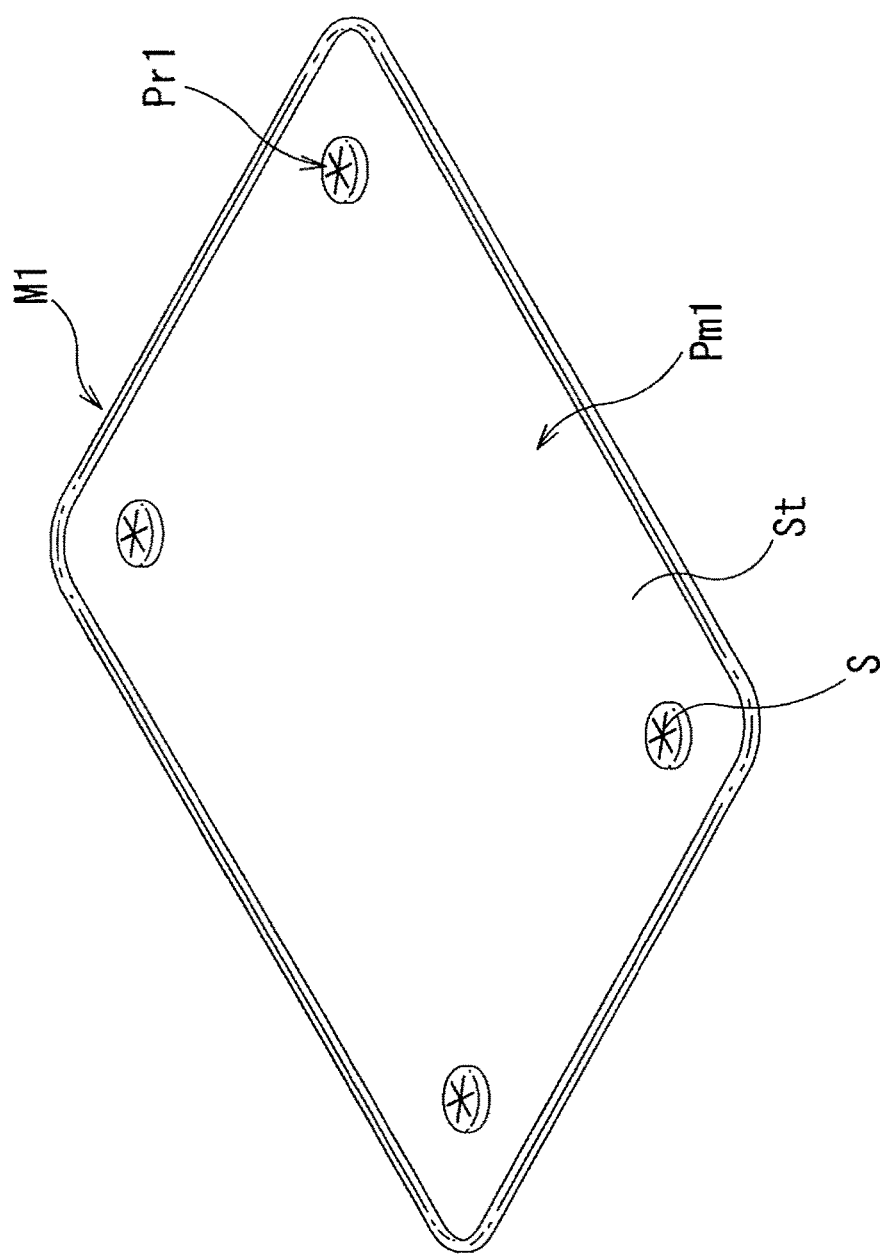
FIG. 4 is a perspective view of the water absorbent sheet retaining mat shown in FIG. 3.

Next, with reference to FIG. 2, FIG. 3, and FIG. 4, described is a relationship between the dimensions of the water absorbent sheet Sa1 and the mat member Pm1. According to this embodiment, the mat member Pm1 is constructed to have the inner shape greater than the outer shape of the water absorbent sheet Sa1. In other words, with respect to a short side Lsm (inner) and a long side Llm (inner) of the mat member Pm1, the following equations (1) and (2) are satisfied.

$$Lsm \geq Lss \quad (1)$$

$$Llm \geq Lls \quad (2)$$

The retaining members Pr1 are provided so as to be located in the positions inner by the predetermined distance L from an outer perimeter of the water absorbent sheet Sa1 when the water absorbent sheet Sa1 is laid on the laying plane St. In the water absorbent sheet retaining mat M1, 4 pieces of the retaining member Pr1 are provided on the laying plane St so as to be located substantially on the diagonal lines of the mat member Pm1. Each of the four retaining members Pr1 is located in the position corresponding to each of the four corner portions Spc, when the water absorbent sheet Sa1 is laid on the laying plane St.

The retaining member Pr1 has an external appearance of a cylinder like shape and rises almost perpendicularly from the laying plane St at a predetermined height t2 (FIG. 1). Formed in a top surface Sru of the retaining member Pr1 is the slit member S in which a part of the water absorbent sheet Sa1 will be inserted. A distance between the centers of neighboring two retaining members Pr1 is substantially the same as either of the short side Lssa and the long side Llsa of the absorption area Spa in the water absorbent sheet Sa1.

Figure 5:
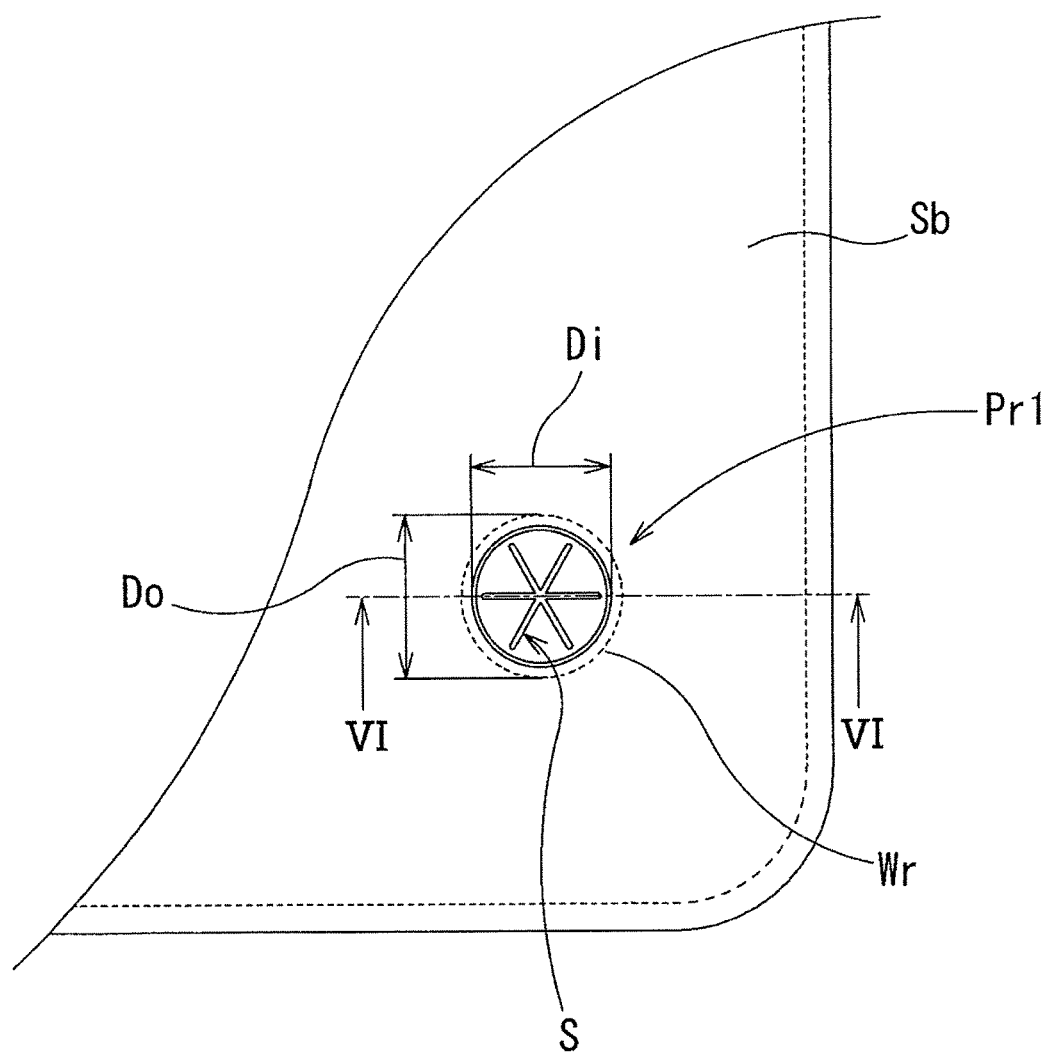
FIG. 5 is a plan view of one example of a retaining member of the water absorbent sheet retaining mat shown in FIG. 3.
Figure 6:
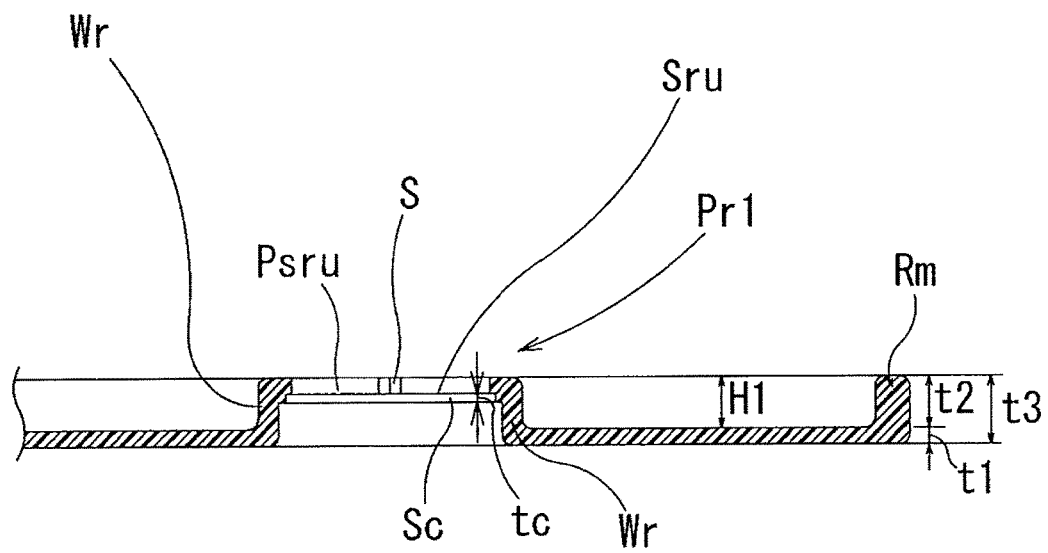
FIG. 6 is a sectional view of the retaining member shown in FIG. 5.
Figure 7:
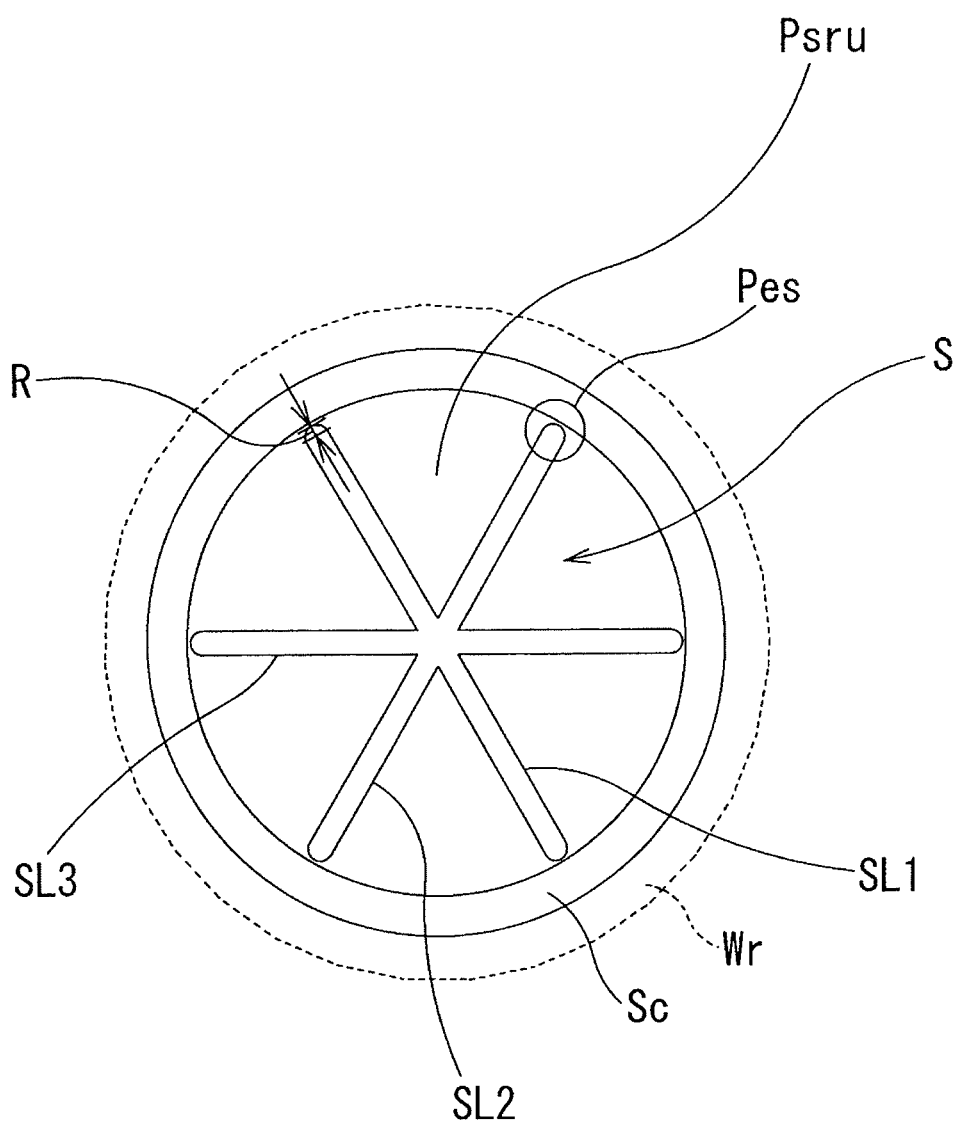
FIG. 7 is an enlarged plan view of slit member formed in the retaining member shown in FIG. 6.
Figure 8:
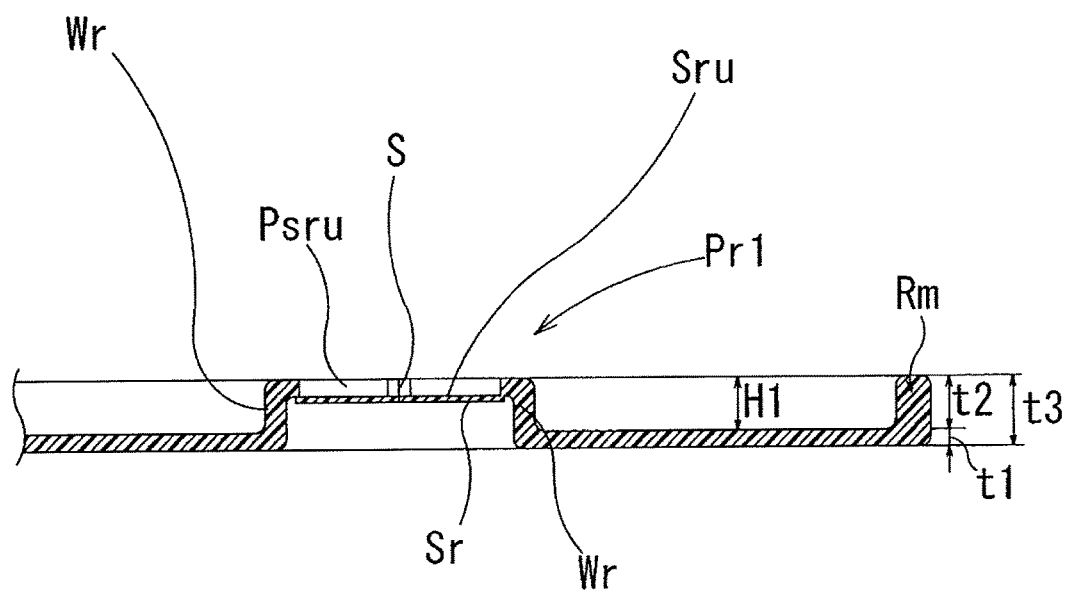
FIG. 8 is a sectional view showing an alternative of the retaining member shown in FIG. 3.
Figure 9:
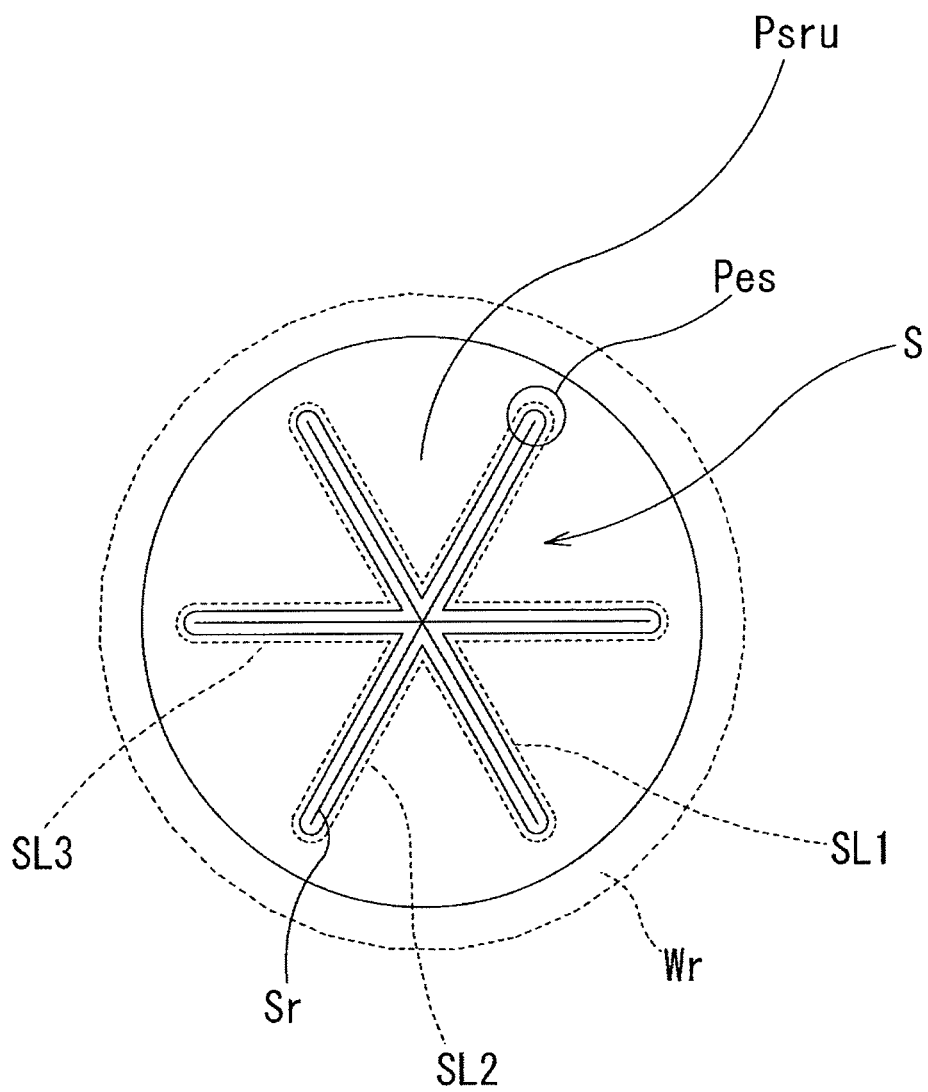
FIG. 9 is an enlarged plan view of a slit member formed in the retaining member shown in FIG. 8.

With reference to FIG. 5, FIG. 6, FIG. 7, FIG. 8, FIG. 9, and FIG. 10, the shapes of the retaining member Pr1 and the slit member S are described specifically. FIG. 5 is an enlarged plan view showing an encircled portion V in FIG. 3, and also showing an example of the retaining member of the water absorbent sheet retaining mat for a pet; FIG. 6 shows a cross sectional construction taken along a line VI-VI in FIG. 5; and FIG. 7 shows the slit member of the retaining member of FIG. 6 on an enlarged scale. FIG. 8 shows a cross sectional construction of an alternative example of the retaining member in FIG. 5; and FIG. 9 shows the slit member of the retaining member of FIG. 8 on an enlarged scale.

According to the example shown in FIG. 5, FIG. 6, and FIG. 7, the retaining member Pr1 is defined by an inner diameter Di, an outer diameter Do, and the height t2, and is composed of a peripheral wall Wr formed in a tubular shape and the top surface Sru. The inner diameter Di of the retaining member Pr1 should be about as large as to accept the user's finger therein. The height t2 of the retaining member Pr1 is about equal to the height H1 of the mat frame member Rm (hereinafter referred to as "mat frame height H1"). In this embodiment, the inner and outer diameters Di and Do of the retaining member Pr1 are set to 24 mm and 30 mm, respectively.

In the top surface Sru of the retaining member Pr1, provided is the slit member S, as described in the above. The slit member S is comprised of 3 slits SL1, SL2, and SL3 intersecting each other (FIG. 7). The slits SL1, SL2, and SL3 define 6 pieces of claws Psru in the top surface Sru. The length and width of slits SL1, SL2, and SL3 are set to about 22 mm and about 0.5 mm to 1 mm, respectively.

An end portions Pes in the distal ends of each slit in the longitudinal direction is formed in a circular arc shape having a radius of curvature R.

In the underside of claws Psru, provided is a circular step Sc (FIG. 7) having a predetermined height tc (FIG. 6) between the end portions Pes of each of the slits SL1, SL2, and SL3 and the peripheral wall Wr. The step Sc increases the thickness of intermediate portion between the peripheral wall Wr and the root (girth) of the claws Psru, functioning to reinforce a structural strength of the retaining member Pr1. Specifically, the end portions Pes are prevented from being lacerated by suppressing excessive deformation of the claws Psru when the water absorbent sheet Sa1 is inserted in or removed from the slit member S, ensuring the installation and uninstallation of the water absorbent sheet Sa1. Even if any laceration occurs in the end portion Pes, such laceration is prevented from growing.

Since the retaining member Pr1 is made of flexible material, the user can easily insert an edge of the water absorbent sheet Sa1 into the slit member S comprised of the slits SL1, SL2, and SL3. The water absorbent sheet Sa1 is retained by the top surfaces Sru due to a friction force working between the inserted edge of water absorbent sheet Sa1 and the plural claws Psru. Since the end portion Pes of each slit is formed in a circular arc shape having a predetermined radius of curvature R, the retaining member Pr1 is hardly lacerated in the root of claw Psru even if the water absorbent sheet Sa1 is installed and uninstalled repeatedly. Thus, together with the step Sc in above, the laceration (tearing out) of claw Psru is prevented. Note that the step Sc is not always necessary, if the retaining member Pr or the claw Psru is strong enough.

Even when a force substantially parallel to the laying plane St of the mat member Pm1 is applied to the edge portion of the water absorbent sheet Sa1 being inserted in the slit member S (the retaining member Pr1) constructed as described in the above, the friction and pinching between the claws Psru with a structural strength given by the tubular shaped peripheral wall Wr make it difficult for the water absorbent sheet Sa1 to remove from the slit member S.

The example shown in FIG. 8 and FIG. 9 is constructed such that the claws Psru of the retaining member Pr1 already described with reference to FIG. 5, FIG. 6, and FIG. 7 are connected to each other at the underside thereof by a rim Sr. The rim Sr is also cut and divided by three very fine slits SL1, SL2, and SL3. In other words, the claw Psru is provided with the rim Sr on two sides thereof. The rim Sr reinforces the claw Psru as well as reduces a gap between neighboring claws Psru. Resultantly, an excessive deformation of claws Psru when the water absorbent sheet Sa1 is inserted therein or thereout is prevented, making sure the installation and uninstallation of the water absorbent sheet Sa1.

Note that the rim Sr is not always necessary, if the retaining member Pr1 or the claw Psru is strong enough. It is allowed to provide both the step Sc and the rim Sr on a single of retaining member Pr1.

Figure 10:
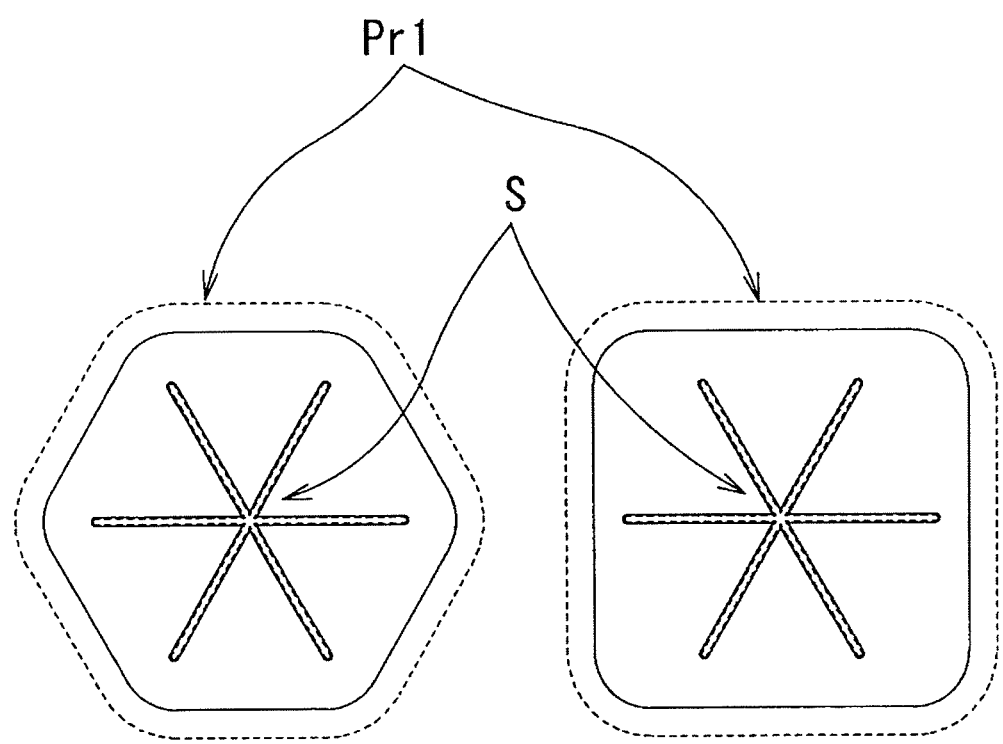
FIG. 10 is a diagram showing alternative embodiment of a peripheral wall formed in the retaining member shown in FIG. 5.

It is not limited that the retaining member Pr1 (or the peripheral wall Wr) should be in a tubular shape, but in any shape comprised of a top surface wherein the slit member S is provided and a side wall supporting the top surface. The retaining member Pr1 may be formed in a prism having a polygon base, for example, such as a rectangle or a hexagon, as shown in FIG. 10.

The number of slits defining the slit member S is not limited to three, and any number is acceptable if the slit member S can hold the water absorbent sheet Sa1 by plural number of the claws Psru. More specifically, one slit is enough to define the slit member S, and then the maximum number of slit can be properly determined in consideration of the required strength and the material of the top surface Sru.

Figure 11:
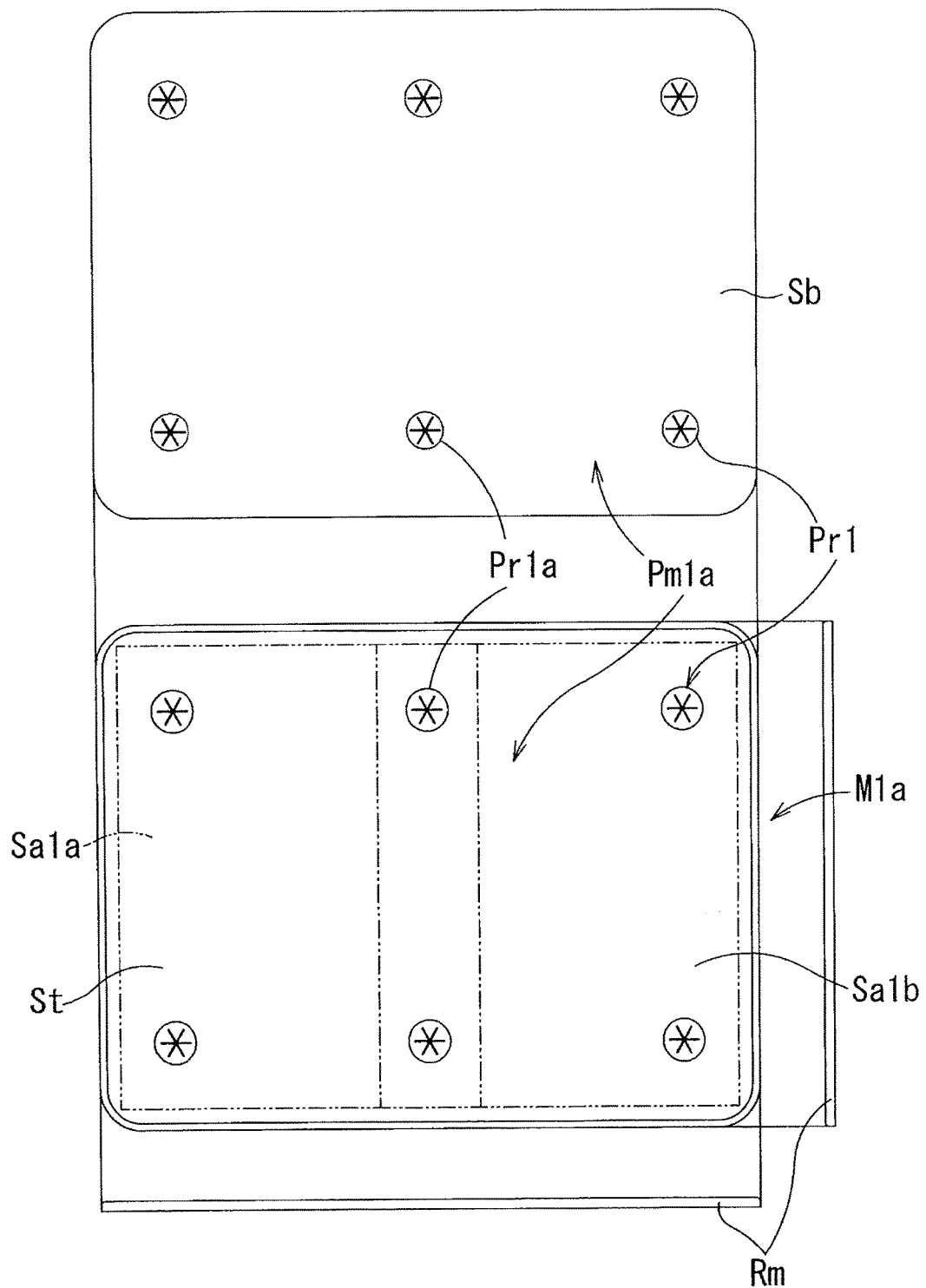
FIG. 11 is a diagram showing a construction of a first alternative embodiment of the water absorbent sheet retaining mat shown in FIG. 3.
Figure 12:
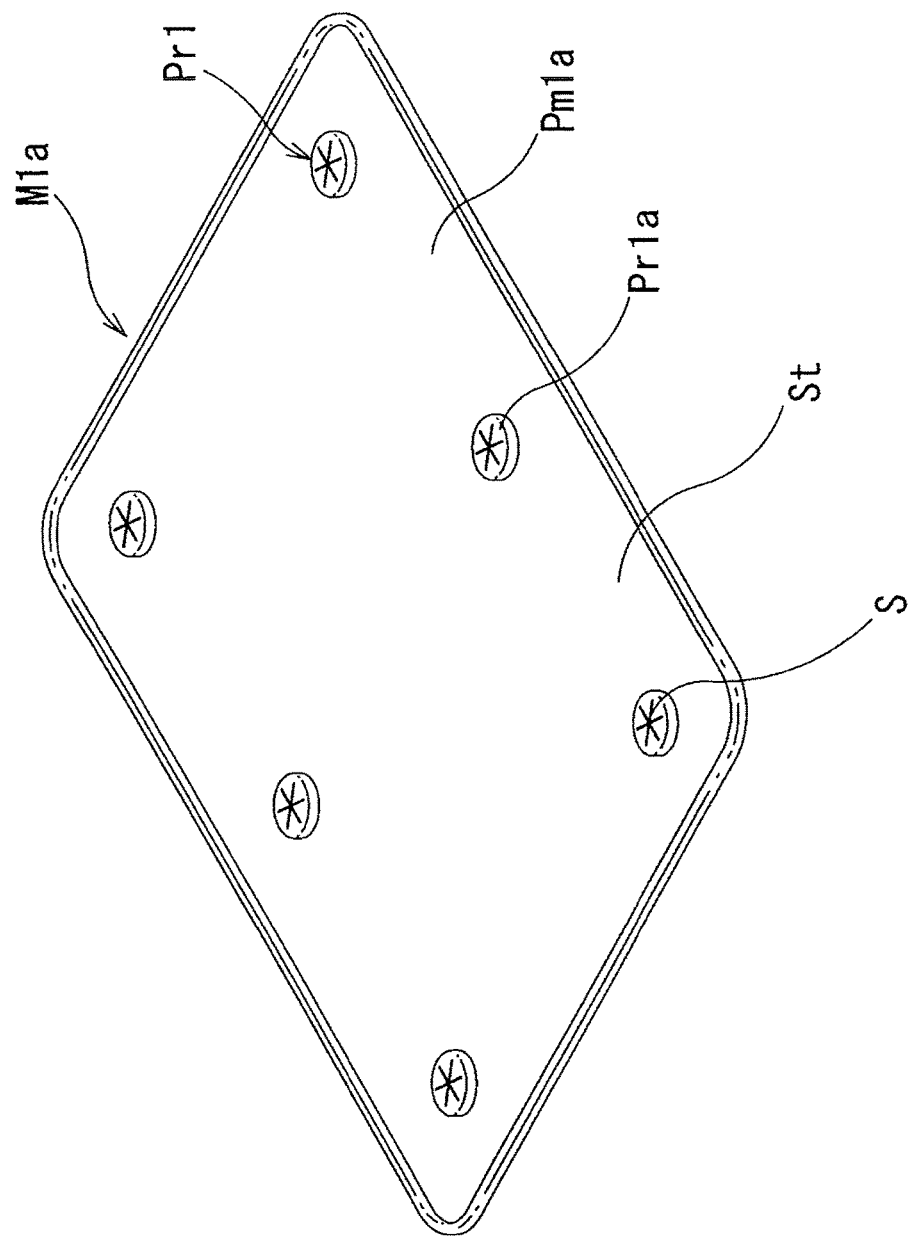
FIG. 12 is a perspective view of the water absorbent sheet retaining mat of FIG. 11.

Next, with reference to FIG. 11 and FIG. 12, described is a first alternative embodiment of the water absorbent sheet retaining mat M1. In contrast to the water absorbent sheet retaining mat M1 which is used for retaining a single of regular sized water absorbent sheet Sa1, a water absorbent sheet retaining mat M1a is used for retaining two regular sized water absorbent sheets Sa1a and Sa1b laid on the laying plane St with a portion thereof being overlapped. The water absorbent sheet retaining mat M1a can be used for retaining a single of wide sized water absorbent sheet laid on the laying plane St.

The water absorbent sheet retaining mat M1a has a construction similar to that of the water absorbent sheet retaining mat M1 except that the mat member Pm1 is replaced with a mat member Pm1a and a retaining member Pr1a is additionally provided. The mat member Pm1a and the retaining member Pr1a are intensively described below.

Arrangement of the retaining members Pr1 and the retaining members Pr1a is determined according to the construction of two water absorbent sheets Sa1a and Sa1b to be retained. Four pieces of retaining members Pr1 are arranged in the positions corresponding to two pieces of the corner portions Spc of the water absorbent sheet Sa1a and two pieces of the corner portions Spc of the water absorbent sheet Sa1b when the water absorbent sheets Sa1a and Sa1b are laid on the laying plane St. The retaining member Pr1a is provided in a position corresponding about a center on a line connecting the neighboring retaining members Pr1 and Pr1.

The water absorbent sheets Sa1a and Sa1b are installed in the water absorbent sheet retaining mat M1a in a following manner. The water absorbent sheet Sa1a is held such that four corner portions Spc are caught by two retaining members Pr1 and two retaining members Pr1a. Similarly, the water absorbent sheet Sa1b is held such that four corner portions Spc thereof is caught by two retaining members Pr1 and two retaining members Pr1a.

A single of wide sized water absorbent sheet is installed in the water absorbent sheet retaining mat Mia in a following manner. The water absorbent sheet is held such that four retaining members Pr1 catch the four corner portions Spc and two retaining members Pr1a catch the longer sides at about center positions thereof.

Figure 13:
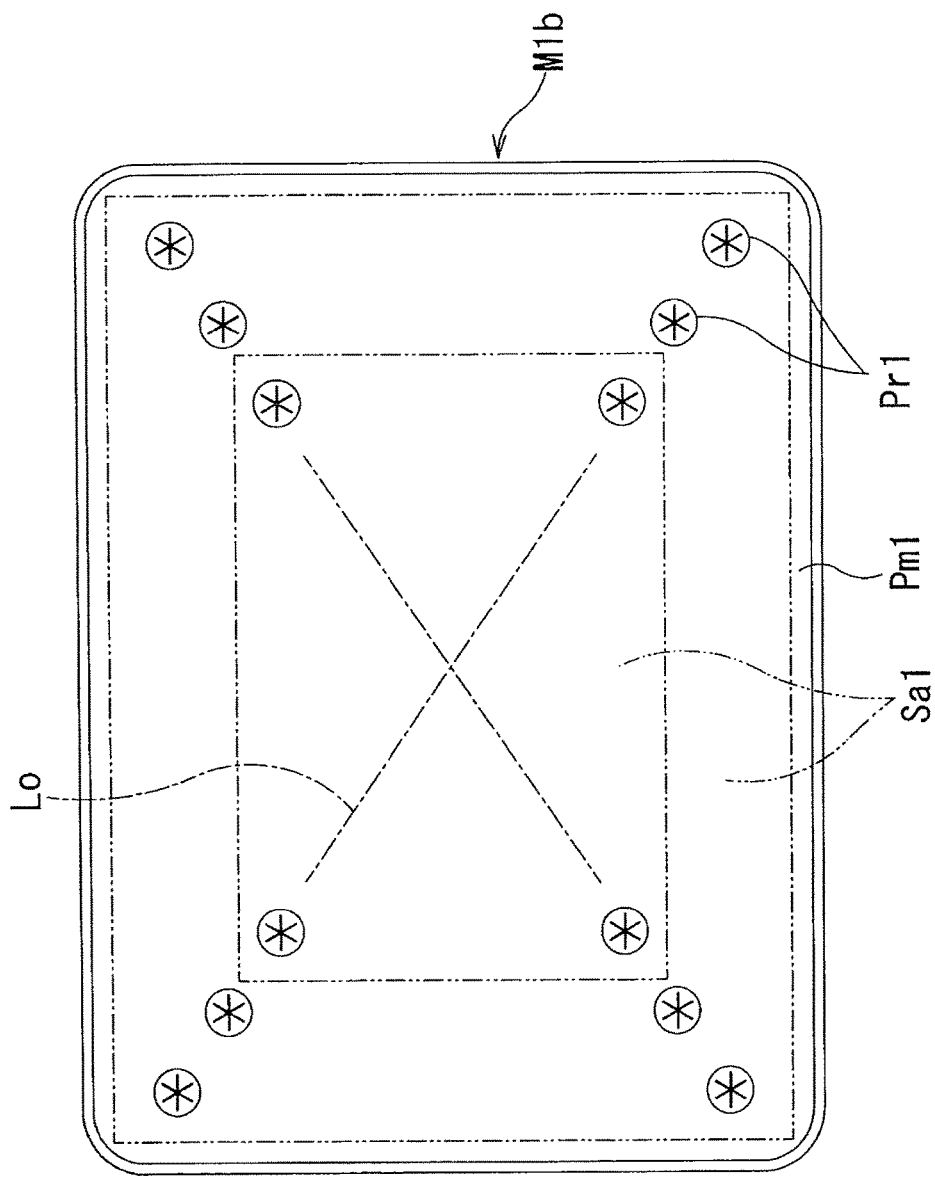
FIG. 13 is a plan view showing a second alternative embodiment of the water absorbent sheet retaining mat shown in FIG. 3.

Next, with reference to FIG. 13, described is a second alternative embodiment of the water absorbent sheet retaining mat M1. A water absorbent sheet retaining mat M1b is constructed by modifying the water absorbent sheet retaining mat M1, already described with reference to FIG. 3 and FIG. 4, such that a plurality of retaining members Pr1 are provided on the diagonal lines Lo of the mat member Pm1. Thanks to this construction, the water absorbent sheet Sa1 in various sizes can be retained by the same water absorbent sheet retaining mat M1b. If the water absorbent sheet Sa1 is a toilet or litter sheet for a pet, the water absorbent sheet Sa1 in a larger size can be used according to the growth of pet.

Figure 14:
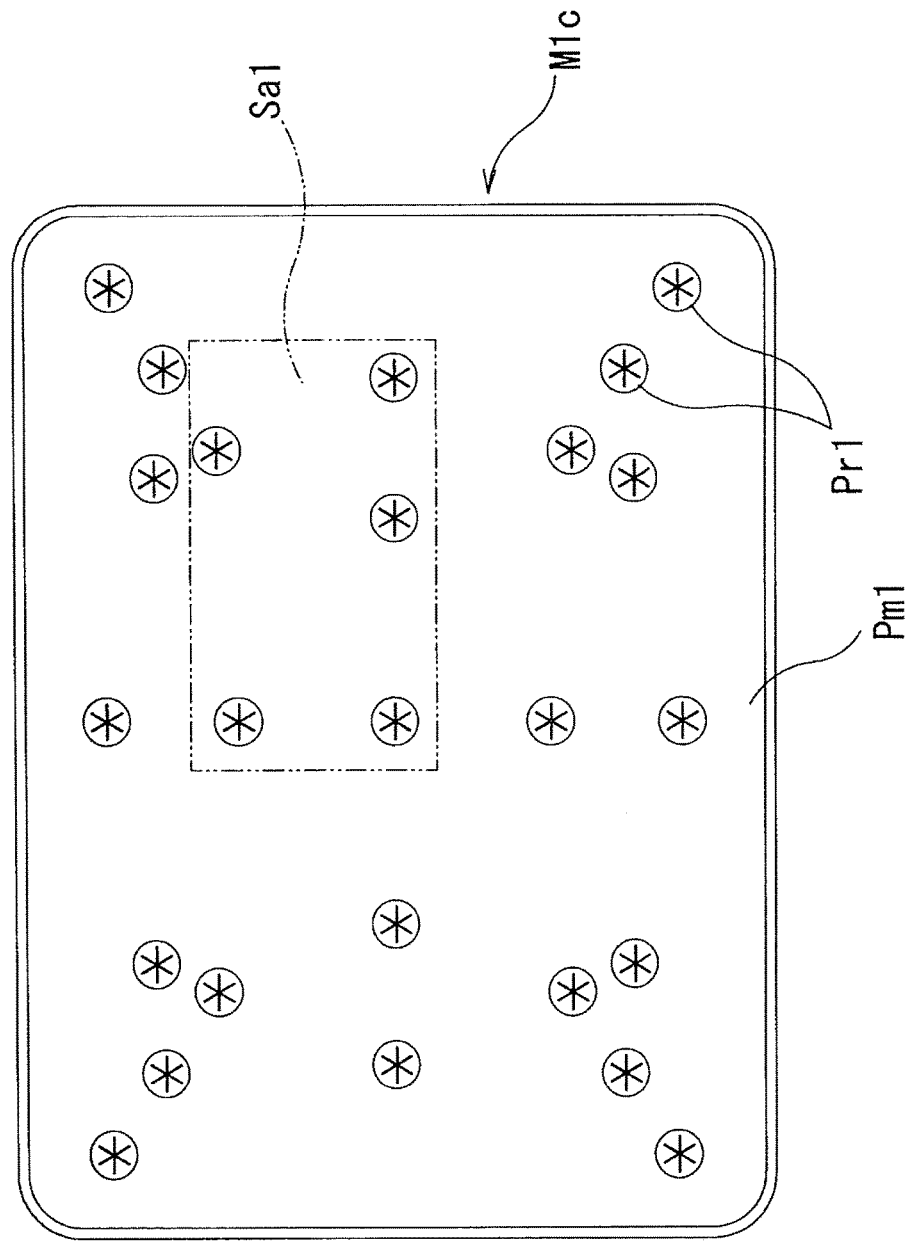
FIG. 14 is a plan view showing a third alternative embodiment of the water absorbent sheet retaining mat shown in FIG. 3.
Figure 15:
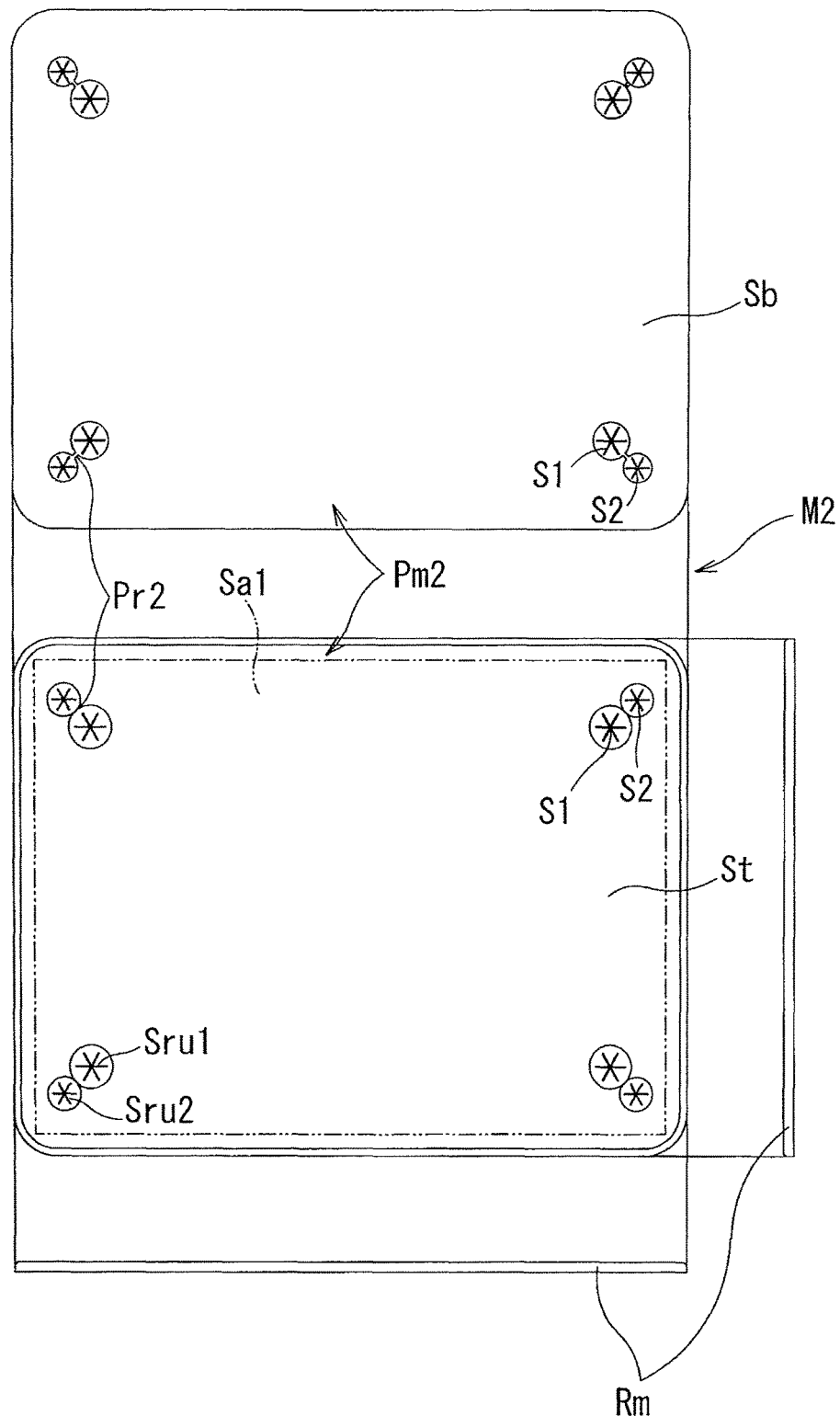
FIG. 15 is a diagram showing a construction of a water absorbent sheet retaining mat according to a second embodiment of the present invention.
Figure 16:
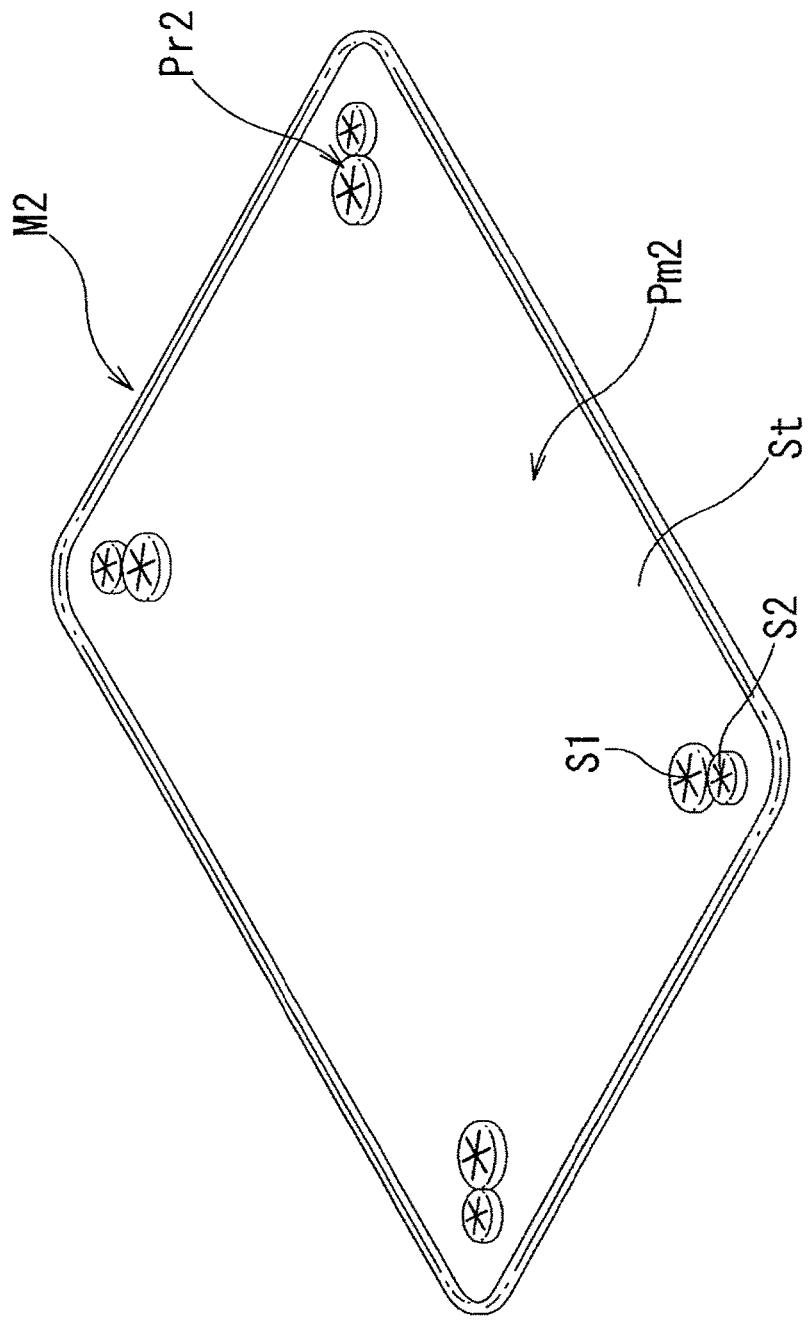
FIG. 16 is a perspective view of the water absorbent sheet retaining mat of FIG. 15.

Next, with reference to FIG. 14, described is a third alternative embodiment of the water absorbent sheet retaining mat M1. A water absorbent sheet retaining mat M1c is constructed by modifying the water absorbent sheet retaining mat M1b described with reference to FIG. 13 such that a plurality of retaining members Pr1 are additionally provided in positions other than the diagonal lines Lo. Thanks to this construction, the water absorbent sheet Sa1 in various sizes can be retained by the same water absorbent sheet retaining mat M1c in different position and in various directions.

Figure 77:
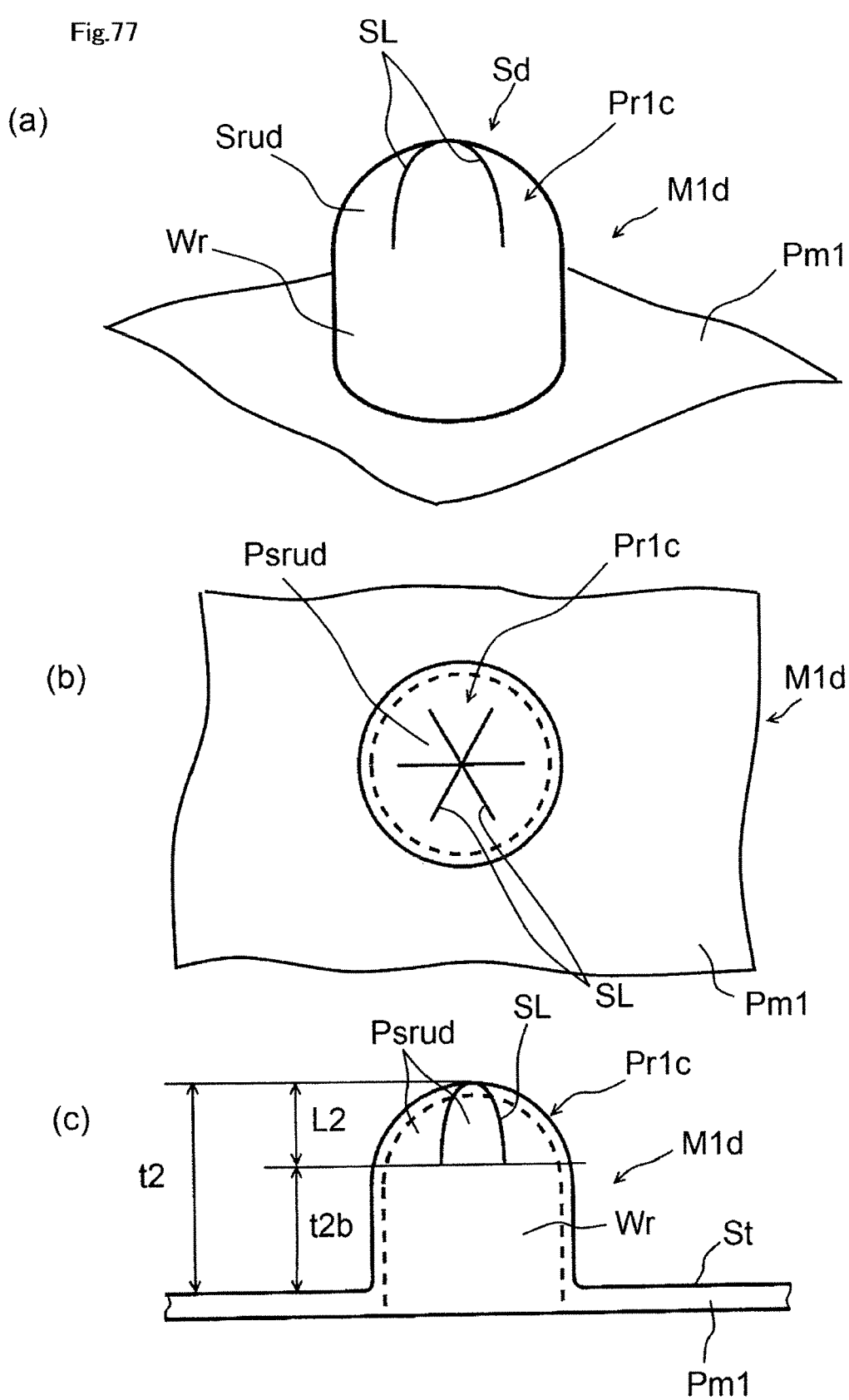
FIG. 77 is an explanatory view of a fourth alternative embodiment of the water absorbent sheet retaining mat in FIG. 3.
Figure 78:
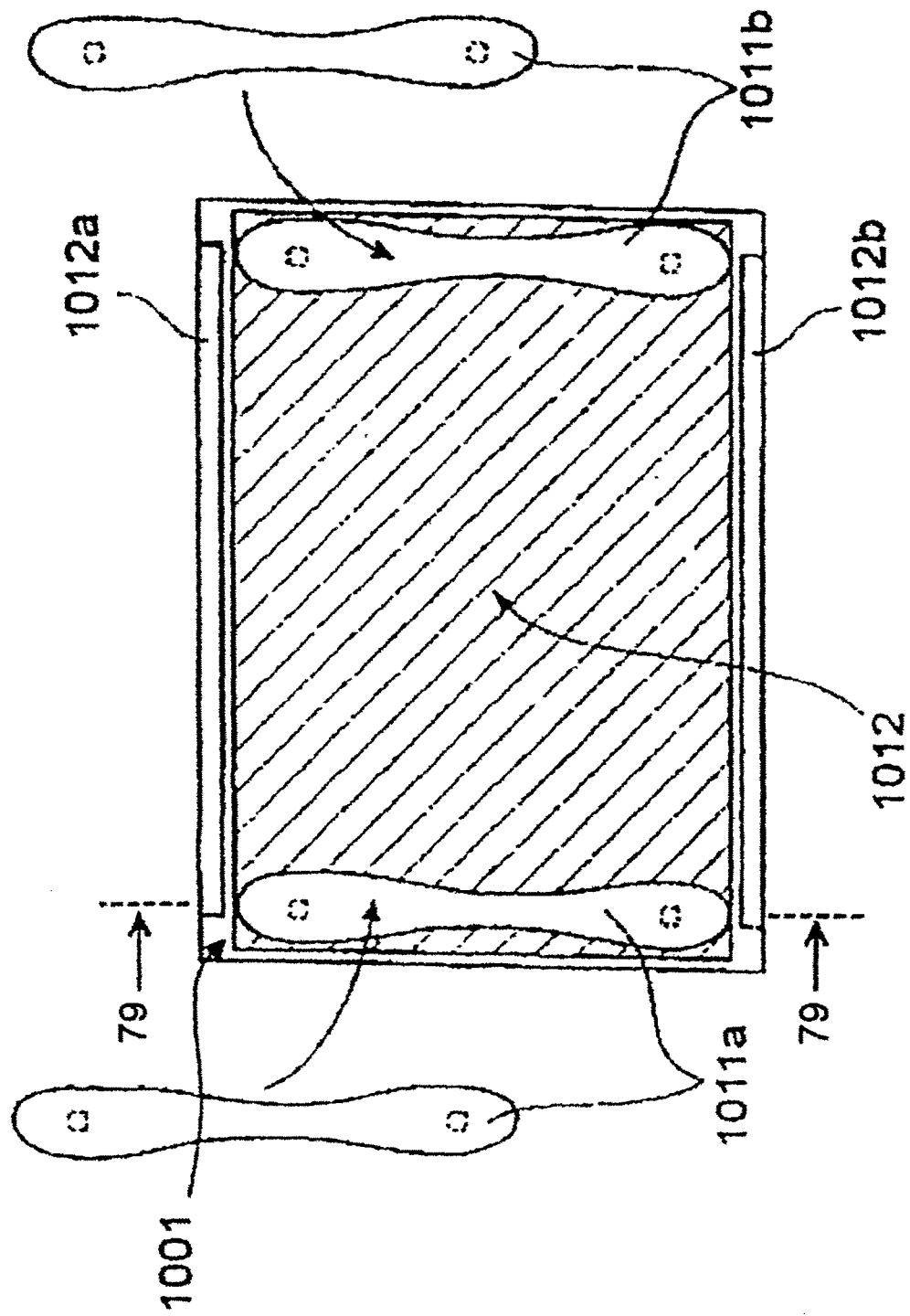
FIG. 78 is a plan view of a conventional toilet mat for a pet.
Figure 79:
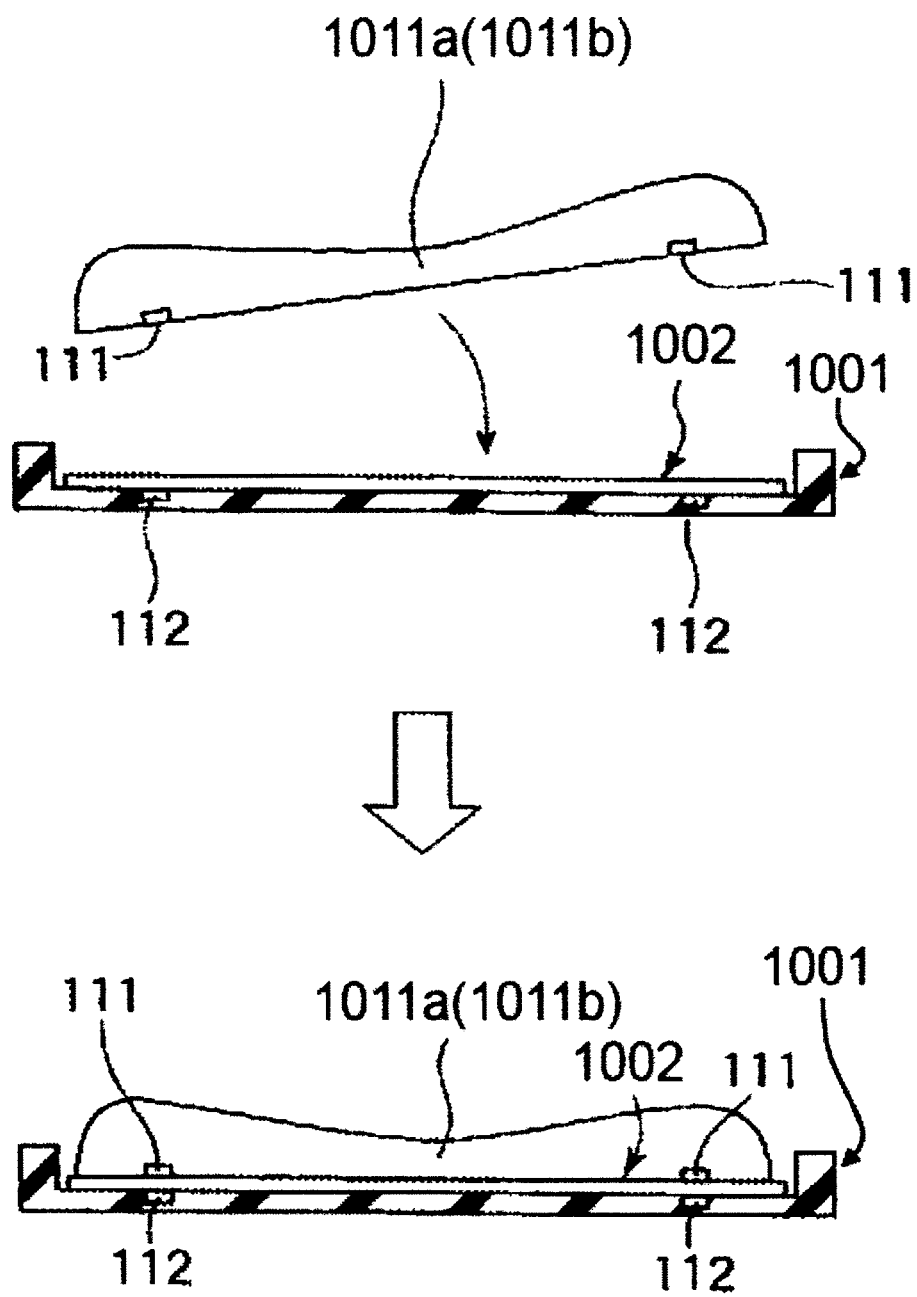
FIG. 79 is a sectional view of the toilet mat for a pet taken along a line 79-79 in FIG. 78.

Next, with reference to FIG. 77, described is a fourth alternative embodiment of the water absorbent sheet retaining mat M1. A water absorbent sheet retaining mat Mid according to this alternative embodiment has a construction similar to that of the water absorbent sheet retaining mat M1 shown in FIG. 3 except that the retaining member Pr1 is replaced with a retaining member Pr1c. In FIG. 77(a), shown is a perspective view of the water absorbent sheet retaining mat Mid focused on the retaining member Pr1c. In FIG. 77(b), shown is a plan view of the water absorbent sheet retaining mat M1d looking down a top surface of the retaining member Pr1c. In FIG. 77(c), shown is a side view of the water absorbent sheet retaining mat Mid focused on the retaining member Pr1c.

As described in the above with reference to FIG. 8, in the retaining member Pr1 (the retaining member Pr), the slit member S extends flat. More specifically, a plurality of claws Psru extend horizontally at the height t2. In contrast, the retaining member Pr1c is provided with a three-dimensionally formed, or dome-shaped slit member Sd instead of the slit member S, as shown in FIG. 77.

The slit member Sd is, as shown in FIG. 77(b), divided into a plurality of claws Psrud in a three-dimensional shape by slits SL as the slit member S is. The slit member Sd has a vertex (a tapered end of the claw Psrud) at the height t2 and a bottom (base of the claw Psrud) at a predetermined height t2b (t2>t2b). The claw Psrud projects upward from the top of peripheral wall Wr by a predetermined distance L2. That is, a top part of the peripheral wall Wr in a tubular shape forms the dome-shaped slit member Sd (claw Psrud).

The water absorbent sheet Sa is installed in the water absorbent sheet retaining mat Mid in a following manner. At least a portion of apexes of four corners of water absorbent sheet Sa is inserted into the slit member S by a predetermined length L measured from the top end of the slit member Sd (vertexes of claws Psrud). In contrast that the claw Psru is formed flat, the claw Psrud is formed convex in the top side and concave in the underside. Thanks to this construction, when the water absorbent sheet Sa is inserted in the retaining member Pr1c from a top surface Srud thereof, the claws Psrud easily deform downward (to the mat member Pm1). However, when pulling up the inserted water absorbent sheet Sa to remove from the retaining member Pr1c, the claws Psrud shall be forcibly deformed upward (in a direction for everting the claw Psrud). This is efficacious to prevent accidental removal of the water absorbent sheet Sa which is once installed.

As described in the above, the claws Psrud project upward (to an open space) by the predetermined distance L2 from the open end (upper end) of the peripheral wall Wr forming an enclosed space. Thus, in order to insert the edge portion of the water absorbent sheet Sa into the slit member Sd, it is possible to deform the claw Psrud downward by pushing thereof down by the predetermined distance L2 without being obstructed by the peripheral wall Wr.

In this specification, disclosed are various embodiments and alternative embodiments in which an example and alternative embodiments of the retaining member Pr1 are indicated. In any of embodiments or alternative embodiments, the retaining member Pr1c can be used instead of the retaining member Pr1 and alternatives thereof.

Second Embodiment

With reference to FIG. 15, FIG. 16, FIG. 17, FIG. 18, and FIG. 19, a water absorbent sheet retaining mat according to a second embodiment of the present invention is described below. A water absorbent sheet retaining mat M2 shown in FIG. 15 and FIG. 16 has the construction similar to that of the water absorbent sheet retaining mat M1 described in the above except that the mat member Pm1 and the retaining member Pr1 are replaced with a mat member Pm2 and a retaining member Pr2, respectively. In simple, in the retaining member Pr2 according to this embodiment, the two retaining members Pr1 are arranged to be adjacent to each other. There is a feature that a path connecting two retaining members Pr1 is provided in the water absorbent sheet retaining mat M2. The mat member Pm2 and the retaining member Pr2 are intensively described below.

Figure 17:
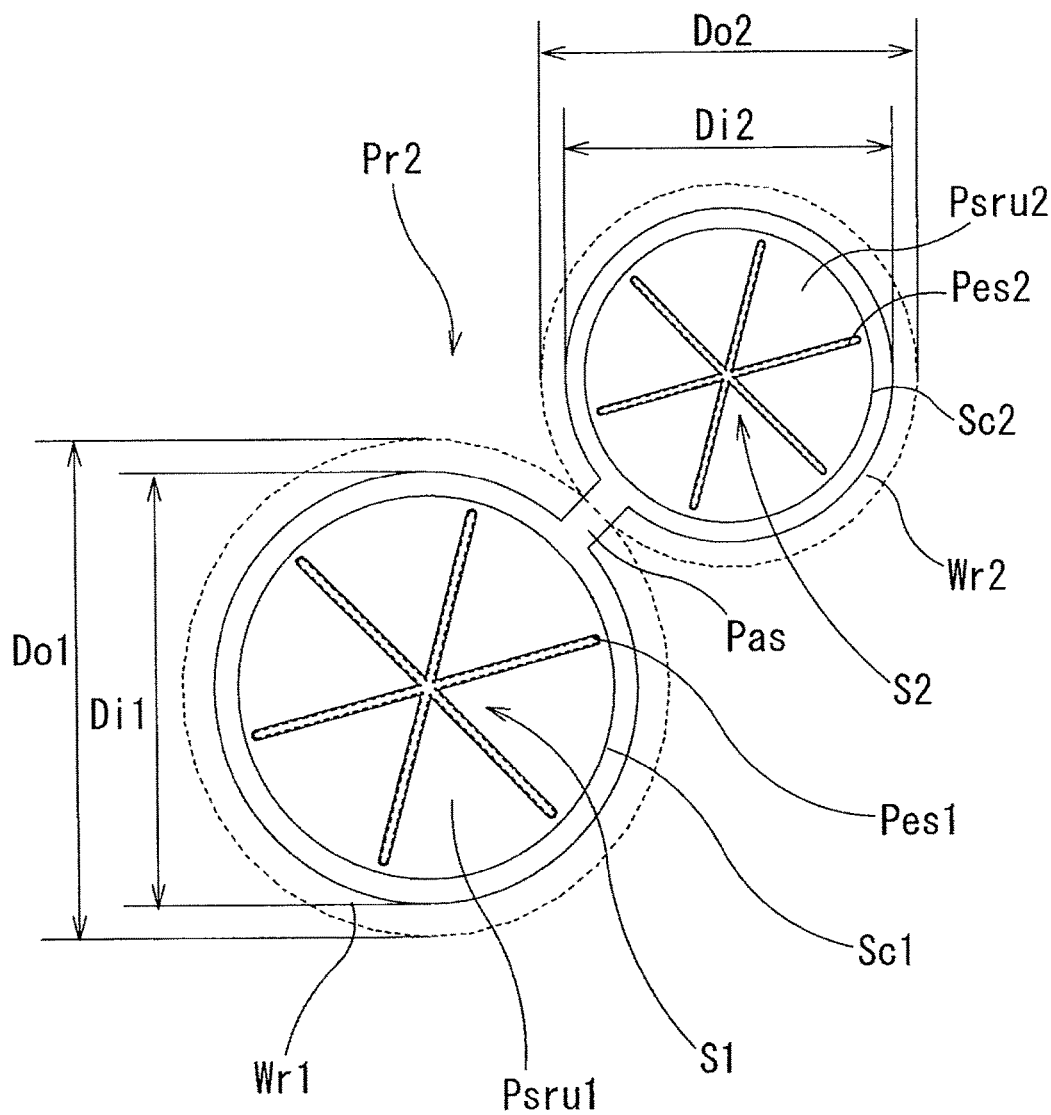
FIG. 17 is a plan view of a retaining member of the water absorbent sheet retaining mat shown in FIG. 15.

In the retaining member Pr2, provided are a plurality of (two, in the example shown in the figures) slit members S1 and S2 arranged to be adjacent to each other. Note that the slit members S1 and S2 have substantially the same construction as that of the slit member S described in the above. Specifically, a slit member S1 is provided in a top surface Sru1 supported by a tubular peripheral wall Wr1 defined by an inner diameter Di1 and an outer diameter Do1 (FIG. 17). Similarly, a slit member S2 is provided in a top surface Sru2 supported by a tubular peripheral wall Wr2 defined by an inner diameter Di2 and an outer diameter Do2 (FIG. 17). Further, the slit members S1 and S2 are arranged such that the centers thereof are located on the diagonal line of the mat member Pm2 and the peripheral walls Wr1 and Wr2 make a point contact. That is, the retaining member Pr2 according to the present embodiment is constructed of two of the retaining members Pr1 (the first embodiment) provided on the diagonal line such that the peripheral walls Wr1 and Wr2 have contact with each other.

In FIG. 17, shown is a plan view of the retaining member Pr2 seen from the sitting plane Sb side of the mat member Pm2. As mentioned above, the peripheral wall Wr1 and the peripheral wall Wr2 are arranged to be adjacent to each other. Note that a step Sc1 is provided between the peripheral wall Wr1 and claws Psru1, and a step Sc2 is provided between the peripheral wall Wr2 and claws Psru2, as in the retaining member Pr1 described in the above. In the bottom side of the mat member Pm2, a path Pas is formed such that the adjacent area of the peripheral walls Wr1 and Wr2 as well as the mat member Pm2 under the adjacent area are removed from the sitting place Sb to the under sides of the top surfaces of Sru1 and Sru2. Note that the claws Psru1 and the claws Psru2 are surrounded by the step Sc1 and the step Sc2, respectively.

That is, space defined by the peripheral wall Wr1 communicates with space defined by the peripheral wall Wr2 via the path Pas. Although a part of the peripheral wall Wr1 and a part of the peripheral wall Wr2 are removed to form the path Pas, the claws Psru1 and the claws Psru2 are provided with the step Sc1 and the step Sc2, respectively. In other words, the provision of the steps Sc1 and Sc2 compensates for a decrease in strength of the retaining member Pr2 due to the partial removal of the peripheral walls Wr1 and Wr2 to form the path Pas. Resultantly, an excessive deformation of the claws Psru1 and Psru2 when the water absorbent sheet Sa1 is inserted into the slit members S1 and S2 or removed therefrom is prevented. The installation and uninstallation of the water absorbent to sheet Sa1 is thus ensured, and end portions Pes1 and Pes2 are prevented from being lacerated. Even if any laceration occurs in the end portions Pes1 and Pes2, such laceration is prevented from growing (particularly extending over both the end portion Pes1 and the end portion Pes2).

The inner diameters Di1 and Di2 of the peripheral walls Wr1 and Wr2 should be about as large as to accept a finger of a person (a user of the water absorbent sheet retaining mat) therein. The inner diameters Di1 and Di2 have a relationship of Di1>Di2 in the example shown in the figures, but not limited thereto. The path Pas is wide enough to allow an edge of the water absorbent sheet Sa1 to pass therethrough.

Regarding the locations of the slit members S1 and S2, the location of the slit member S1 on the mat member Pm2 is determined similarly as the location of the slit member S of the retaining member Pr1. That is, a distance between the centers of neighboring two slit members S1 and S1 is substantially the same as either of the short side Lssa and the long side Llsa of the absorption area Spa in the water absorbent sheet Sa1. The slit member S2 is located in a position adjacent to the slit member S1 and shifted from the slit member S1 toward the centrifugal direction (close to the side of outer contour of the water absorbent sheet Sa1).

Described briefly below is procedures to attach the water absorbent sheet Sa1 to the water absorbent sheet retaining mat M2 constructed as above. Firstly, the water absorbent sheet Sa1 is laid on the laying plane St of the mat member Pm2 with the back side down. Then, at least a part of the corner portion Spc of the water absorbent sheet Sa1 is inserted in the slit member S1 of the retaining member Pr2. Next, the corner portion Spc inserted in the slit member S1 is drawn through the path Pas. Then, the corner portion Spc is inserted in the slit member S2 from the side of the sitting plane Sb toward the side of the laying plane St. FIG. 17 shows the example in which the inner diameters Di1 and Di2 are set to have a relationship of Di1>Di2, in consideration of the fact that an edge of the sheet brim member Spr (the water absorbent sheet Sa1) is inserted in the slit member S2 and a portion of the sheet brim member Spr adjacent to the absorption area Spa is inserted in the slit member S1. The above-described procedures will be described in detail with reference to FIG. 26. Note that the steps Sc1 and Sc2 are not always necessary, if the retaining member Pr2 or the claws Psru1 and Psru2 are strong enough. Also, either or both of the slit member S1 and the slit member S2 in the retaining member Pr2 can be provided with the rim Sr described with reference to FIG. 5, FIG. 8, and FIG. 9.

Figure 18:
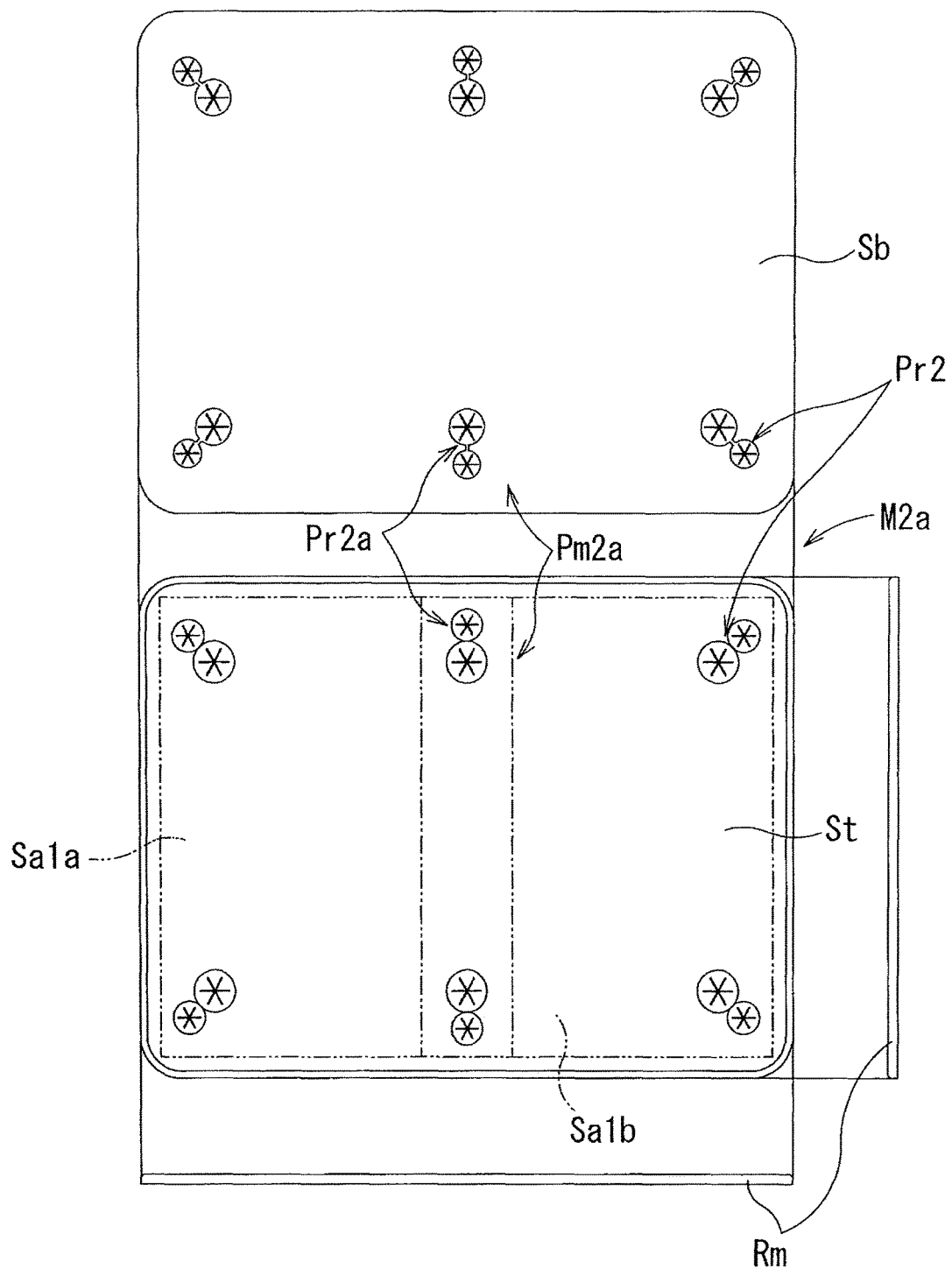
FIG. 18 is a diagram showing a construction of an alternative embodiment of the water absorbent sheet retaining mat shown in FIG. 15.
Figure 19:
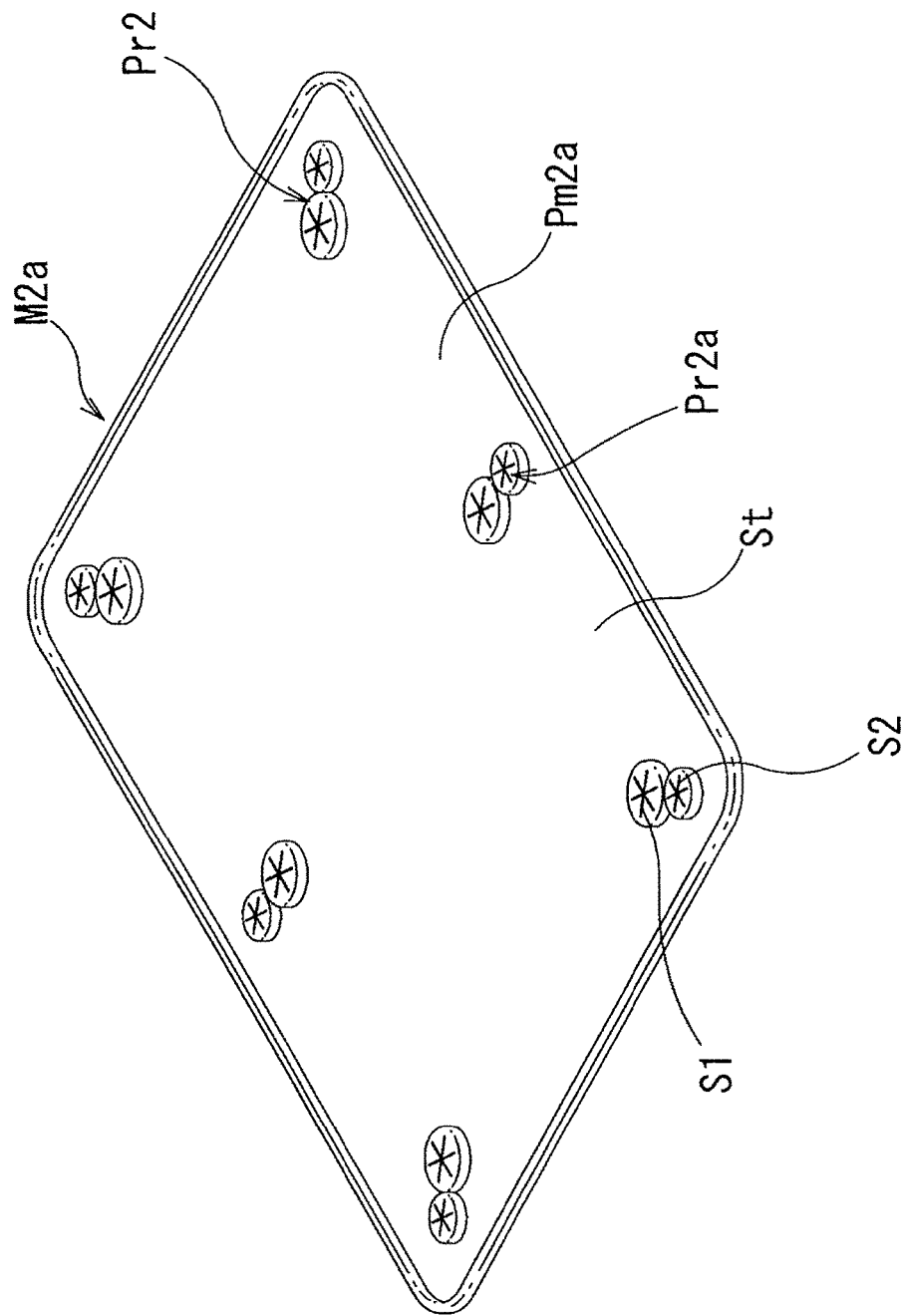
FIG. 19 is a perspective view of the water absorbent sheet retaining mat shown in FIG. 18.

Next, with reference to FIG. 18 and FIG. 19, described is an alternative embodiment of the water absorbent sheet retaining mat M2. In a manner similar to that for the water absorbent sheet retaining mat M1a described with reference to FIG. 11 and FIG. 12, a water absorbent sheet retaining mat M2a is used for retaining two regular sized water absorbent sheets Sa1a and Sa1b laid on the laying plane St with a portion thereof being overlapped. The water absorbent sheet retaining mat M2a can be used for retaining a single of wide sized water absorbent sheet laid on the laying plane St.

The water absorbent sheet retaining mat M2a has a construction similar to that of the water absorbent sheet retaining mat M2 except that the mat member Pm2 is replaced with a mat member Pm2a and a retaining member Pr2a is additionally provided. The mat member Pm2a and the retaining member Pr2a are intensively described below.

Arrangement of the retaining members Pr2 and the retaining members Pr2a is determined according to the construction of two water absorbent sheets Sa1a and Sa1b to be retained. Four pieces of retaining members Pr2 are arranged such that their respective slit members S1 are located in the positions corresponding to two pieces of corner portions Spc of the water absorbent sheet Sa1a and two pieces of corner portions Spc of the water absorbent sheet Sa1b when the water absorbent sheets Sa1a and Sa1b are laid on the laying plane St.

The retaining members Pr2a are provided such that their respective slit members S1 are located in the positions corresponding about a center on a line connecting the slit members S1 of the neighboring retaining members Pr2 and Pr2. The slit members S2 are located adjacent to the slit members S1 and shifted from the slit members S1 toward the centrifugal direction (close to the side of outer contour of the water absorbent sheet Sa1).

Third Embodiment

With reference to FIG. 20, FIG. 21, FIG. 22, FIG. 23, FIG. 24, FIG. 25, FIG. 26, FIG. 27, FIG. 28, FIG. 29, FIG. 30, FIG. 31, and FIG. 32, a water absorbent sheet retaining mat according to a third embodiment of the present invention is described below. FIG. 27 shows a state in which a water absorbent sheet retaining mat M3 is used. The water absorbent sheet retaining mat M3 has a construction similar to that of the water absorbent sheet retaining mat M2 described in the above except that the mat member Pm2 and the retaining member Pr2 are replaced with a mat member Pm3 and a retaining member Pr3, respectively. The mat member Pm3 and the retaining member Pr3 are intensively described below.

Figure 20:
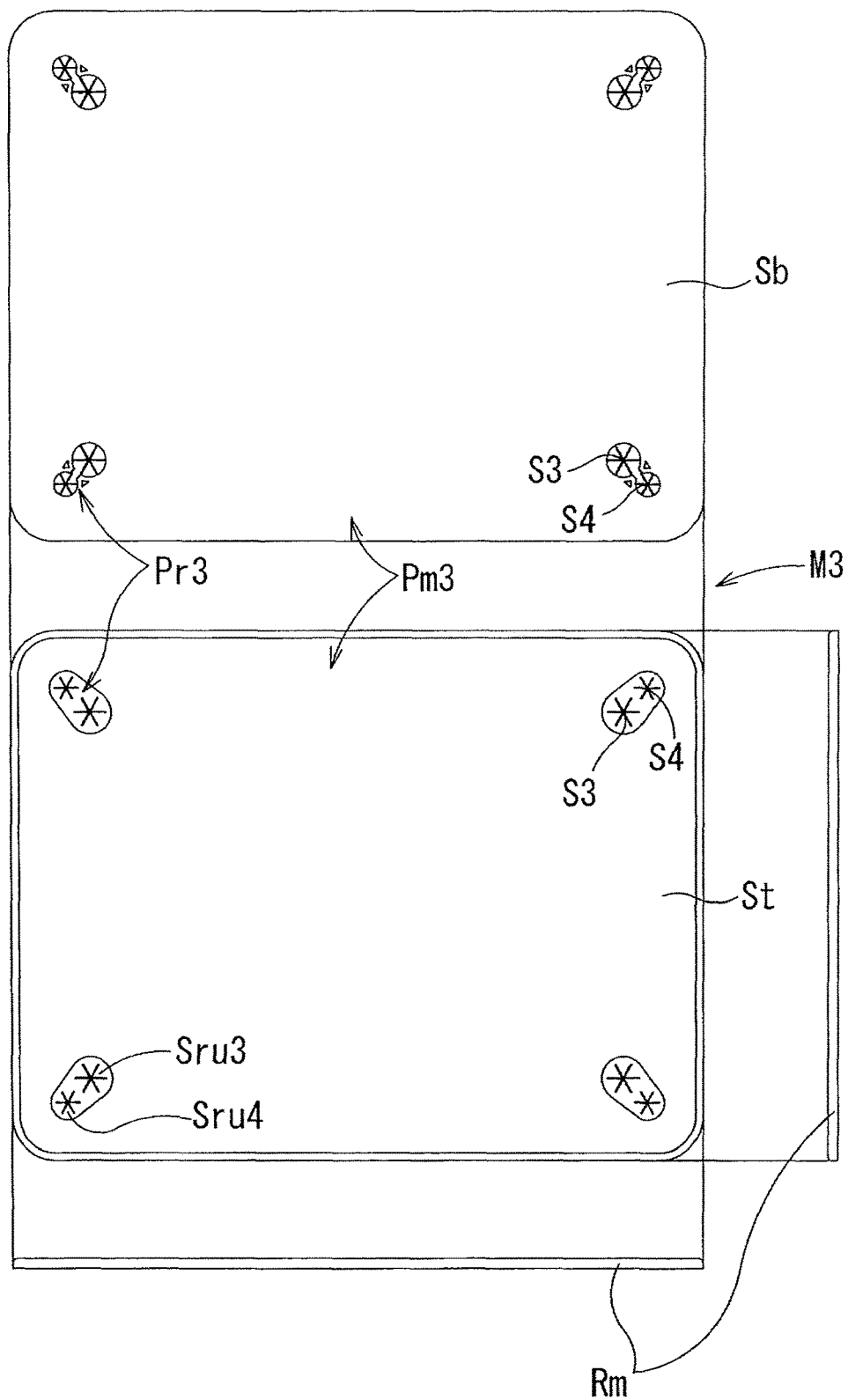
FIG. 20 is a diagram showing a construction of a water absorbent sheet retaining mat according to a third embodiment of the present invention.
Figure 21:
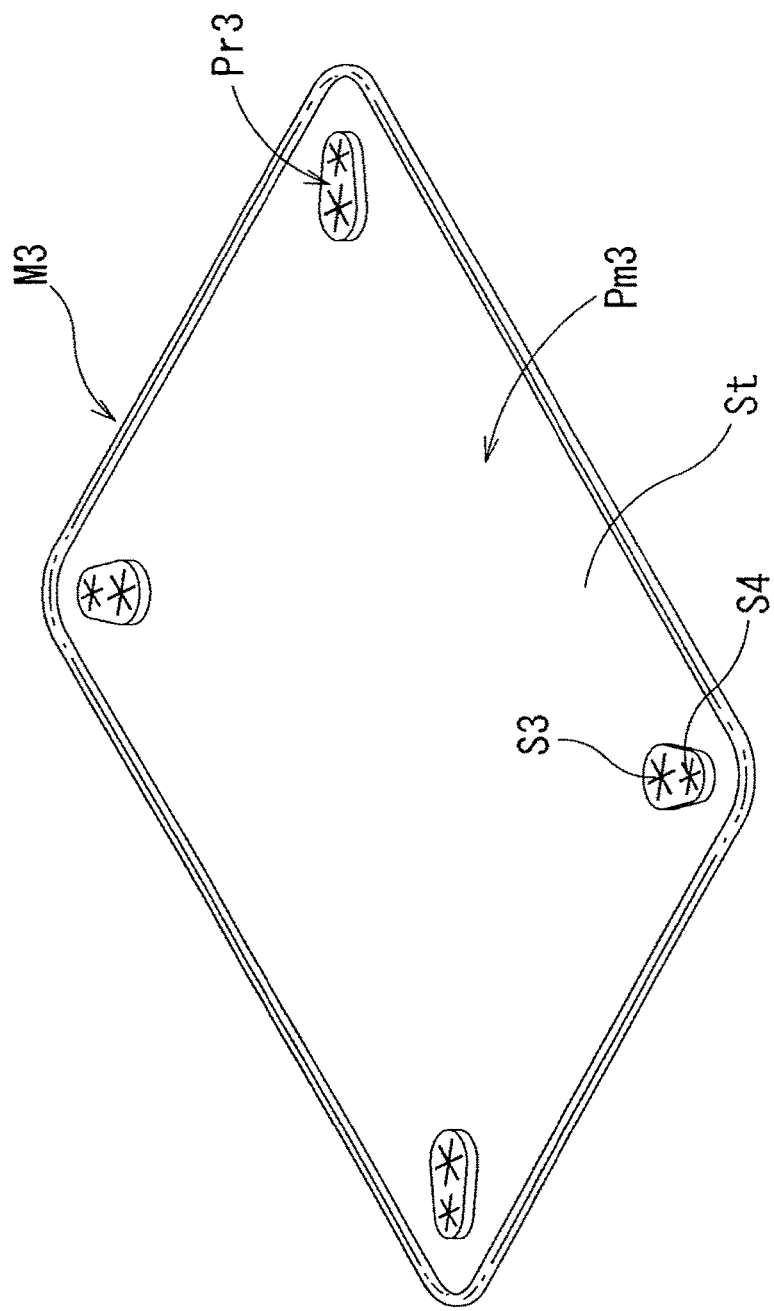
FIG. 21 is a perspective view of the water absorbent sheet retaining mat shown in FIG. 20.

As shown in FIG. 20 and FIG. 21, the retaining member Pr3 is constructed such that a plurality of (two, for example) slit members S3 and S4 are integrally provided. Thanks to this construction, a distance between the centers of the slit members S3 and S4 is smaller than a distance between the centers of the slit members S1 and S2 of the retaining member Pr2 described in the above, thereby ensuring a sufficient length of a portion of the water absorbent sheet Sa1 (the sheet brim member Spr) to be inserted in the slit member S4 located outside.

Figure 22:
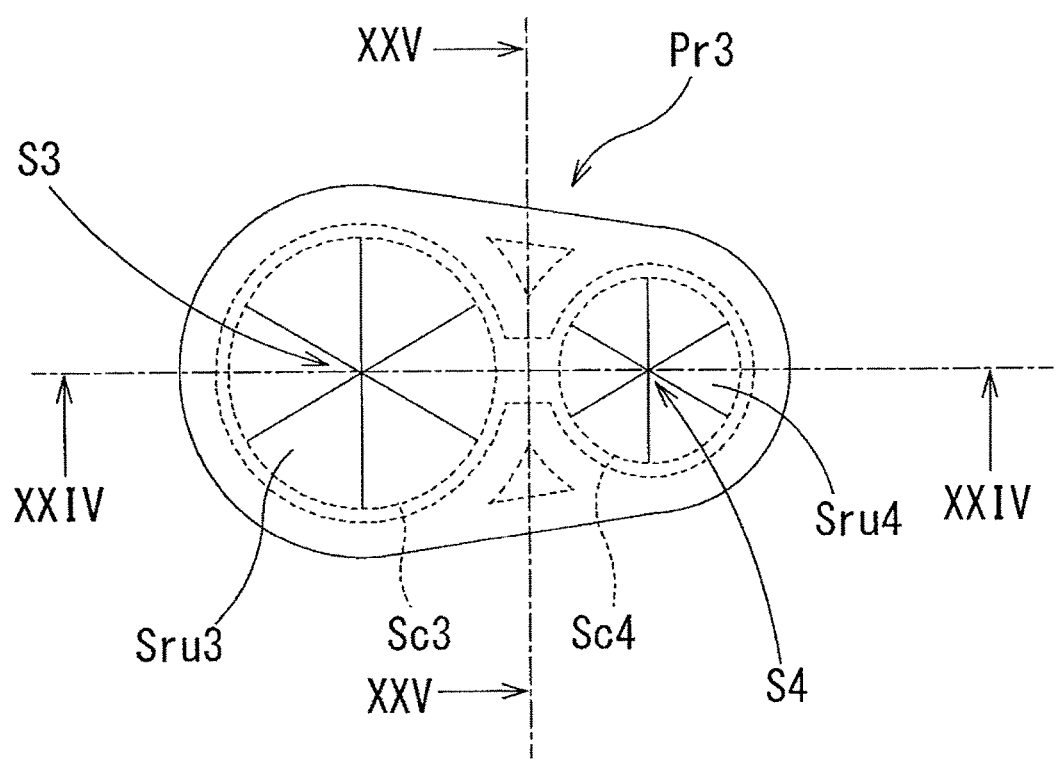
FIG. 22 is a top view of a retaining member of the water absorbent sheet retaining mat shown in FIG. 20.
Figure 23:
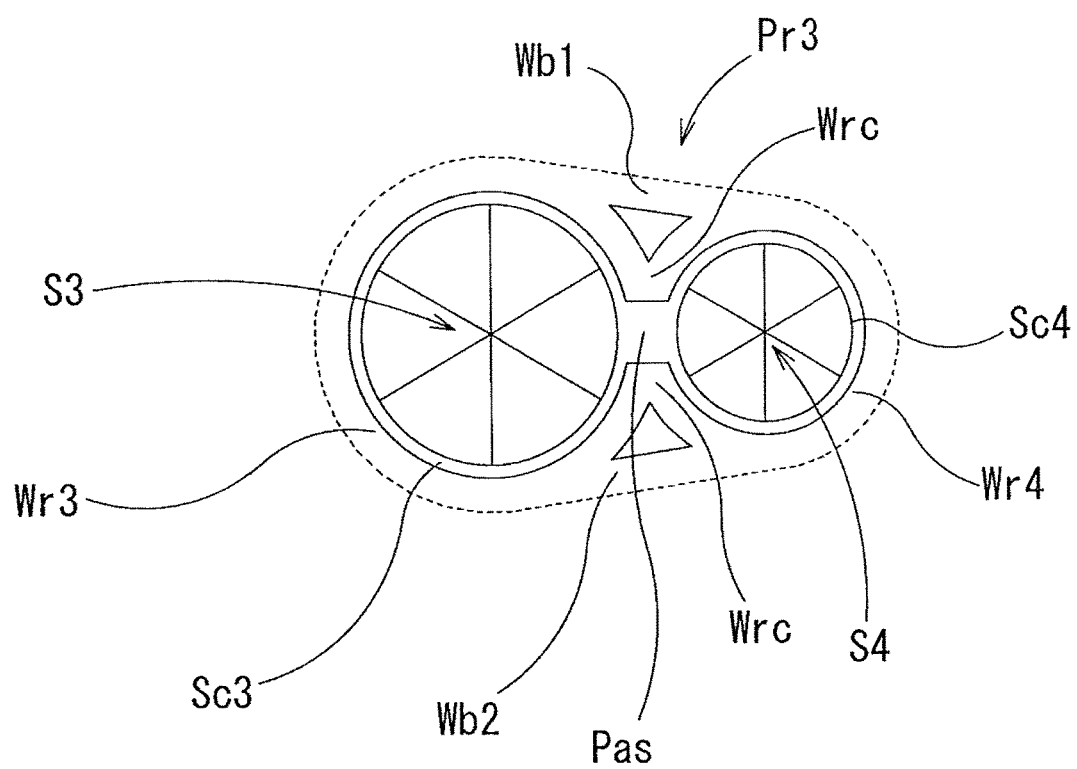
FIG. 23 is a bottom view of the retaining member shown in FIG. 22.

As can be seen from FIG. 22 and FIG. 23, the slit members S3 and S4 are arranged to be adjacent to each other, sharing a portion of their respective peripheral walls Wr3 and Wr4. The distance between the centers of the slit members is made small by a length of the shared portion of the peripheral wall Wr3 (or the peripheral wall Wr4). However, the overall strength of the peripheral wall Wr3 and peripheral wall Wr4 is somewhat lower than that of the peripheral wall Wr1 and peripheral wall Wr2 in the second embodiment, due to sharing the portion thereof.

Figure 24:
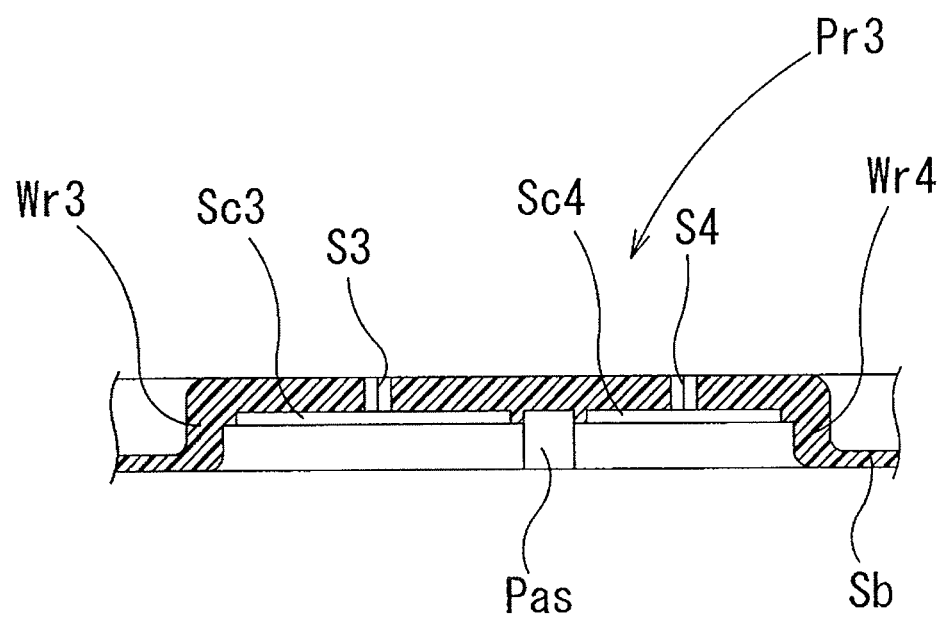
FIG. 24 is a sectional view of the retaining member taken along a line XXIV-XXIV in FIG. 22.
Figure 25:
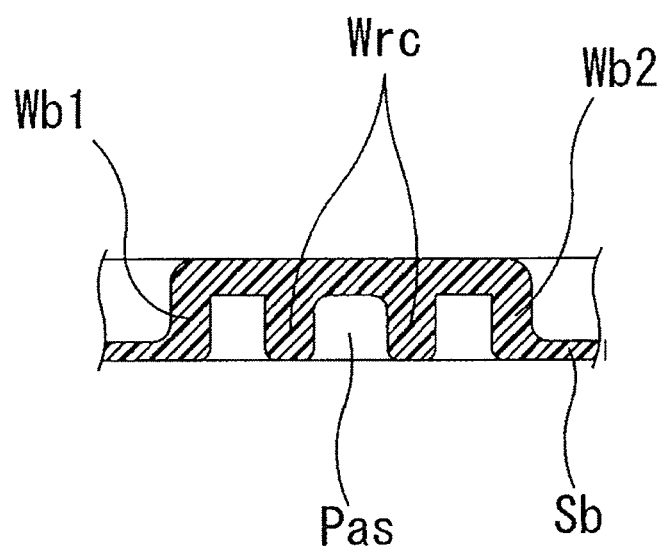
FIG. 25 is a sectional view of the retaining member taken along a line XXV-XXV in FIG. 22.

In FIG. 23, shown is the retaining member Pr3, looked from the side of the sitting place Sb of the mat member Pm3. As described in the above, the peripheral wall Wr3 and the peripheral wall Wr4 share a portion. This shared portion is partially removed from the sitting plane Sb of the mat member Pm3 to the underside of top surfaces Sru3 and Sru4, forming the path Pas (FIG. 24). Then, provided are walls Wb1 and Wb2, each tangential to both the peripheral walls Wr3 and Wr4, to integrally connect and environs thereof. From FIG. 25 wherein a cross sectional shape of the retaining member Pr3 taken along a line perpendicular to the path Pas is shown, recognized are the wall Wb1, a shared portion Wrc, and the wall Wb2.

Specifically, between the wall Wb1 and the shared portion Wrc a truss is constructed with the wall Wb1 and the shared portion Wrc as well as between the shared portion Wrc and the wall Wb2 a truss is constructed with the shared portion Wrc and the wall Wb2, as shown in FIG. 23. This truss structure reinforces the retaining member Pr3. Instead of the truss structures with the wall Wb1 and the shared portion Wrc as well as with the shared portion Wrc and the wall Wb2, it is possible to construct the retaining member Pr3 without forming the spaces between the wall Wb1 and the shared portion Wrc as well as between the shared portion Wrc and the wall Wb2 (In short, in the case shown in FIG. 25, only the path Pas is formed).

In this structure, possible reduction of the strength of the peripheral walls Wr3 and Wr4 due to the removal of the shared portion from the peripheral walls Wr3 and Wr4 as well as is the sharing of a portion by the peripheral walls Wr3 and Wr4 is compensated by steps Sc3 and Sc4 as well as the walls Wb1 and Wb2. Resultantly, a distance between the slit members S3 and S4 is set small so that a laceration in end portions Pes3 or Pes4 can be prevented, securing the amount of insertion of the water absorbent sheet Sa1 into the slit member S4. Even if any laceration happens in the end portion Pes3 or Pes4, the laceration is prevented from growing (especially, over the end portions Pes3 and Pes4).

Figure 26:
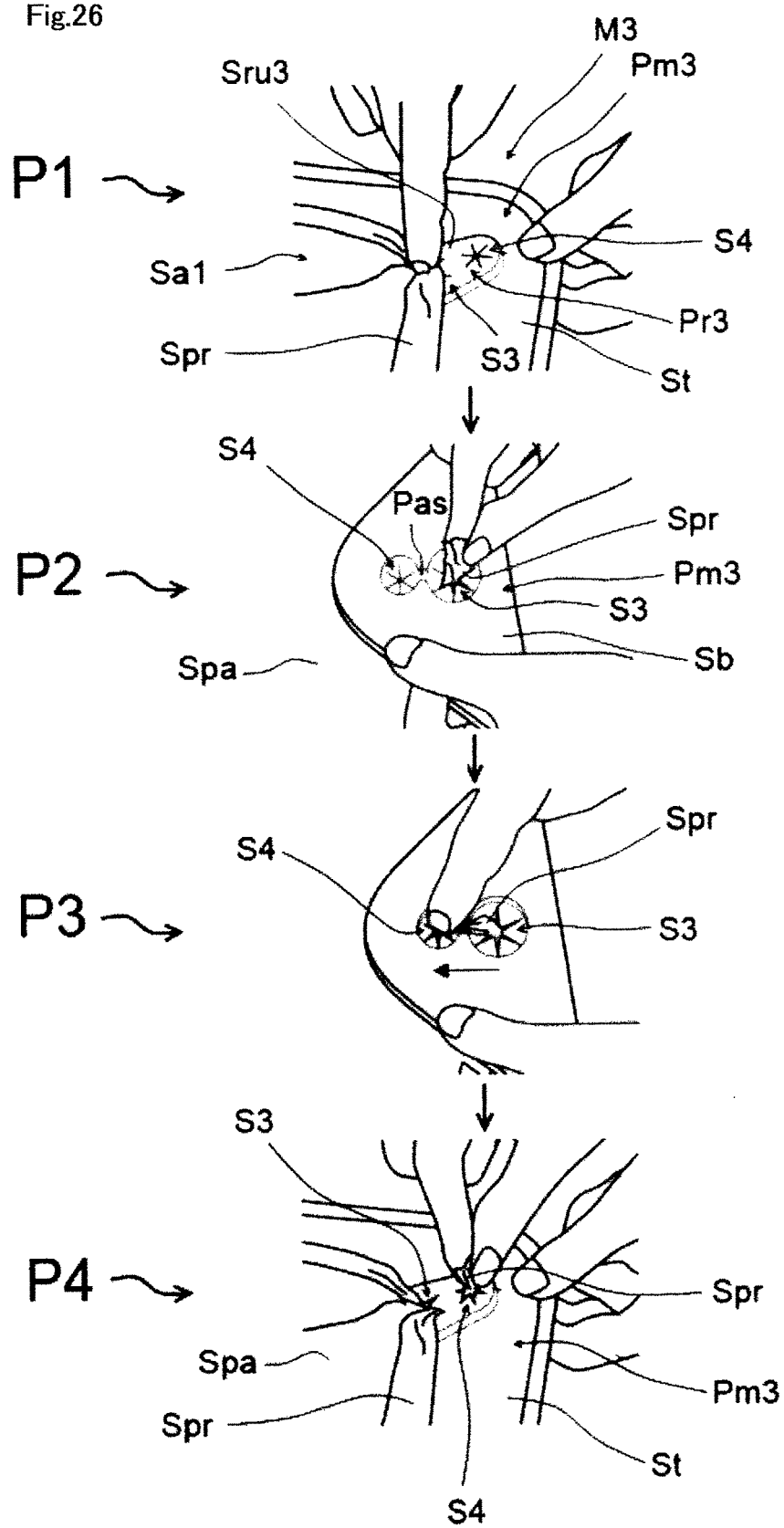
FIG. 26 is an explanatory view showing procedures to attach a water absorbent sheet to the water absorbent sheet retaining mat shown in FIG. 20.
Figure 27:
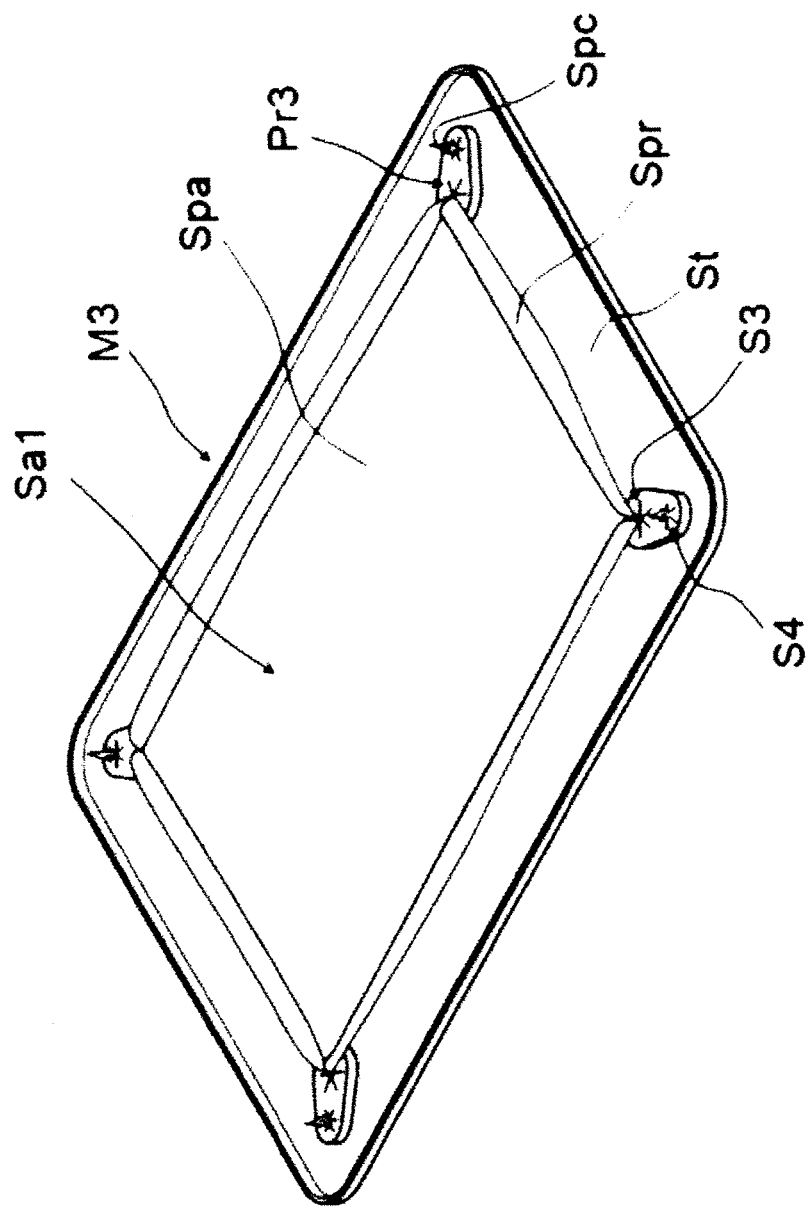
FIG. 27 is a perspective view of the water absorbent sheet retaining mat shown in FIG. 20 in use.

Next, with reference to FIG. 26 and FIG. 27, specifically described is procedures to install the water absorbent sheet Sa1 to the water absorbent sheet retaining mat M3. In FIG. 26, the installation procedures of the water absorbent sheet Sa1 is illustrated in 4 phases P1, P2, P3, and P4. Firstly, in the first phase P1, the water absorbent sheet Sa1 is placed on the laying plane St of the mat member Pm3. The corner tip of the sheet brim member Spr of the water absorbent sheet Sa1 is inserted in the slit member S3 from the top surface Sru3 of the retaining member Pr3.

In the second phase P2, the mat member Pm3 is bent up so as to turn up the sitting plane Sb. Then, the tip of the sheet brim member Spr, being inserted from the top surface Sru3, is pulled out from the slit member S3 until the corner of the absorption area Spa gets close to the center of the slit member S3.

In the third phase P3, the tip of sheet brim member Spr being pulled out is led to the side of slit member S4 through the path Pas. Then, the tip of the sheet brim member Spr is pushed into the slit member S4.

In the fourth phase P4, the mat member Pm3 bent up in the second phase P2 is unbend so as to turn up the side of laying plane St. Then, the tip of the sheet brim member Spr being pushed into the slit member S4 in the third phase is pulled up from the top surface of the slit member S4 such that the sheet brim member Spr is accommodated in the path Pas.

After the above mentioned 4 phases P1 to P4, as shown in FIG. 27, the water absorbent sheet Sa1 is installed in the mat member Pm3 such that the sheet brim member Spr is standing around the absorption area Spa. The sheet brim member Spr pulled to the sitting plane Sb side is accommodated in the path Pas and will not be an obstacle to that the mat member Pm3 (sitting plane Sb) sit on a floor or a table where the mat member Pm3 is laid. The sheet brim member Spr will not deform the mat member Pm3. As a result, the water absorbent sheet retaining mat M3 (the mat member Pm3) is placed along the floor or the table, and is free from deforming the water absorbent sheet Sa1 being installed therein and sliding on the floor or the table.

Next, with reference to FIG. 28, described is the attaching/detaching strength of the water absorbent sheet Sa1 (FIG. 27) installed in the water absorbent sheet retaining mat M3 in the above described manner.

From the experiment, it is observed that a pulling force (tensile strength) required for uninstalling the water absorbent sheet Sa1 attached to only the slit member S3 and to both the slit members S3 and S4 are 206 gf and 453.5 gf, respectively, on the average. Thus, it is confirmed that the water absorbent sheet Sa1 can satisfactorily be retained even with the slit members S3 alone.

Figure 29:
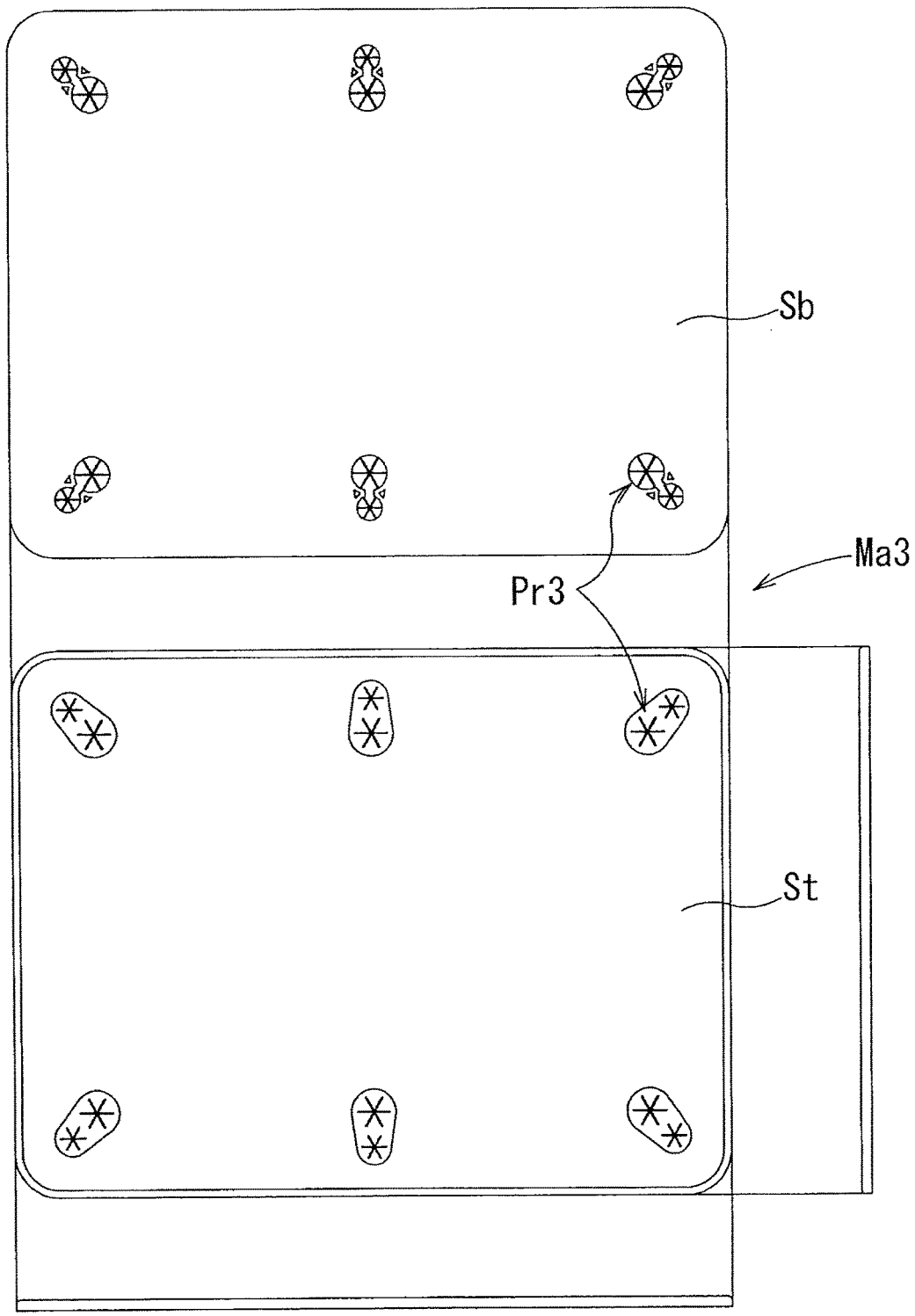
FIG. 29 is a diagram showing a construction of a first alternative embodiment of the water absorbent sheet retaining mat shown in FIG. 20.
Figure 30:
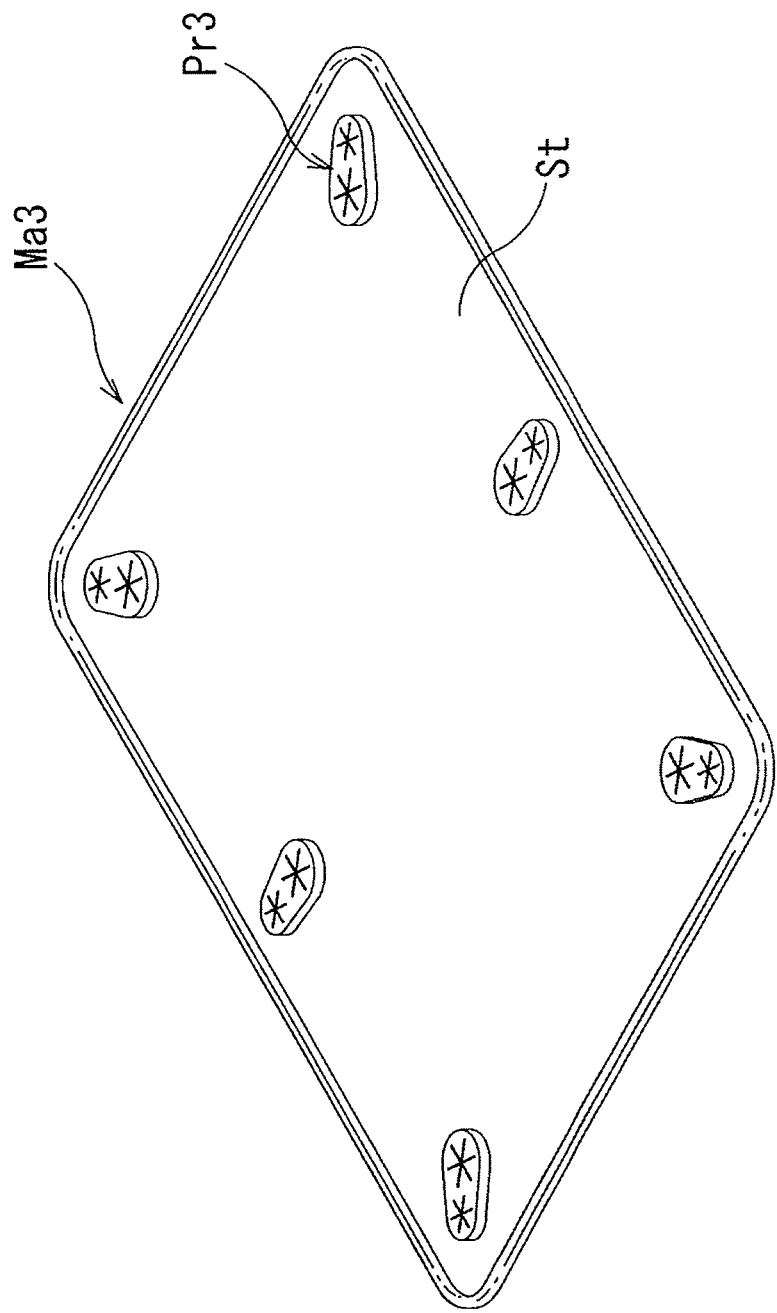
FIG. 30 is a perspective view of the water absorbent sheet retaining mat of FIG. 29.

Next, described with reference to FIG. 29 and FIG. 30 is a first alternative embodiment of the water absorbent sheet retaining mat M3. A water absorbent sheet retaining mat M3a is constructed by modifying the water absorbent sheet retaining mat M2a described with reference to FIG. 18 and FIG. 19, such that the retaining members Pr2 are replaced with the retaining members Pr3.

Figure 31:
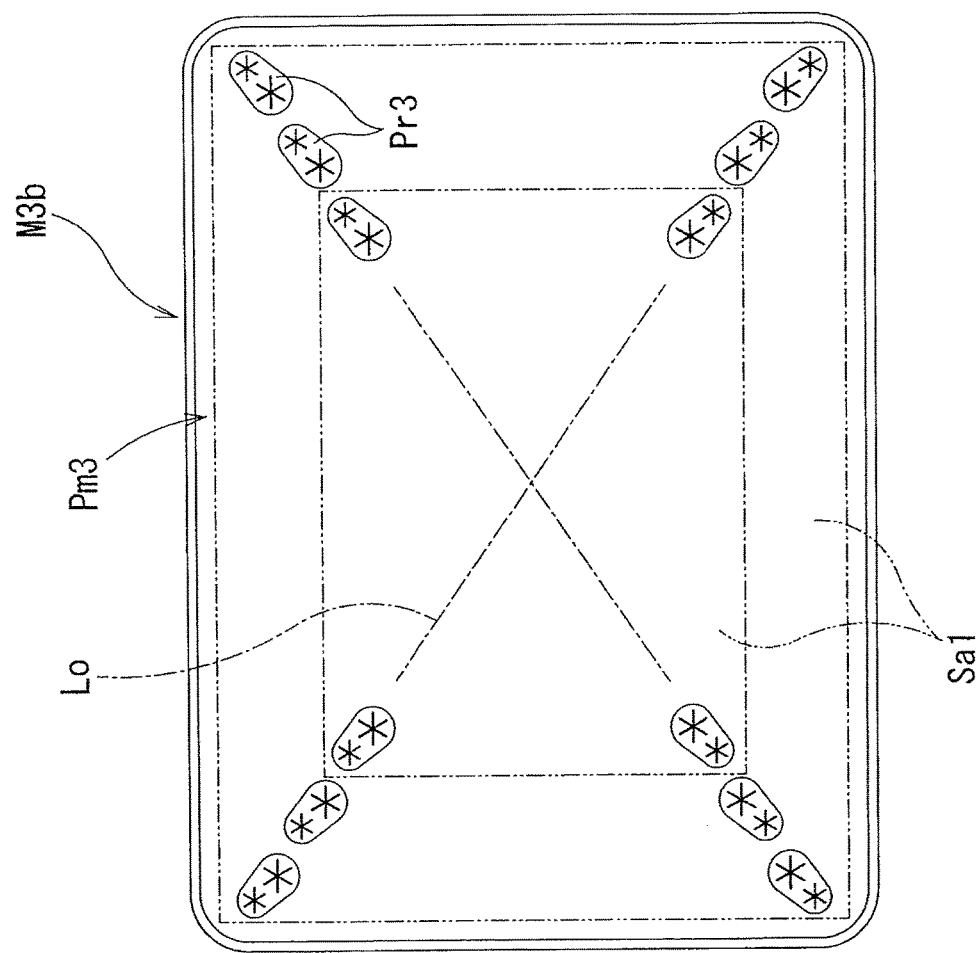
FIG. 31 is a plan view showing a second alternative embodiment of the water absorbent sheet retaining mat shown in FIG. 20.

Next, described with reference to FIG. 31 is a second alternative embodiment of the water absorbent sheet retaining mat M3. A water absorbent sheet retaining mat M3b is constructed by modifying the water absorbent sheet retaining mat M3 described with reference to FIG. 20 and FIG. 21, such that a plurality of retaining members Pr3 are provided on the diagonal lines Lo of the mat member Pm3. This enables the retaining of the water absorbent sheets Sa1 of different sizes by the same water absorbent sheet retaining mat M3b. Furthermore, the water absorbent sheet Sa1, when used for collecting pet's excreta, of much greater size according to the pet's growth can be installed.

Figure 32:
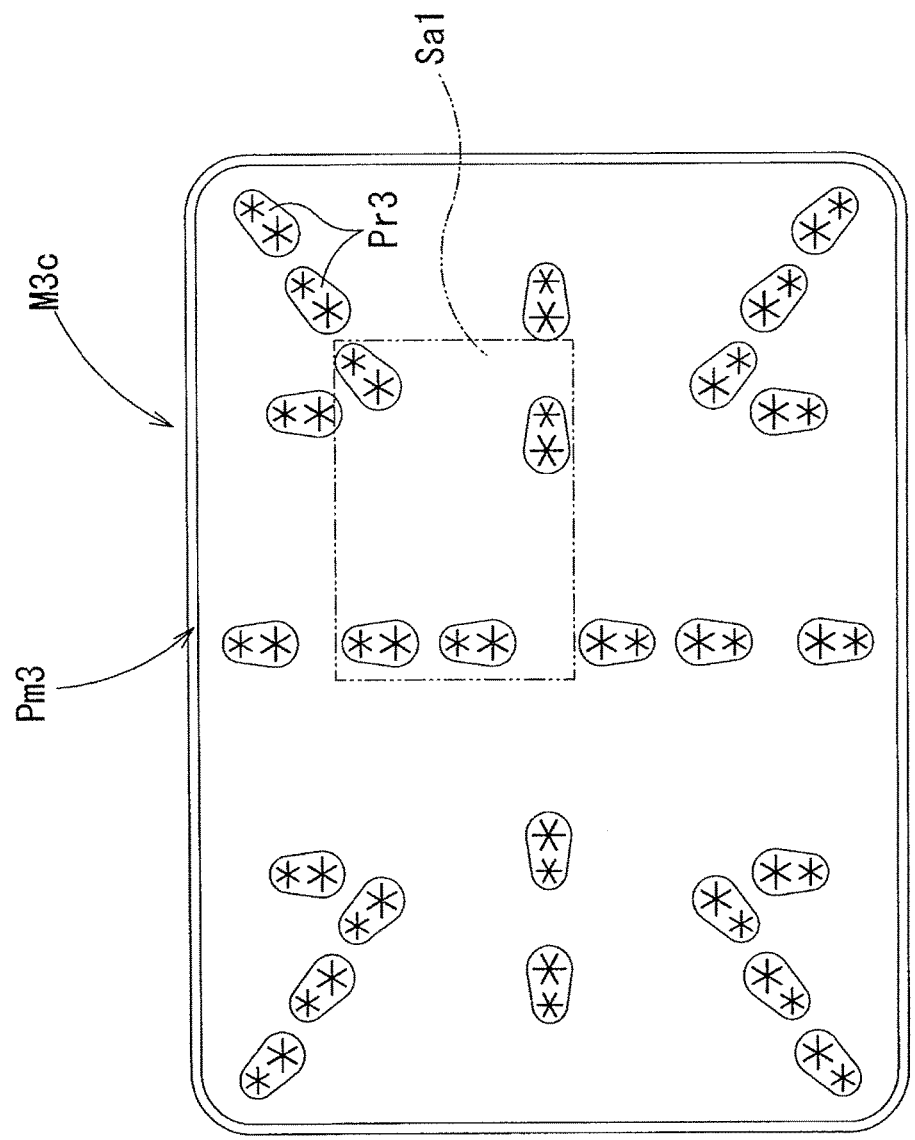
FIG. 32 is a plan view showing the second alternative embodiment of the water absorbent sheet retaining mat shown in FIG. 20.

Next, described with reference to FIG. 32 is a third alternative embodiment of the water absorbent sheet retaining mat M3. A water absorbent sheet retaining mat M3c is constructed by modifying the water absorbent sheet retaining mat M3b described with reference to FIG. 31 such that a plurality of retaining members Pr3 are additionally provided in other positions than on the diagonal lines Lo. Water absorbent sheets Sa1 of different sizes can be installed in the mat member Pm3 of the same water absorbent sheet retaining mat M3c in different poses and positions.

Fourth Embodiment

Figure 33:
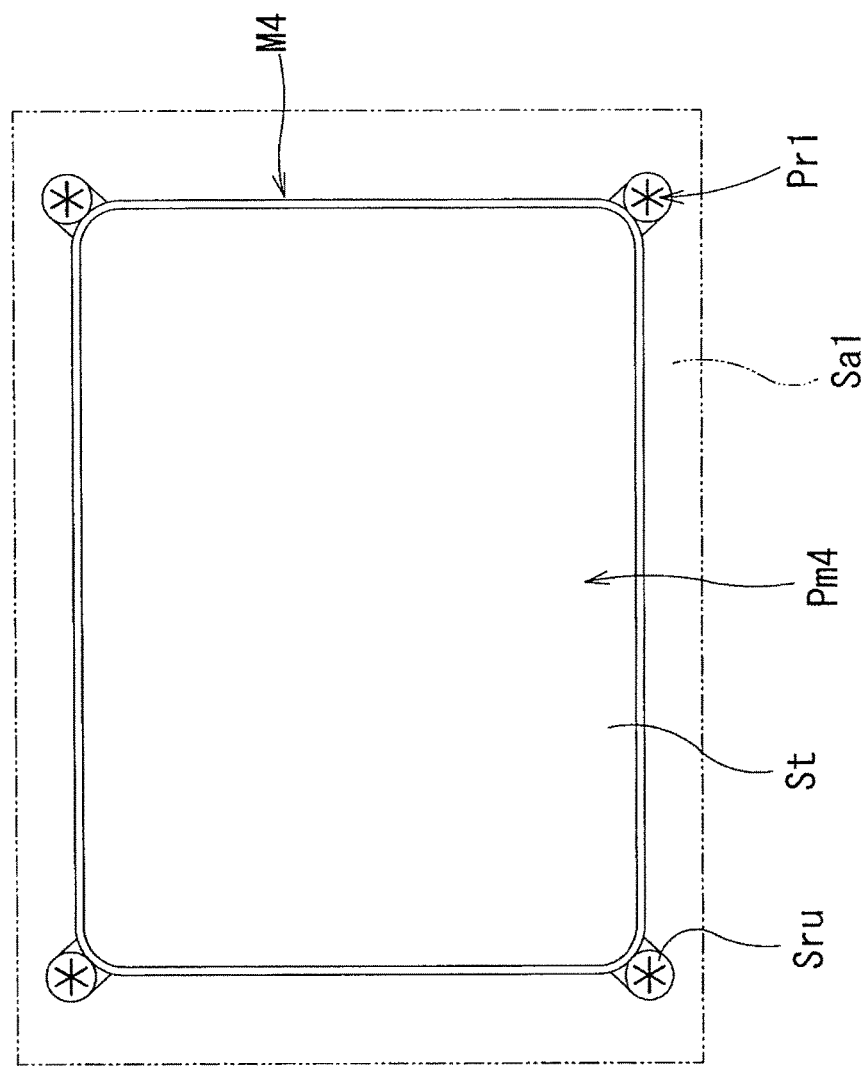
FIG. 33 is a plan view of a water absorbent sheet retaining mat according to a fourth embodiment of the present invention.

With reference to FIG. 33, described is a water absorbent sheet retaining mat according to a fourth embodiment of the present invention. A water absorbent sheet retaining mat M4 has a construction similar to that of the above described water absorbent sheet retaining mat M1 except that the mat member Pm1 is replaced with a mat member Pm4. In short, the mat member Pm4 is configured to have an outer shape smaller than an outer shape of the water absorbent sheet Sa1. The retaining member Pr1 is provided adjacent to or close to an outer perimeter of the mat member Pm4 such that the top surface Sru is located above the laying plane St.

Resultantly, the water absorbent sheet Sa1 can also be installed in the mat member Pm4 smaller than the mat member Pm1. It is allowed to construct such that the retaining member Pr1 and the outer perimeter of the mat member Pm4 share a portion of peripheral walls thereof in a manner described in the above with reference to FIG. 22. It is allowed to provide the retaining members Pr2 and Pr3 adjacent to or close to outer perimeters of the mat member Pm2 and Pm3 with any of the water absorbent sheet retaining mats M2, M2a, M3, M3a, M3b, and M3c according to the second and third embodiments and the alternative embodiments thereof, as in the present embodiment.

Fifth Embodiment

Figure 34:
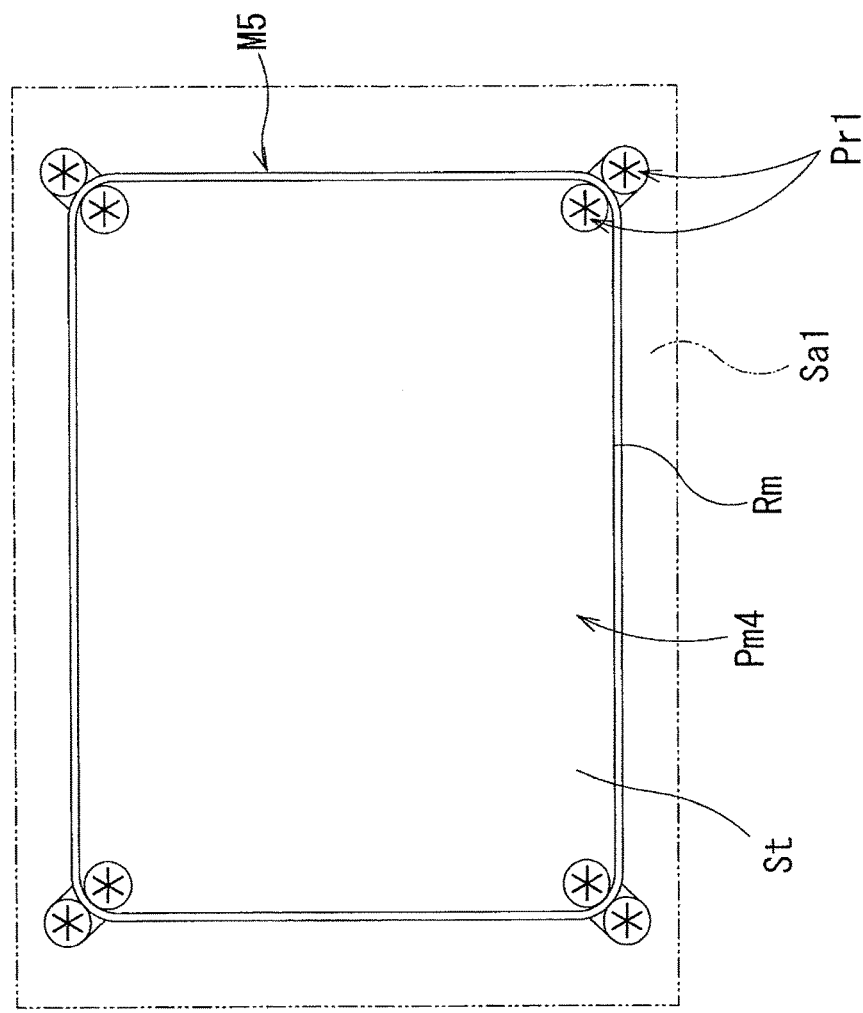
FIG. 34 is a plan view of a water absorbent sheet retaining mat according to a fifth embodiment of the present invention.

With reference to FIG. 34, described is a water absorbent sheet retaining mat according to a fifth embodiment of the present invention. A water absorbent sheet retaining mat M5 is provided with the retaining member Pr1 adjacent to or close to the inner periphery of the mat frame member Rm of the mat member Pm4 of the above described water absorbent sheet retaining mat M4. Resultantly, the water absorbent sheet retaining mat M5 can retain the water absorbent sheet Sa1 whose absorption area Spa is rather smaller than that the water absorbent sheet retaining mat M4 can retain.

It is allowed to construct such that the retaining member Pr1 and the mat frame member Rm of the mat member Pm4 share a portion of peripheral walls thereof in a manner described in the above with reference to FIG. 22. Further, it is allowed to form a path communicating both the spaces inside the neighbouring retaining members Pr1 and Pr1 by partially removing the peripheral walls of the retaining members Pr1 and Pr1 and the mat member Pm4 located below the retaining members Pr1 and Pr1 adjacent to each other, as previously described with reference to FIG. 17.

Sixth Embodiment

Figure 35:
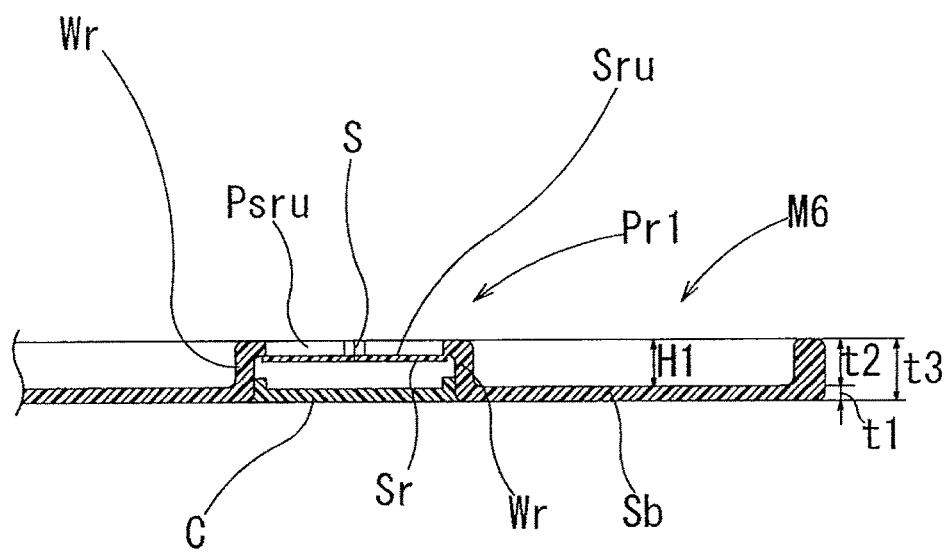
FIG. 35 is an enlarged cross sectional view showing a state in which a water absorbent sheet retaining mat according to a sixth embodiment of the present invention has a cap fit in the retaining member thereof.

With reference to FIG. 35, described is a water absorbent sheet retaining mat according to a sixth embodiment of the present invention. A water absorbent sheet retaining mat M6 according to this embodiment is devised such that the openings in the sitting planes Sb of the retaining members Pr1, Pr2, and Pr3 of the water absorbent sheet retaining mats M1, M1a, M1b, M1c, M2, M2a, M3, M3a, M3b, and M3c according to the above described first, second, and third embodiments and the alternative embodiment are closed. Specifically, the opening are closed by a cap C fitting into the inner shape of the opening or peripheral wall Wr to be closed. In FIG. 35, shown is a state in which the opening of the retaining member Pr1 of the water absorbent sheet retaining mat M1 depicted in FIG. 8 is closed by the cap C. This will enable that an excessive amount of the liquid which the absorption area Spa could not absorb is prevented from trespassing the mat member Pm1 through the slit member S to soak the place such as table where the water absorbent sheet retaining mat M1 is placed.

The inside of the cap C is washable by water supplied and discharged through the slit member S. Furthermore, the cap C can be removed from the opening for being water washed as needed.

Seventh Embodiment

Figure 36:
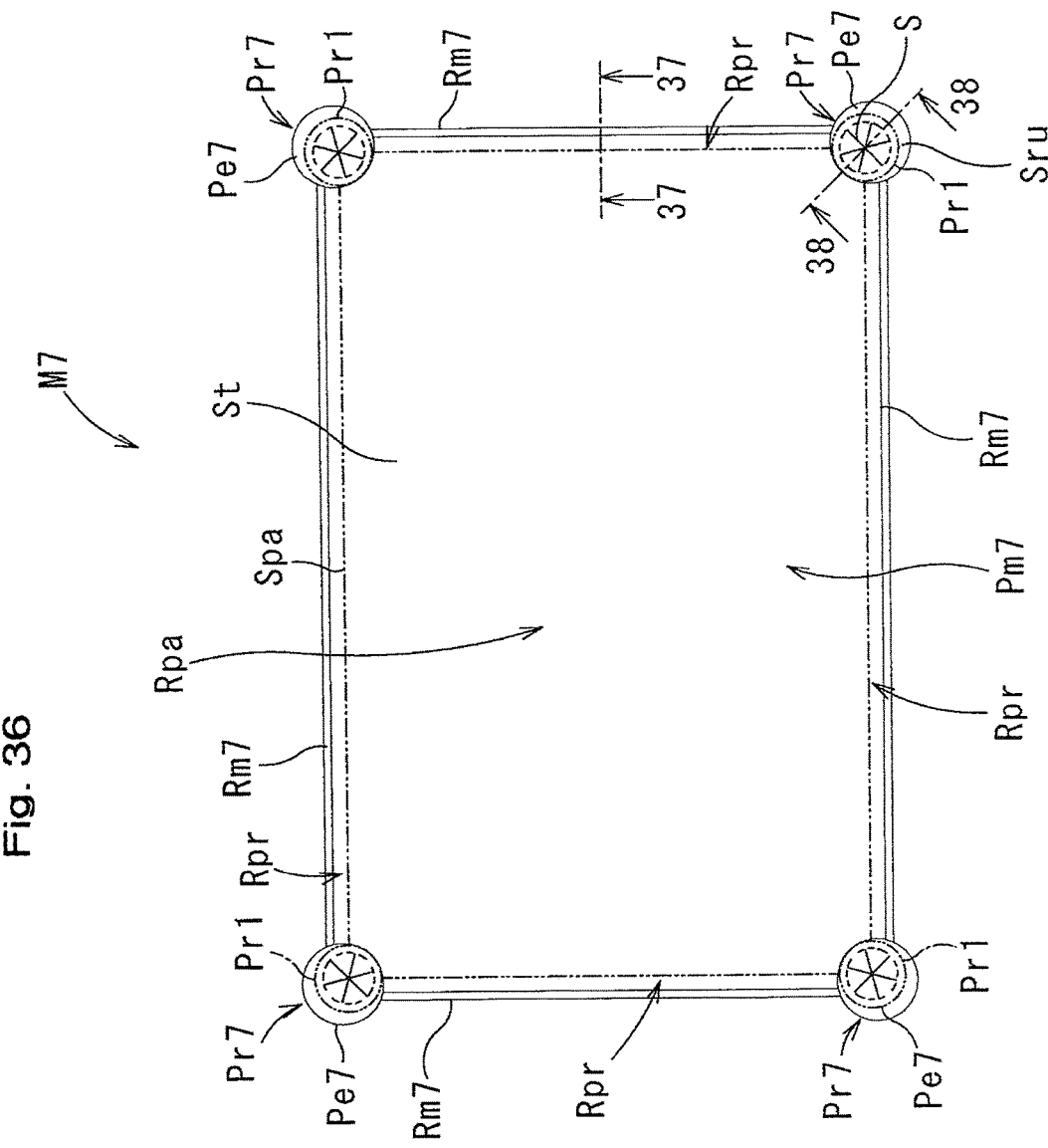
FIG. 36 is a diagram showing a construction of a water absorbent sheet retaining mat according to a seventh embodiment of the present invention.
Figure 37:
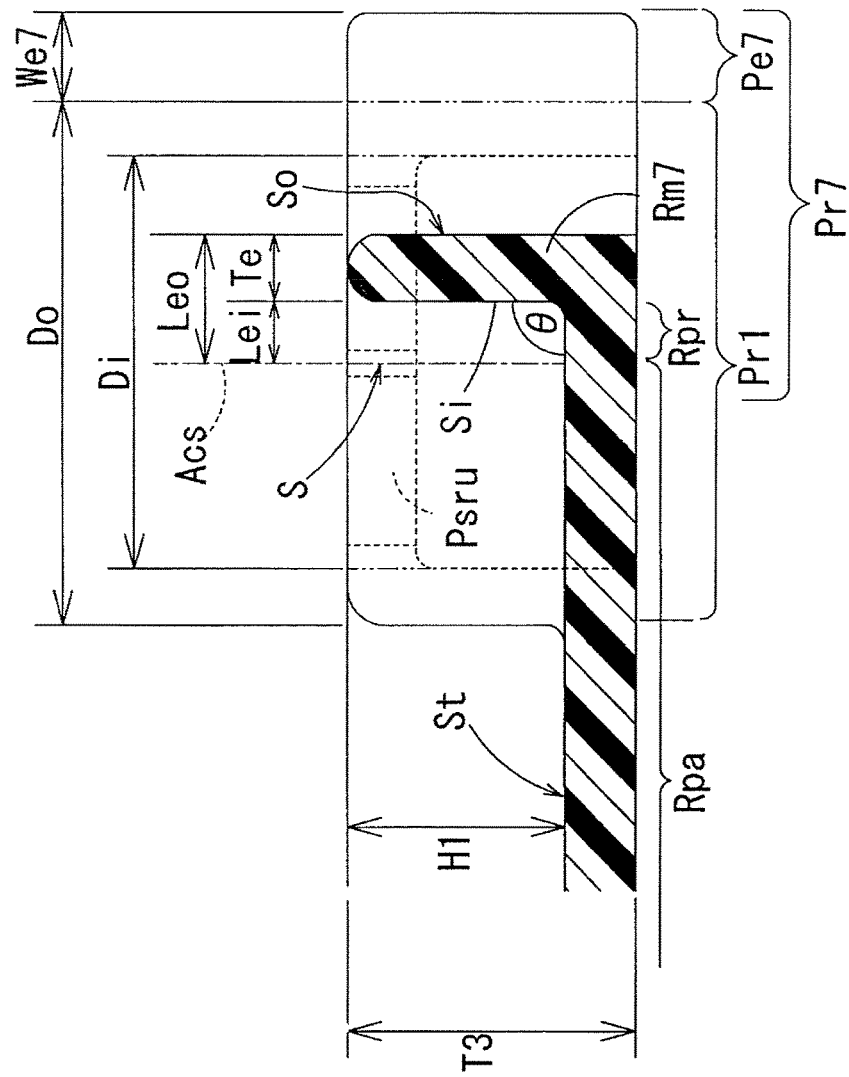
FIG. 37 is an enlarged sectional view of a periphery taken along a line 37-37 in FIG. 36.
Figure 38:
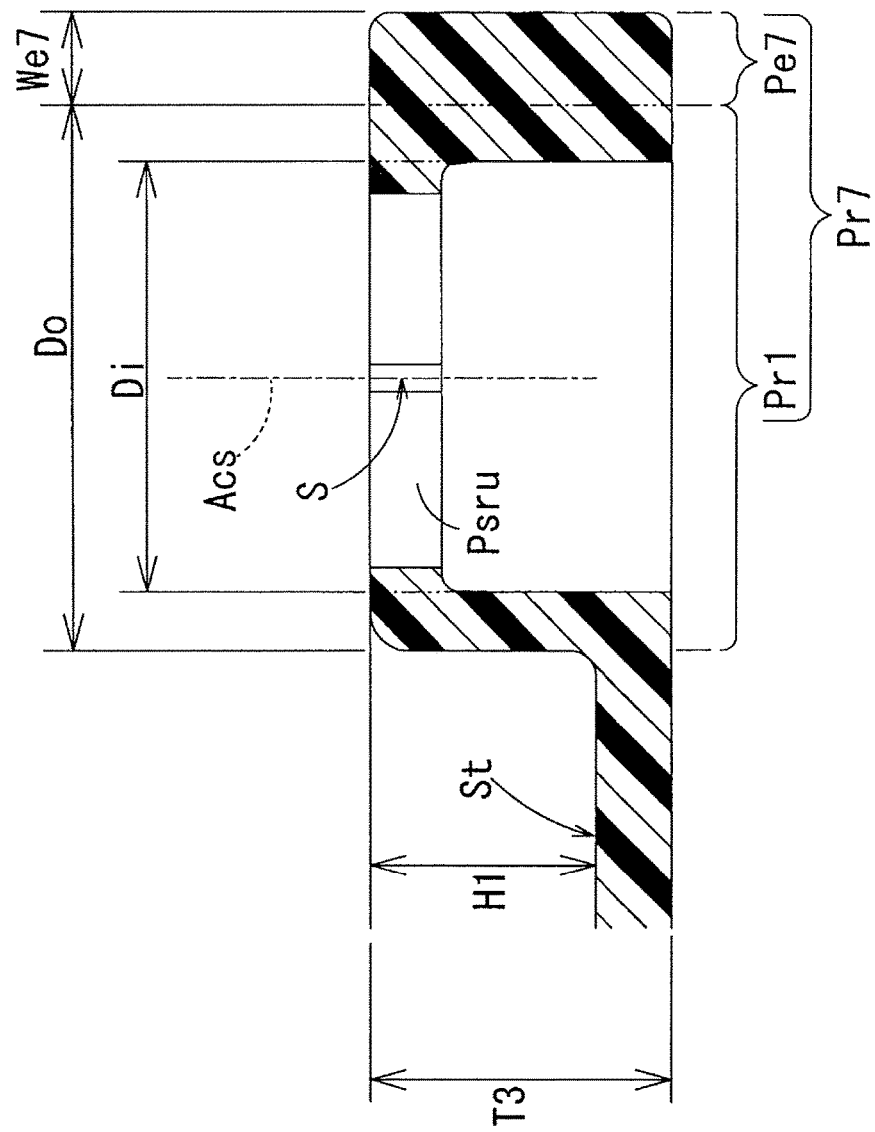
FIG. 38 is an enlarged sectional view of a retaining member taken along a line 38-38 in FIG. 36.

With reference to FIG. 36, FIG. 37, and FIG. 38, described is a water absorbent sheet retaining mat according to a seventh embodiment of the present invention. Below described is the water absorbent sheet retaining mat M7 according to this embodiment in comparison to the water absorbent sheet retaining mat M1 according to the first embodiment described with reference to FIG. 2 to FIG. 9. As indicated in FIG. 3, in the above described water absorbent sheet retaining mat M1, the mat frame member Rm is provided over the entire perimeter of the mat member Pm1. On the laying plane St of the mat member Pm1, provided are the retaining members Pr1. In contrast, in the water absorbent sheet retaining mat M7 according to this embodiment, a retaining member Pr7 is not provided on the laying plane St but provided integrally with a mat frame member Rm7 formed in the perimeter of the mat member Pm7 as shown in FIG. 36. As shown in FIG. 37, the peripheral member of the retaining member Pr7 is preferably formed in a gentle shape defined by a predetermined radius of curvature R.

When a center axis of the slit member S perpendicular to the top surface Sru of the retaining member Pr7 is regarded as a slit center axis Acs (FIG. 37), a two-dot chain line connecting the slit center axes Acs define a rectangular region Rpa. As described with reference to FIG. 26 and FIG. 27, the corner of absorption area Spa of water absorbent sheet Sa1 is located at the center of slit member S and then the water absorbent sheet Sa1 is retained by the mat member Pm7 such that the sheet brim member Spr around the absorption area Spa stands up. In short, the contour of the region Rpa corresponds to a boundary line between the absorption area Spa retained in a flat state and the sheet brim member Spr retained in a standing state, while the water absorbent sheet Sa1 installed. In this sense, the region Rpa is called a water absorption region Rpa, and a region between the water absorption region Rpa and the mat frame member Rm7 is called a sheet brim standing region Rpr.

As depicted by a two-dot chain line above the retaining member Pr7 in FIG. 36, the retaining member Pr7 is formed bigger than the retaining member Pr1 only by an outer perimeter Pe7 thereof. In short, the retaining member Pr7 is constructed such that an circular contour of the retaining member Pr1 confines itself within the circular contour of the retaining member Pr7, and shifts toward the center of the water absorbent sheet retaining mat M7 within the circular contour of the retaining member Pr7.

Next, with reference to FIG. 37 and FIG. 38, described are the retaining member Pr7, the mat frame member Rm7, and the sheet brim standing region Rpr. FIG. 37 shows a state of the water absorbent sheet retaining mat M7 sectioned with a focus on the mat frame member Rm7 in FIG. 36. FIG. 38 shows a state of the water absorbent sheet retaining mat M7 sectioned along with the slit center axis Acs of the retaining member Pr7 in FIG. 36.

In FIG. 37, on the right side of the mat frame member Rm7, an end portion of the retaining member Pr7 located outside the mat frame member Rm7 (the mat member Pm7) is seen. A portion extending between the outer circumference and the two-dot chain line in a width We7 is the above described outer perimeter Pe7. In the retaining member Pr7, the outer perimeter Pe7 is constructed to have an upper surface that flush with an upper surface of the peripheral wall Wr at a height T3.

It is allowed to construct the retaining member Pr7 such that the center of the about circular contour and the center of the circular contour of the retaining member Pr1 coincide each other. In that case, an upper surface of the outer perimeter Pe7 preferably slopes down from the center toward the outer perimeter of the mat member Pm7, as well as the width becomes greater from the top end toward the bottom end thereof.

The mat frame member Rm7 rises up almost vertically ($\theta=90°$ to the laying plane St by a height H1 (5 mm≤H1≤15 mm) and integrally connects between the retaining members Pr7. The tip of mat frame member Rm7 is formed in a curved shape. When a thickness of mat frame member Rm7 is regard as Te (hereinafter referred to as a "mat frame member thickness Te", a side (the left side in FIG. 37) facing to the inside (the laying plane St) of the mat frame member Rm7 is regarded as an inner peripheral surface Si, a side (the right side in FIG. 37) facing to the outside of water absorbent sheet retaining mat M7 is regarded as an outer peripheral surface So, a distance from the slit center axis Acs to the inner peripheral surface Si is regarded as Lei, and a distance from the slit center axis Acs to the outer peripheral surface So is regarded as Leo (hereinafter referred to as a "distance between the center axis and the outer peripheral surface Leo", the following equations (3) and (4) are satisfied with respect to the inner diameter Di and the outer diameter Do of the retaining member Pr1.

$$0 < Lei < Leo < Di/2 < Do/2 \quad (3)$$

$$Leo - Lei = Te \quad (4)$$

As described in the above, the water absorption region Rpa defined by the line connecting the slit center axes Acs corresponds to the absorption area Spa of the water absorbent sheet Sa1. The distance Lei corresponds to the width of the sheet brim standing region Rpr, and is referred to as a sheet brim standing region width Lei. Among the sheet brim standing region width Lei, the mat frame height H1, and the sheet brim width Lpr (FIG. 2) of the sheet brim member Spr of the water absorbent sheet Sa1, there is a relationship expressed by the following equation (5) preferably.

$$Lei < H1 \leq Lpr \quad (5)$$

As described in the above, a portion of the sheet brim member Spr not being retained by the slit member S sags down to touch the laying plane St as well as stands around the absorption area Spa (FIG. 2). Furthermore, the rise up of standing portion of the sheet brim member Spr is reinforced with being supported by the inner peripheral surface Si of the frame member Rm7, while the above described equations (3), (4), and (5) are satisfied.

As shown in FIG. 38, the cross section of the outer perimeter Pe7 is the biggest when cutting the retaining member Pr7 along a plane at a uniform angle with respect to both the neighboring mat frame members Rm7. As discernible from FIG. 36, the retaining member Pr7 is so constructed that the circular counter of the retaining member Pr1 is located within the circular contour of the retaining member Pr7 but closer to the center of the water absorbent sheet retaining mat M7.

Figure 39:
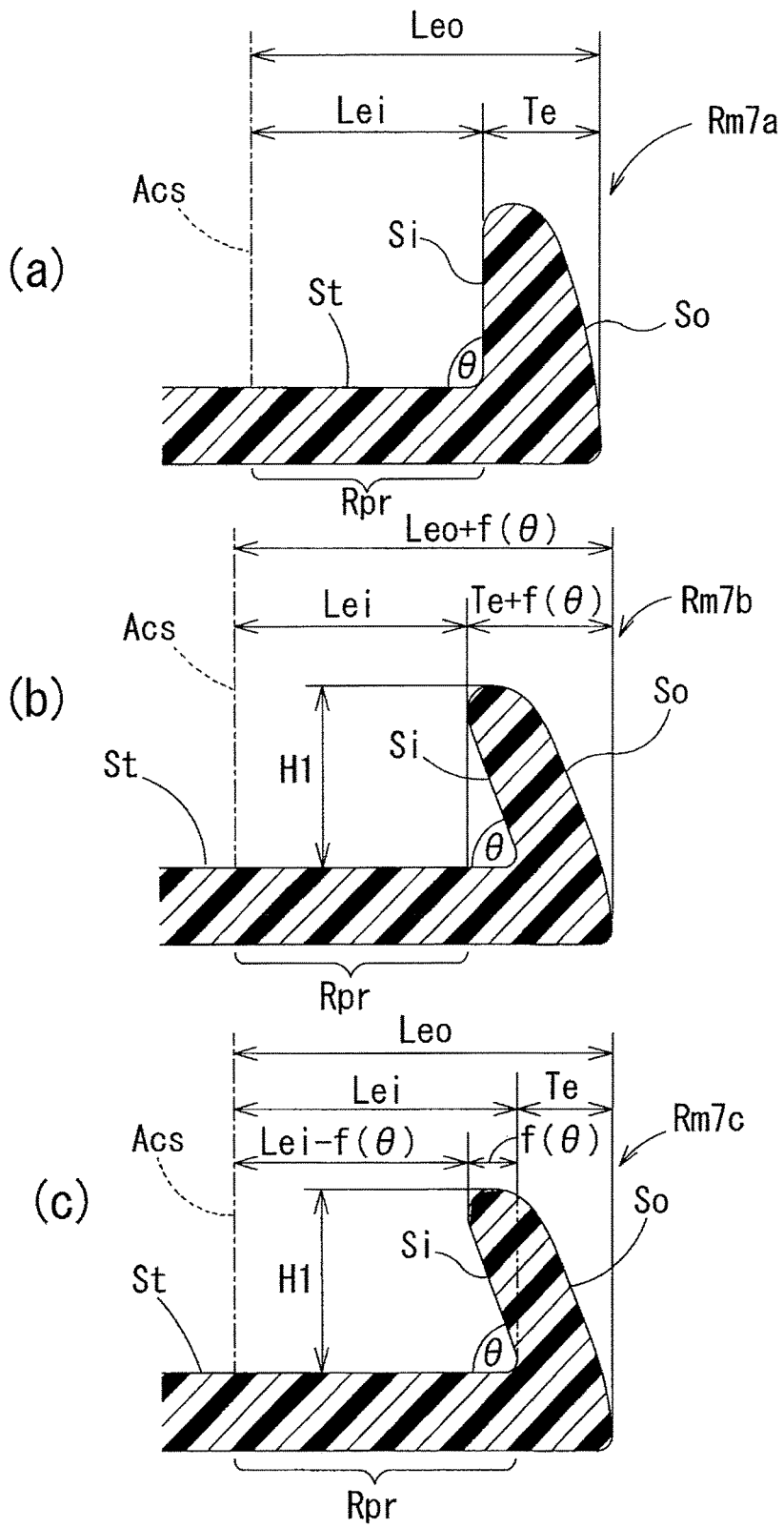
FIG. 39 is an explanatory view showing an example of configuration and arrangement positions of a frame member shown in FIG. 36.

With reference to FIG. 39, described is an alternative embodiment of the mat frame member Rm7 with respect to the shape and the position to be arranged. First described is the shape. The mat frame member Rm7, exemplified in FIG. 36 to FIG. 38, is constructed in such a form that both the inner peripheral surface Si and an outer peripheral surface So rises perpendicularly ($\theta=90°$) to the laying plane St and parallel to each other. However, as exemplified in FIG. 39(a), it is also allowed to construct such that the outer peripheral surface So is formed in a convex shape with a curved surface, while the inner peripheral surface Si of a mat frame member Rm7a rises almost perpendicularly ($\theta=90°$) to the laying plane St. Further, as exemplified in FIG. 39(b) and FIG. 39(c), it is allowed to construct such that each the inner peripheral surface Si of a mat frame member Rm7b and a mat frame member Rm7c rises at a slant)($80°≤θ≤85°$) with respect to the laying plane St, and the outer peripheral surface So is formed in a convex shape with a curved surface.

Next, described are the arrangement position of the mat frame member Rm7a, the mat frame member Rm7b, and the mat frame member Rm7c. In the example ($θ=90°$ illustrated in FIG. 39(a), there is the relationship expressed by the above described equation (4) available among the sheet brim standing region width Lei of the mat frame member Rm7a, the mat frame member thickness Te, and a distance between the center axis and the outer peripheral surface Leo, as in the mat frame member Rm7 (FIG. 36 to FIG. 38). In contrast, in the example) ($80°≤θ≤85°$ illustrated in FIG. 39(b) and FIG. 39(c), the arrangement positions of the mat frame member Rm7b and the mat frame member Rm7c are different from that of the mat frame member Rm7 (FIG. 36 to FIG. 38).

In the example illustrated in FIG. 39(b), the outer peripheral surface So of the mat frame member Rm7b is positioned on the more outside (on the right side in FIG. 37 and FIG. 39) of the water absorbent sheet retaining mat M7, compared with the outer peripheral surface So of the mat frame member Rm7. In other words, the outer peripheral surface So of the mat frame member Rm7b is located on the more outside of the water absorbent sheet retaining mat M7 by a value $f(θ)$ defined by θ, compared with the example shown in FIG. 37.

In the example illustrated in FIG. 39(c), the inner peripheral surface Si of the mat frame member Rm7c is positioned on the more inside (on the left side in FIG. 37 and FIG. 39) of the water absorbent sheet retaining mat M7, compared with the inner peripheral surface Si of the mat frame member Rm7. In other words, the inner peripheral surface Si of the mat frame member Rm7c is located on the more inside of the water absorbent sheet retaining mat M7 by a value $f(θ)$ defined by θ, compared with the example shown in FIG. 37.

Figure 40:
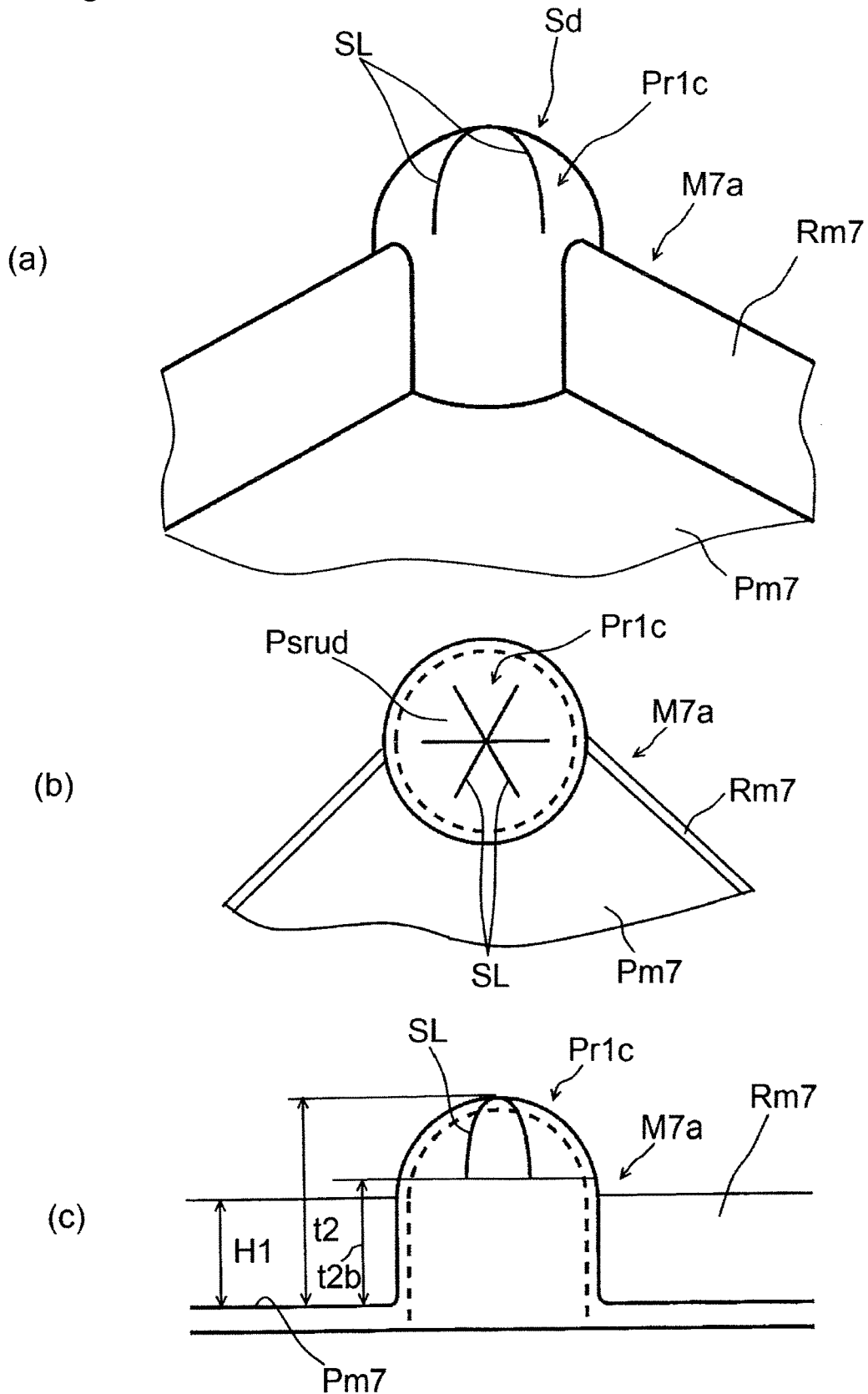
FIG. 40 is an explanatory view showing an alternative embodiment of the water absorbent sheet retaining mat shown in FIG. 36.

Next, with reference to FIG. 40, described is an alternative embodiment of the water absorbent sheet retaining mat M7. A water absorbent sheet retaining mat M7a according to the present alternative embodiment has a construction similar to that of the water absorbent sheet retaining mat M1 shown in FIG. 3, except that the retaining member Pr7 is replaced with the above described retaining member Pr1c (FIG. 77). In FIG. 40(a), shown is a perspective view of the water absorbent sheet retaining mat M7a focused on the retaining member Pr1c. In FIG. 40(b), shown is a plan view of the water absorbent sheet retaining mat M7a of FIG. 40(a) looking down a top surface of the retaining member Pr1c. In FIG. 40(c), shown is a side view of the water absorbent sheet retaining mat M7a focused on the retaining member Pr1c. Replacement of the retaining member Pr7 with the retaining member Pr1c enables the prevention of accidental removal of the water absorbent sheet Sa which is once installed as well as easy-to-pressing down the claw Psrud, as described in the above.

Eighth Embodiment

Figure 41:
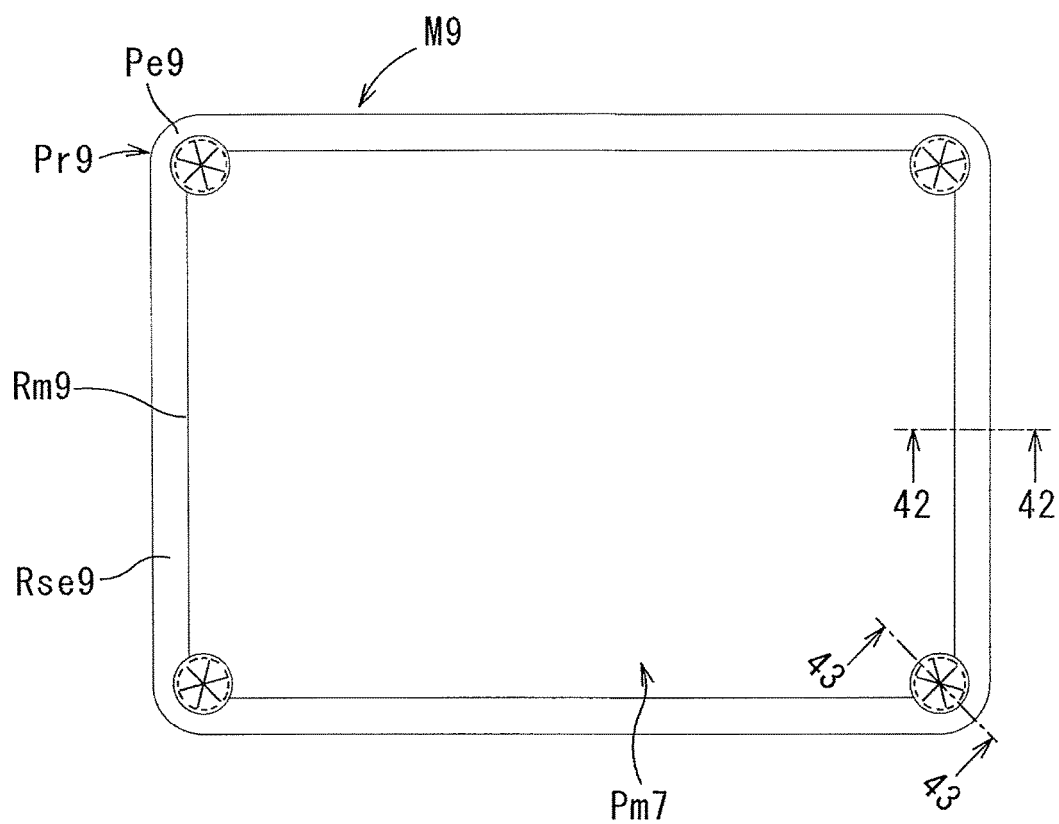
FIG. 41 is a plan view of a water absorbent sheet retaining mat according to an eighth embodiment of the present invention.
Figure 42:
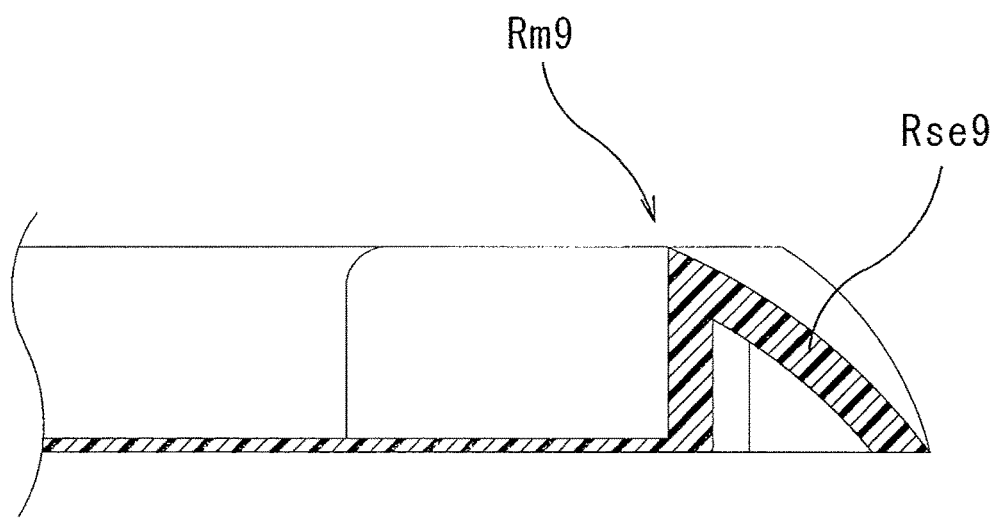
FIG. 42 is an enlarged sectional view of a periphery taken along a line 42-42 shown in FIG. 41.
Figure 43:
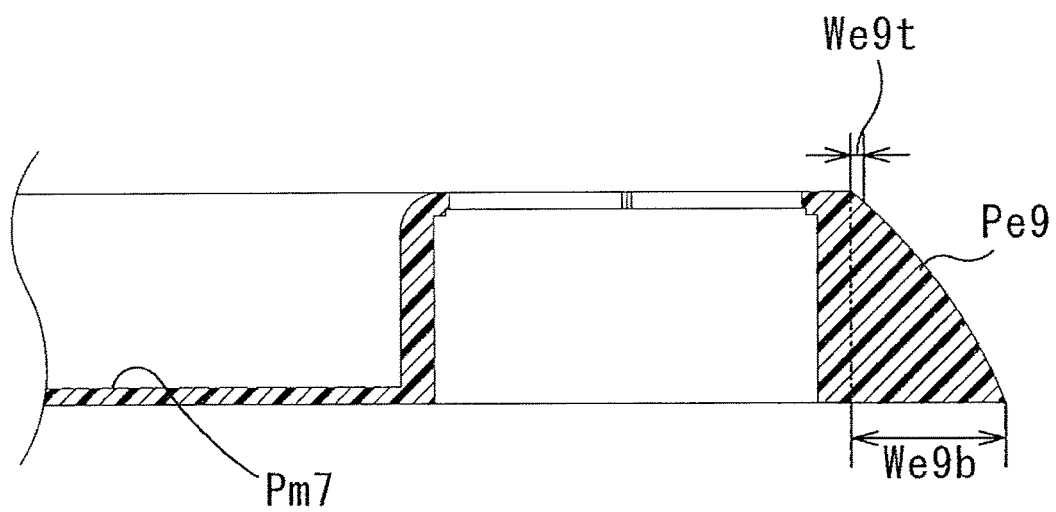
FIG. 43 is an enlarged sectional view of a retaining member taken along a line 43-43 shown in FIG. 41.

With reference to FIG. 41, FIG. 42, and FIG. 43, described is a water absorbent sheet retaining mat according to an eighth embodiment of the present invention. A water absorbent sheet retaining mat M9 is constructed by modifying the above described water absorbent sheet retaining mat M7 (FIG. 36) such that the retaining member Pr7 and the mat frame member Rm7 are replaced with a retaining member Pr9 and a mat frame member Rm9, respectively.

Specifically, an outer perimeter Pe9 of the retaining member Pr9 and an outer peripheral surface Rse9 of the mat frame member Rm9 are integrally formed in the water absorbent sheet retaining mat M9.

The mat frame member Rm9 is provided with the outer peripheral surface Rse9 (FIG. 42) sloping from a top end of the outer peripheral surface So toward a plane extended from the sitting plane Sb of the mat member Pm7 as well as from the center toward an outer periphery of the mat member Pm7 in the mat frame member Rm7 (FIG. 36). As shown FIG. 43, an upper surface of the outer perimeter Pe9 of the retaining member Pr9 slopes from the center of the mat member Pm7 toward the outer periphery thereof. The outer perimeter Pe9 is constructed to have the width becoming larger from the top end toward the bottom end thereof (We9t<We9b).

Figure 44:
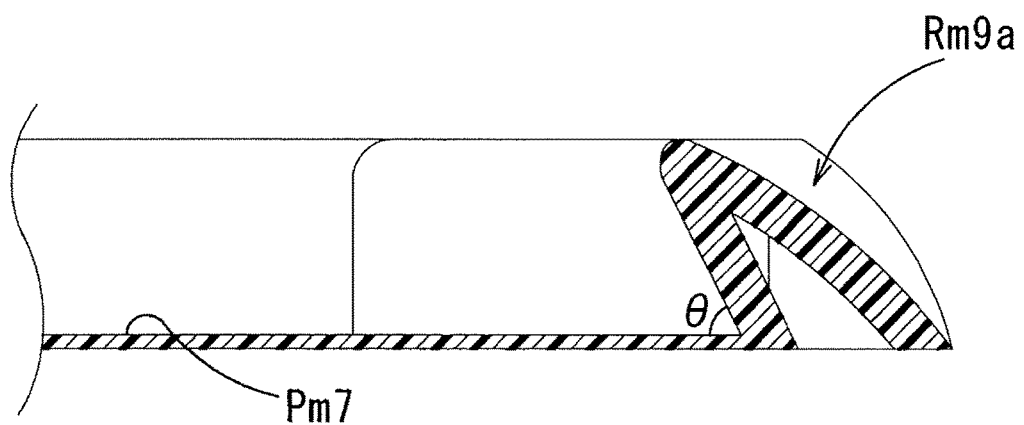
FIG. 44 is an enlarged sectional view showing an alternative embodiment of a frame member shown in FIG. 41.

In FIG. 44, shown is a cross sectional view of an alternative embodiment of the mat frame member Rm9. In a mat frame member Rm9a, the angle θ could be a value within a range about from 80° till 85°, and the mat frame member Rm9a is formed in a shape sloping from the outer perimeter toward the center of the mat member Pm7.

Ninth Embodiment

Figure 45:
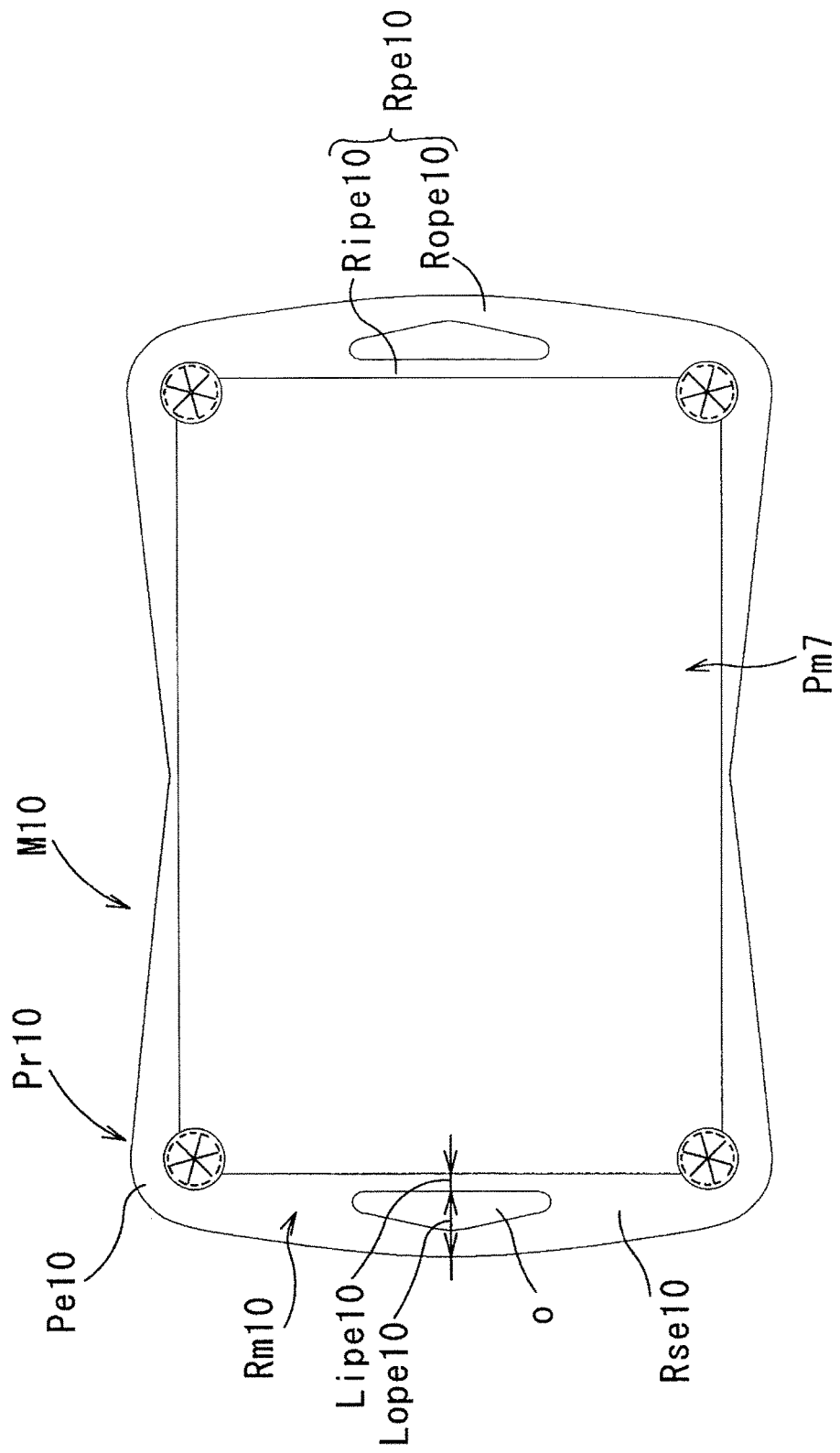
FIG. 45 is a plan view of a water absorbent sheet retaining mat according to a ninth embodiment of the present invention.

With reference to FIG. 45, described is a water absorbent sheet retaining mat according to a ninth embodiment of the present invention. A water absorbent sheet retaining mat M10 is constructed by modifying the above described water absorbent sheet retaining mat M9 (FIG. 41) according to the eighth embodiment such that the retaining member Pr9 and the mat frame member Rm9 are replaced with a retaining member Pr10 and a mat frame member Rm10, respectively. Specifically, in the water absorbent sheet retaining mat M10, an outer perimeter Pe10 of the retaining member Pr10 and an outer peripheral surface Rse10 of the mat frame member Rm10 are integrally formed as in the above described water absorbent sheet retaining mat M9. However, the mat frame member Rm10 is provided with an opening O formed therein unlike the mat frame member Rm9 (water absorbent sheet retaining mat M9). The mat frame member Rm10 has a picture frame like shape in a planer view in the example shown in FIG. 45.

The retaining member Pr10 has a construction basically similar to that of the retaining member Pr9 (FIG. 41). In short, the outer perimeter Pe10 of the retaining member Pr10 is constructed to have the width becoming larger from the top end toward the bottom end thereof.

The mat frame member Rm10 has an outer peripheral member Rpe10 which extends from the center of the mat member Pm7 toward the outer perimeter in the outer peripheral surface thereof. The outer peripheral member Rpe10 has a first outer peripheral member Ripe10 and a second outer peripheral member Rope10. The first outer peripheral member Ripe10 and the second outer peripheral member Rope10 are integrally formed. As described later, the opening O is formed in the mat frame member Rm10.

The first outer peripheral member Ripe10 extends from the outer peripheral surface of the mat frame member Rm10 toward the opposite side with respect to the center of the mat member Pm7 by the length Ripe10. An upper surface of the first outer peripheral member Ripe10 slopes from the top end of the outer peripheral surface of the mat frame member Rm10 toward a plane extending from the sitting plane Sb of the mat member Pm7.

The second outer peripheral member Rope10 is integrally formed with the first outer peripheral member Ripe10, and also extends from the center of the mat member Pm7 towards the outer perimeter by a length Lope10. The second outer peripheral member Rope10 has a predetermined height t4 (not shown), and the height t4 is smaller than a height t3 (not shown) of the mat frame member Rm10.

The openings O are formed in the mat frame member Rm10 located in the right and left sides, respectively. The opening O is formed in the mat frame member Rm10 in a position adjacent to the short side of the mat member Pm7. Since the opening O is provided for the convenience of the user's handling, the opening O can be formed in any size or any shape which satisfy the requirements.

Note that the angle θ made by the mat frame member Rm10 with the laying plane St of the mat member Pm7 is an obtuse angle, and the inner peripheral surface of the mat frame member Rm10 is allowed to slope from the center of the mat member Pm7 toward the outer perimeter. Also, note that the angle θ made by the retaining member Pr10 with the laying plane St of the mat member Pm7 is an obtuse angle, and the inner peripheral surface of the retaining member Pr10 is allowed to slope from the center of the mat member Pm7 toward the outer perimeter.

Tenth Embodiment

Figure 46:
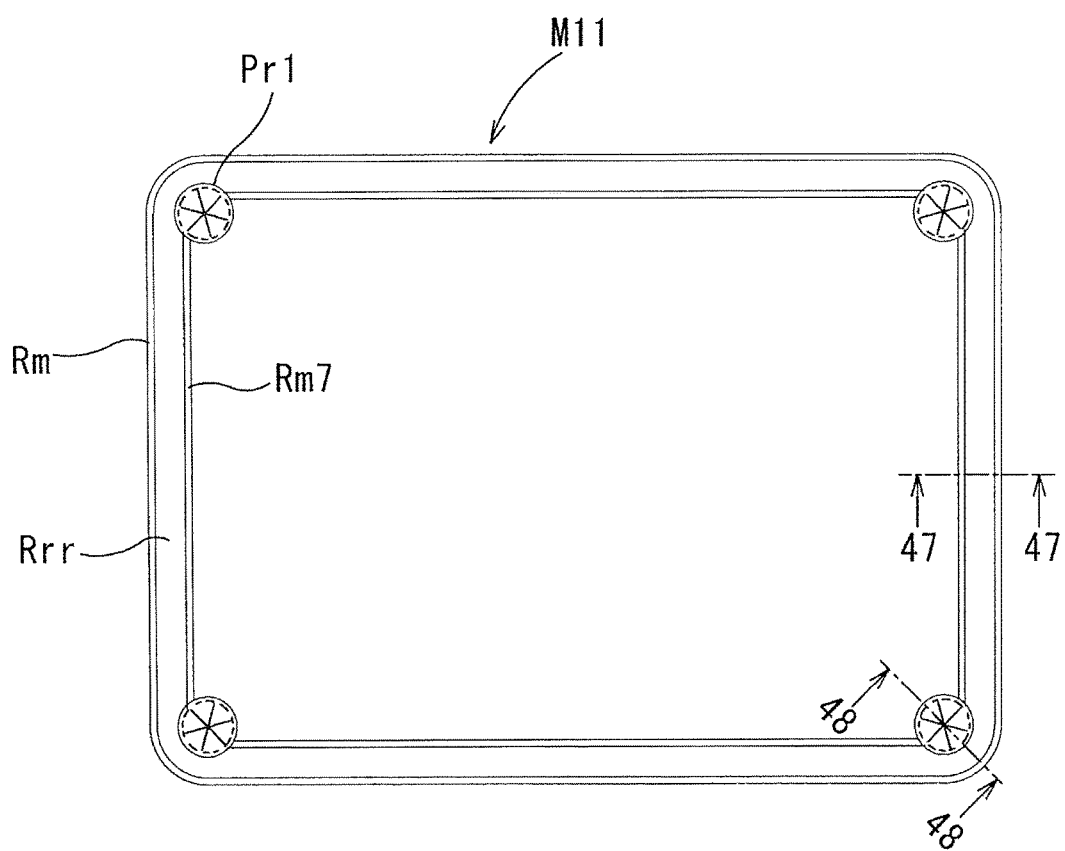
FIG. 46 is a plan view of a water absorbent sheet retaining mat according to a Tenth embodiment of the present invention.
Figure 47:
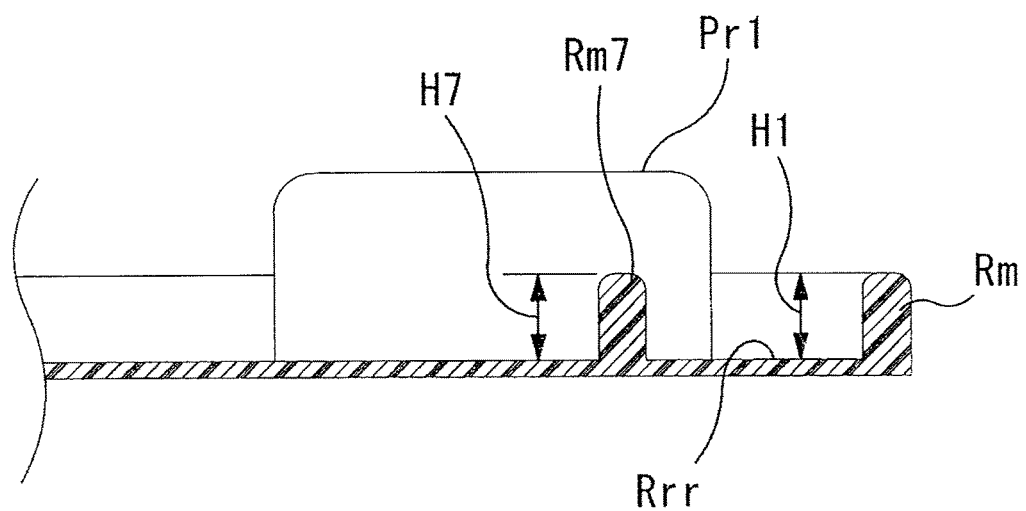
FIG. 47 is an enlarged sectional view of a periphery taken along a line 47-47 shown in FIG. 46.
Figure 48:
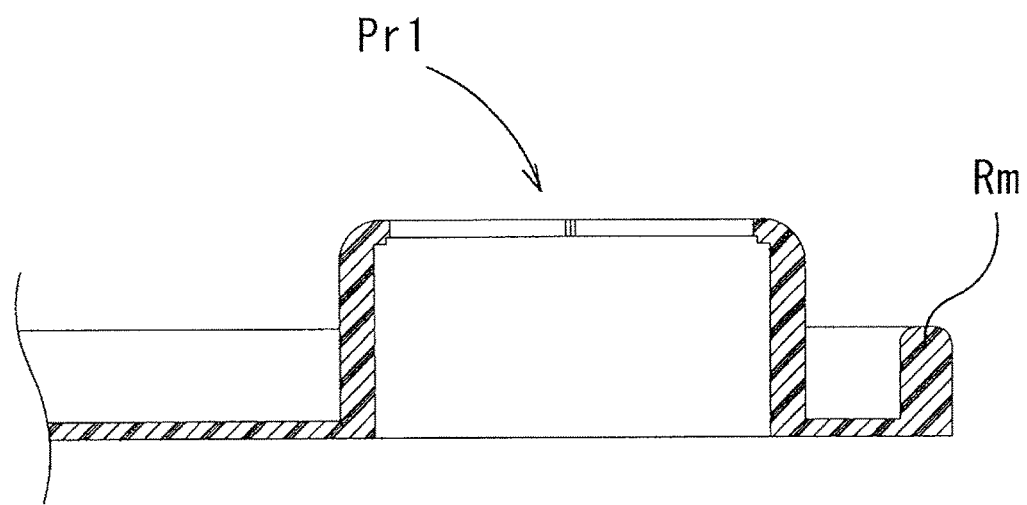
FIG. 48 is an enlarged sectional view of a retaining member taken along a line 48-48 shown in FIG. 46.

With reference FIG. 46, FIG. 47, and FIG. 48, described is a water absorbent sheet retaining mat according to a tenth embodiment of the present invention. A water absorbent sheet retaining mat M11 has a construction where the above described water absorbent sheet retaining mat M1 (FIG. 3) of the first embodiment is applied with the above described mat frame member Rm7 (FIG. 36, FIG. 37) of the seventh embodiment. The mat frame member Rm7 integrally connects between the retaining members Pr1. An area between the mat frame member Rm and the mat frame member Rm7 is referred to as an "inter-perimeter region Rrr."

FIG. 47 shows a state of the water absorbent sheet retaining mat M11 sectioned with a focus on the mat frame member Rm and the mat frame member Rm7 in FIG. 46. FIG. 48 shows a state of the water absorbent sheet retaining mat M11 sectioned along with the slit center axis Acs (FIG. 37) of the retaining member Pr1 in FIG. 46. As shown in FIG. 47, the inter-perimeter region Rrr is constructed by a flat surface. A height H7 of the mat frame member Rm7 equals to the height H1 of the mat frame member Rm.

Figure 49:
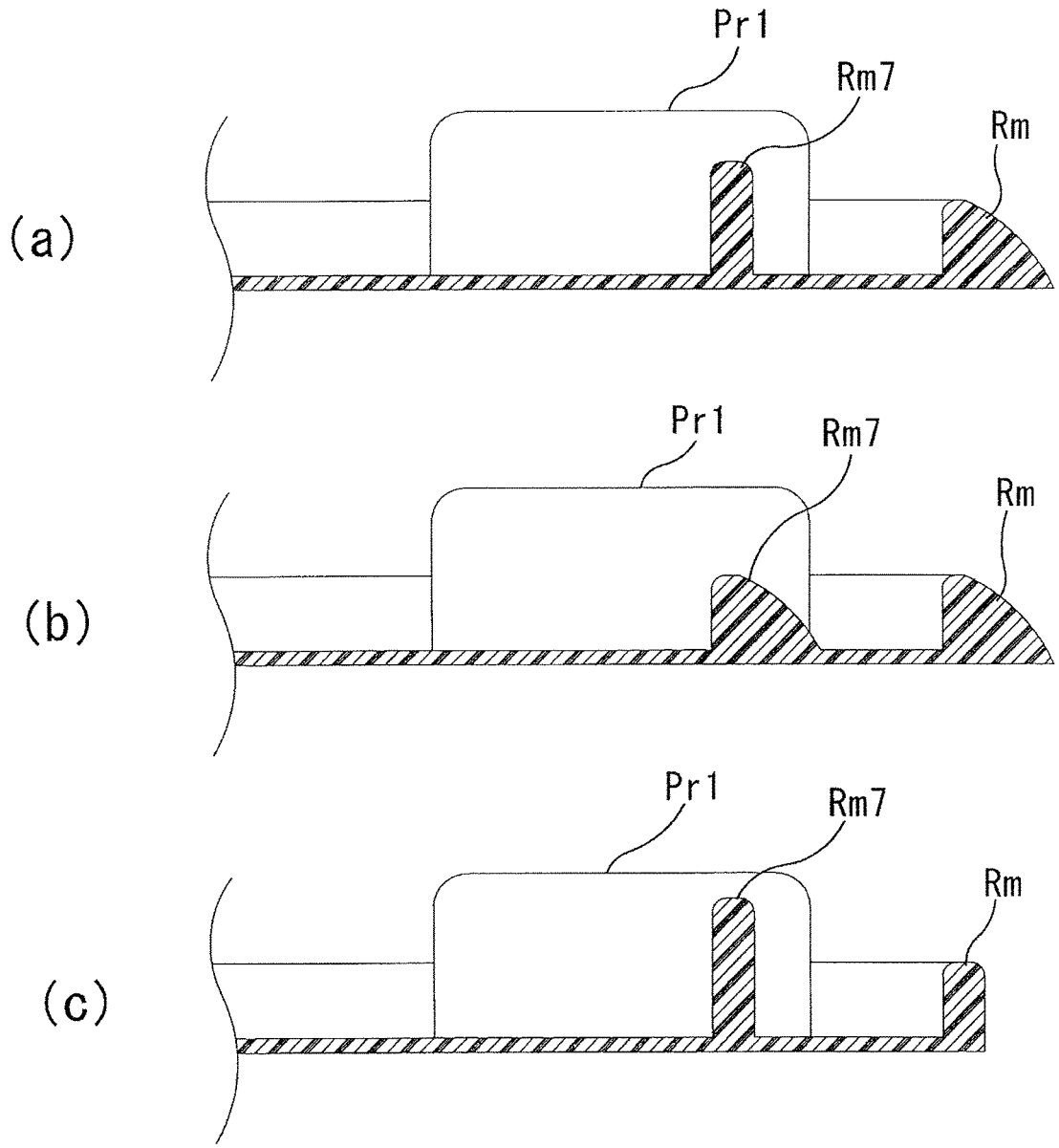
FIG. 49 is an enlarged sectional view showing alternatives embodiment of a frame member shown in FIG. 46.

With reference to FIG. 49, described are alternative embodiments of the mat frame member Rm and the mat frame member Rm7. As illustrated in FIG. 49(a), it is allowed to construct the mat frame member Rm in a shape similar to that of the mat frame member Rm7a described with reference to FIG. 39(a). As illustrated in FIG. 49(b), it is also allowed to construct both the mat frame member Rm and the mat frame member Rm7 in a shape similar to that of the mat frame member Rm7a. Further, as illustrated in FIG. 49(c), it is allowed to construct the mat frame member Rm and the mat frame member Rm7 such that the height H7 of the mat frame member Rm7 is greater than the height H1 of the mat frame member Rm.

The mat frame member Rm can be arranged so that a clearance between the mat frame member Rm and the mat frame member Rm7 almost equals to a clearance between the mat frame member Rm and the outer peripheral surface of the retaining member Pr1. In this case, the mat frame member Rm has corners each in which a corner member formed in a circular arc shape so as to shift outside from the mat frame member Rm discontinuously.

Eleventh Embodiment

Figure 50:
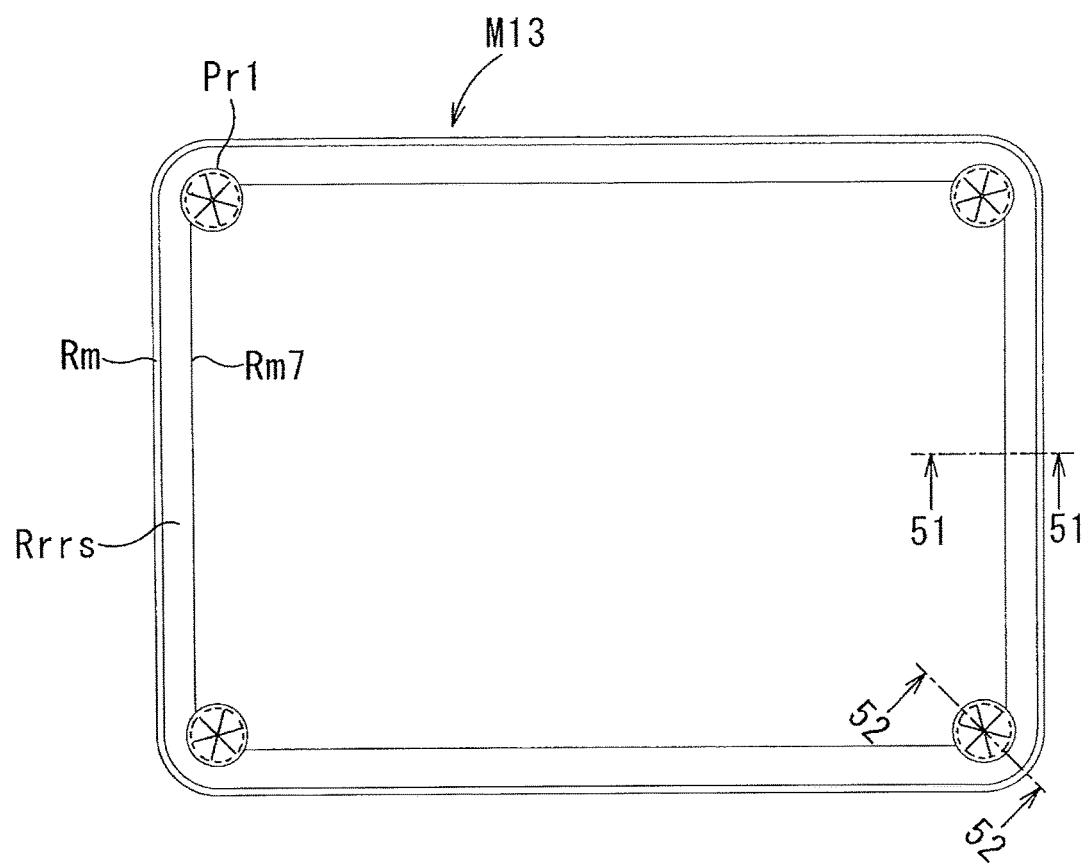
FIG. 50 is a plan view of a water absorbent sheet retaining mat according to an eleventh embodiment of the present invention.
Figure 51:
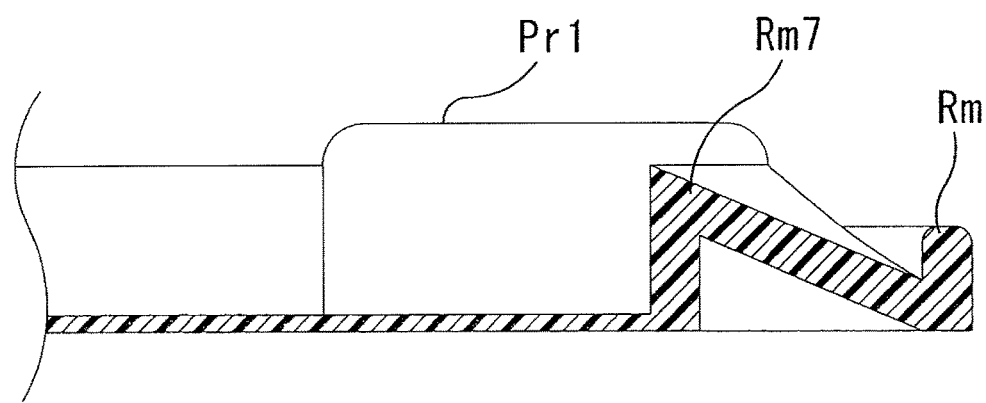
FIG. 51 is an enlarged sectional view of a periphery taken along a line 51-51 in FIG. 50.
Figure 52:
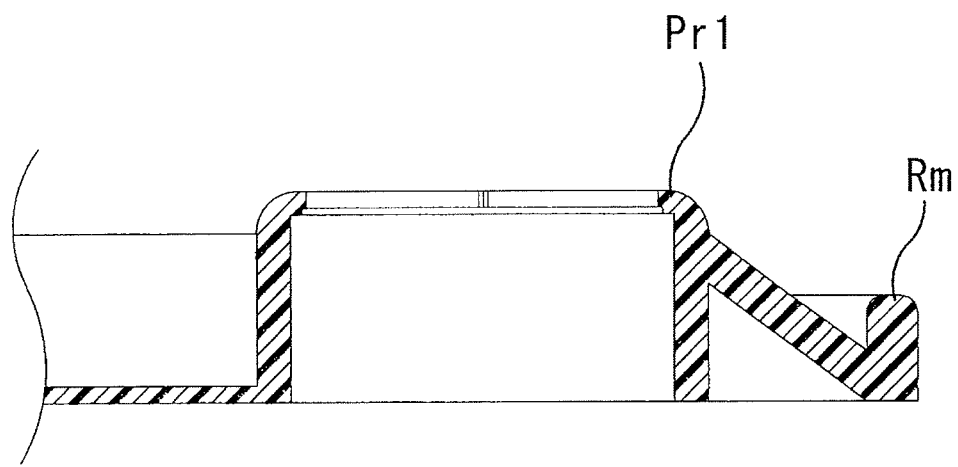
FIG. 52 is an enlarged sectional view of a retaining member taken along a line 52-52 in FIG. 50.

With reference to FIG. 50, FIG. 51, and FIG. 52, described is a water absorbent sheet retaining mat according to an eleventh embodiment of the present invention. A water absorbent sheet retaining mat M13 has a construction similar to that of the above described water absorbent sheet retaining mat M11 except that the inter-perimeter region Rrr is replaced with an inter-perimeter region Rrrs.

FIG. 51 shows a state of the water absorbent sheet retaining mat M13 sectioned with a focus on the mat frame member Rm and the mat frame member Rm7 in FIG. 50. FIG. 52 shows a state of the water absorbent sheet retaining mat M13 sectioned along with the slit center axis Acs of the retaining member Pr1 in FIG. 50. As shown in FIG. 51 and FIG. 52, the inter-perimeter region Rrrs is constructed by a sloping surface extending between the top end of the mat frame member Rm7 and the bottom end of the mat frame member Rm.

Figure 53:
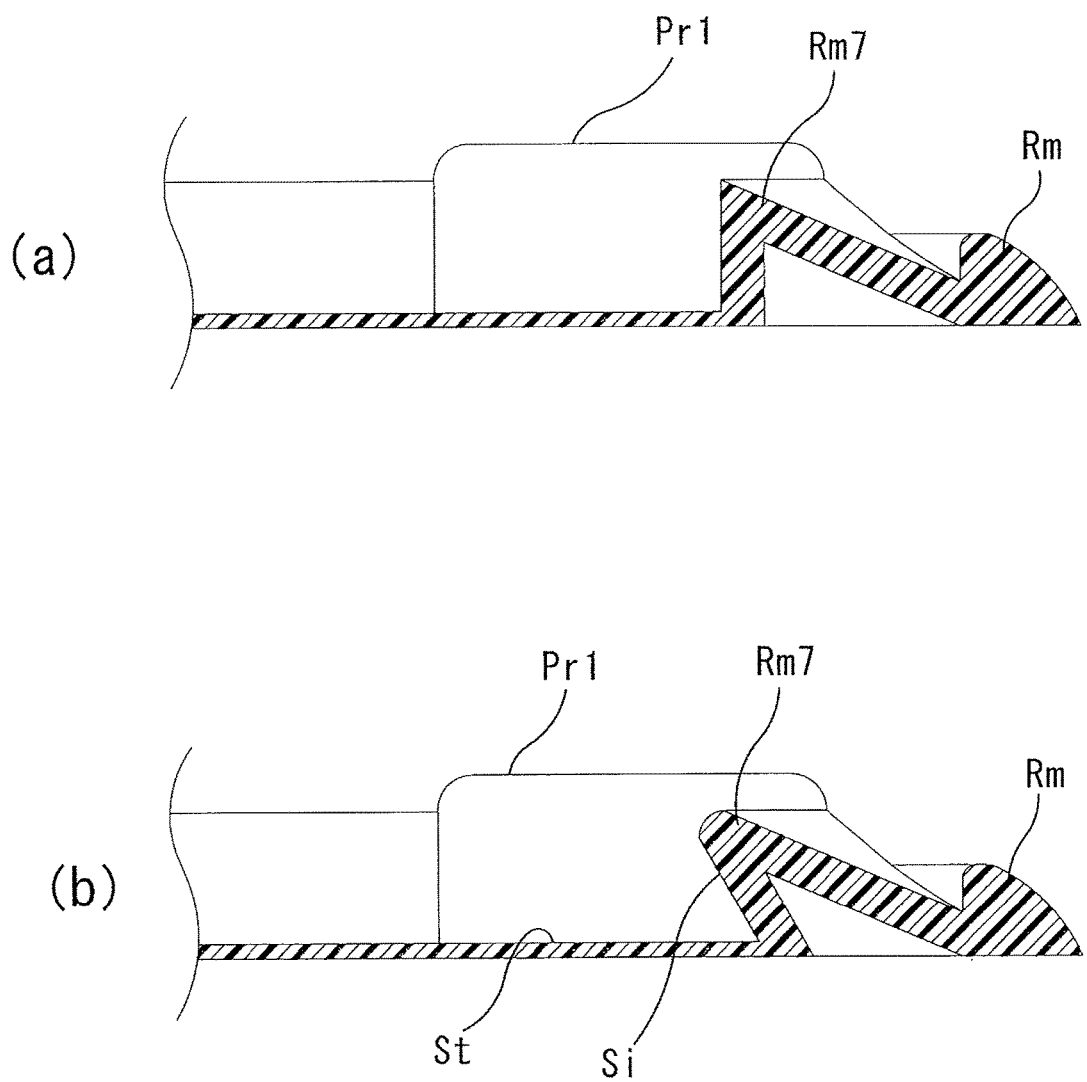
FIG. 53 is an enlarged sectional view showing alternatives of a frame member shown in FIG. 50.

With reference to FIG. 53, described are alternative embodiments of the mat frame member Rm and the mat frame member Rm7. As illustrated in FIG. 53(a), it is allowed to construct the mat frame member Rm so as to have a shape similar to that of the mat frame member Rm described with reference to FIG. 49(a). As illustrated in FIG. 53(b), it is also allowed to construct the mat frame member Rm so as to have a shape similar to that of the mat frame member Rm illustrated in FIG. 53(a) as well as to construct such that the inner peripheral surface Si of the mat frame member Rm7 slants)(80°≤θ≤85°) against the laying plane St.

Twelfth Embodiment

With reference to FIG. 54, FIG. 55, FIG. 56, and FIG. 57, described is a water absorbent sheet retaining mat according to a twelfth embodiment of the present invention. A water absorbent sheet retaining mat M14 has a construction similar to that of the above described water absorbent sheet retaining mat M11 except that the mat frame member Rm7 is replaced with a mat frame member Rm14. Although the above described mat frame member Rm7 is extending continuously, the mat frame member Rm14 according to the present embodiment is comprised of a plurality of mat frame members between each a gap G is formed.

Figure 54:
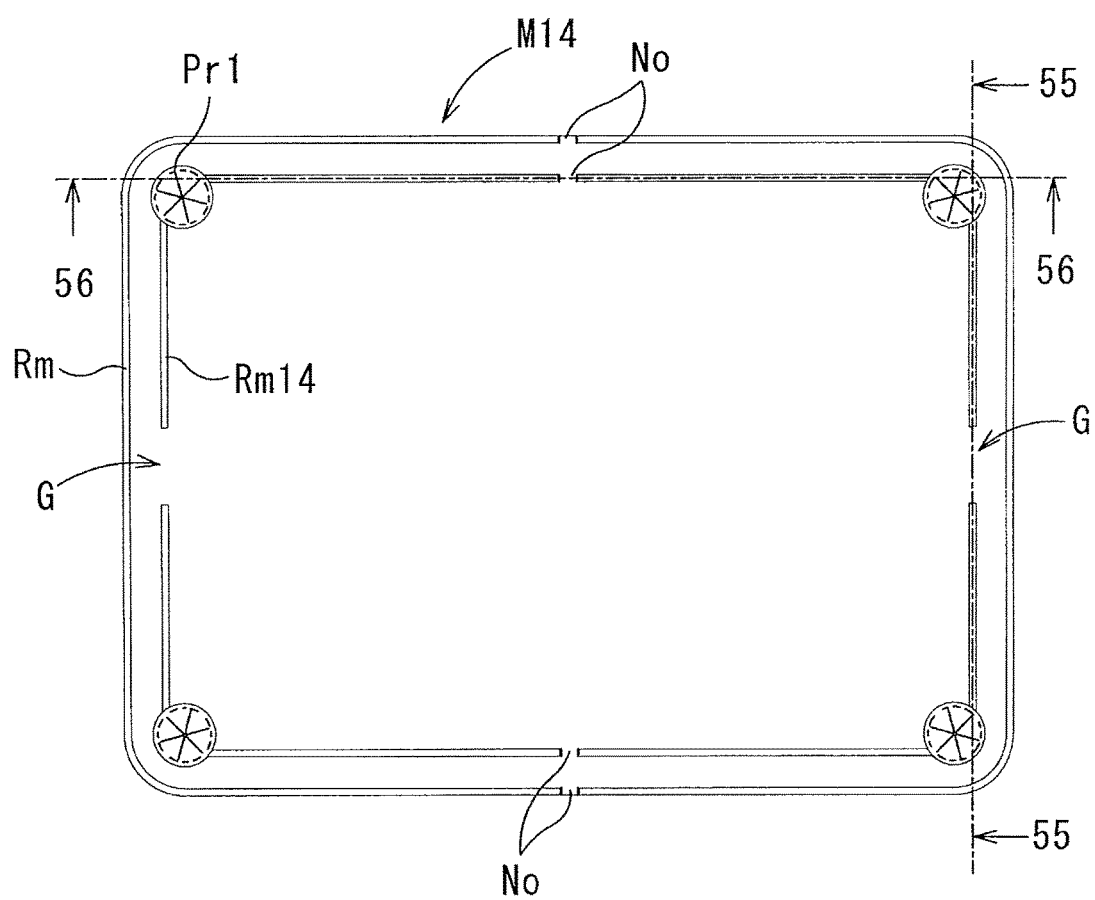
FIG. 54 is a plan view of a water absorbent sheet retaining mat according to a twelfth embodiment of the present invention.
Figure 55:
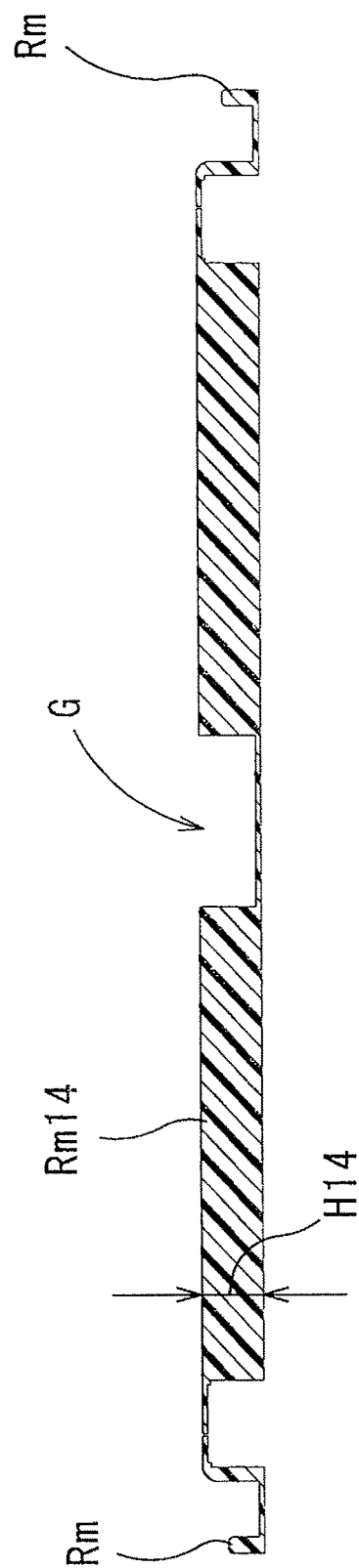
FIG. 55 is a sectional view of the water absorbent sheet retaining mat taken along a line substantially parallel to a short side of a mat member thereof at a position of a frame member in FIG. 54.

In an example shown in FIG. 54, each the gap G is formed in a place almost parallel to the short side Lsm (FIG. 3) of the mat member Pm1 in the mat frame member Rm14. FIG. 55 shows a state of the water absorbent sheet retaining mat M14 sectioned along with a line almost parallel to the short side Lsm (FIG. 3) of the mat member Pm1 in the position of the mat frame member Rm14 in FIG. 54. It is allowed that a height H14 of the mat frame member Rm14 is greater than the height of the retaining member Pr1.

Figure 56:
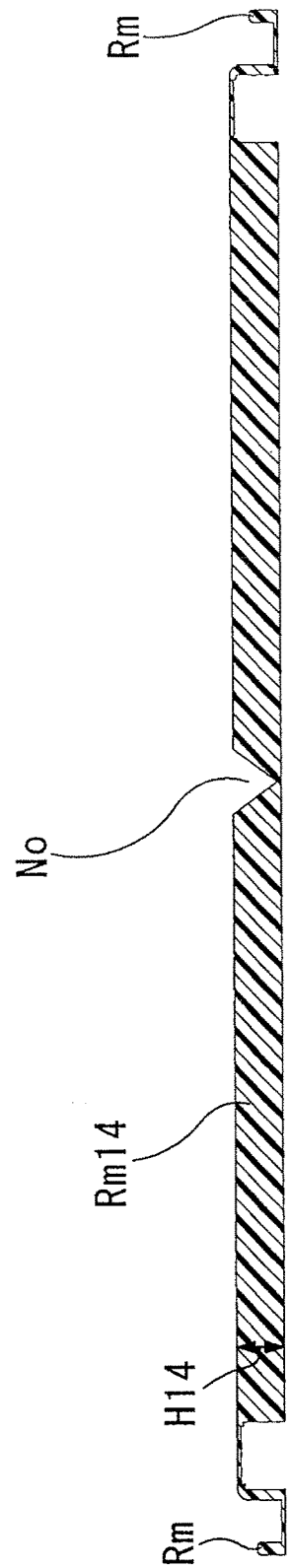
FIG. 56 is a sectional view of the water absorbent sheet retaining mat taken along a line substantially parallel to a long side of the mat member at a position of the frame member in FIG. 54.
Figure 57:
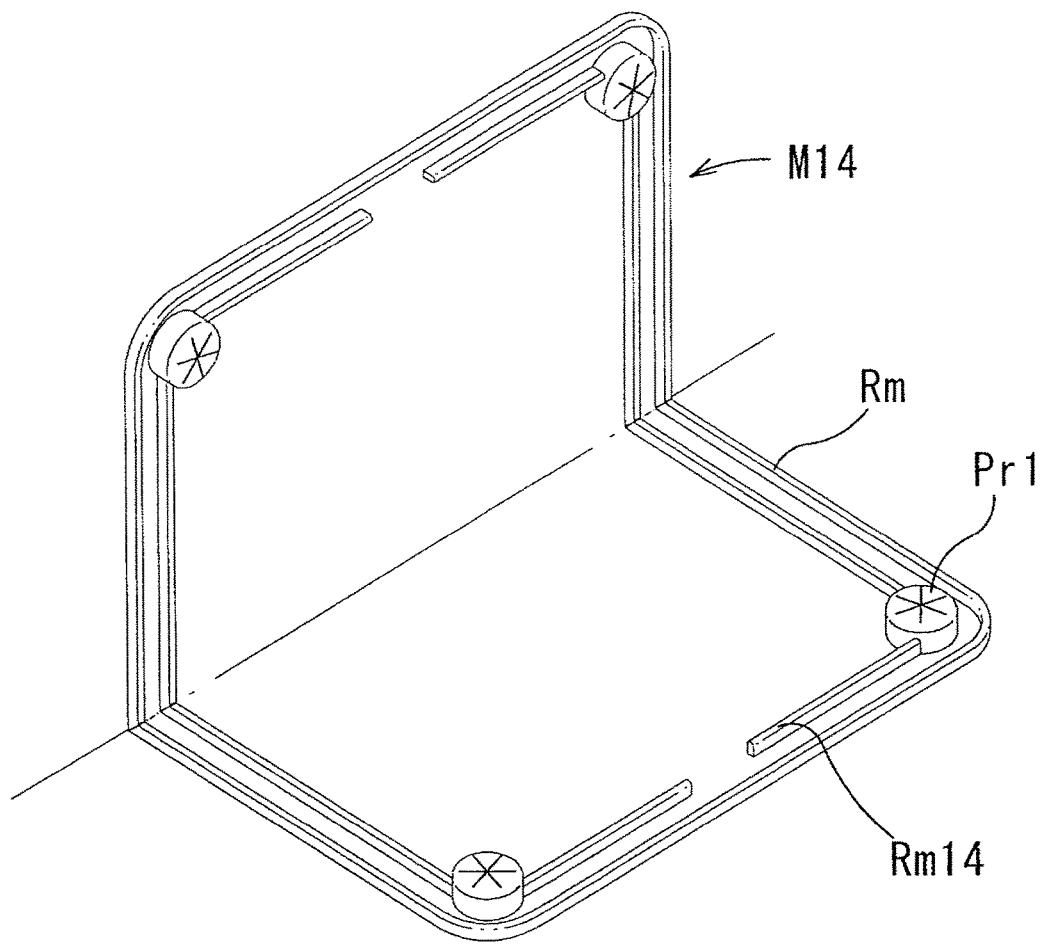
FIG. 57 is a perspective view showing a state in which the mat member in FIG. 56 is bent along a line connecting two notches.

FIG. 56 shows a state of the water absorbent sheet retaining mat M14 sectioned along with a line almost parallel to the long side Llm (FIG. 3) of the mat member Pm1 in the position of the mat frame member Rm14 in FIG. 54. The mat frame member Rm14 is provided with a notch No at a position corresponding to almost the center thereof. The mat member Pm7 can be bent along a line connecting the notches No as shown in FIG. 57 and then the water absorbent sheet retaining mat M14, constructed as described in the above, can sit on even a place alongside a surface standing at a predetermined angle like a wall or a furniture with the bent portion contacting to the surface. Note that the notches No absorb the deformations of the water absorbent sheet retaining mat M14 caused by being bent. It is allowed to construct such that the height H14 of the mat frame member Rm14 is greater than the height of the retaining member Pr1.

Thirteenth Embodiment

Figure 58:
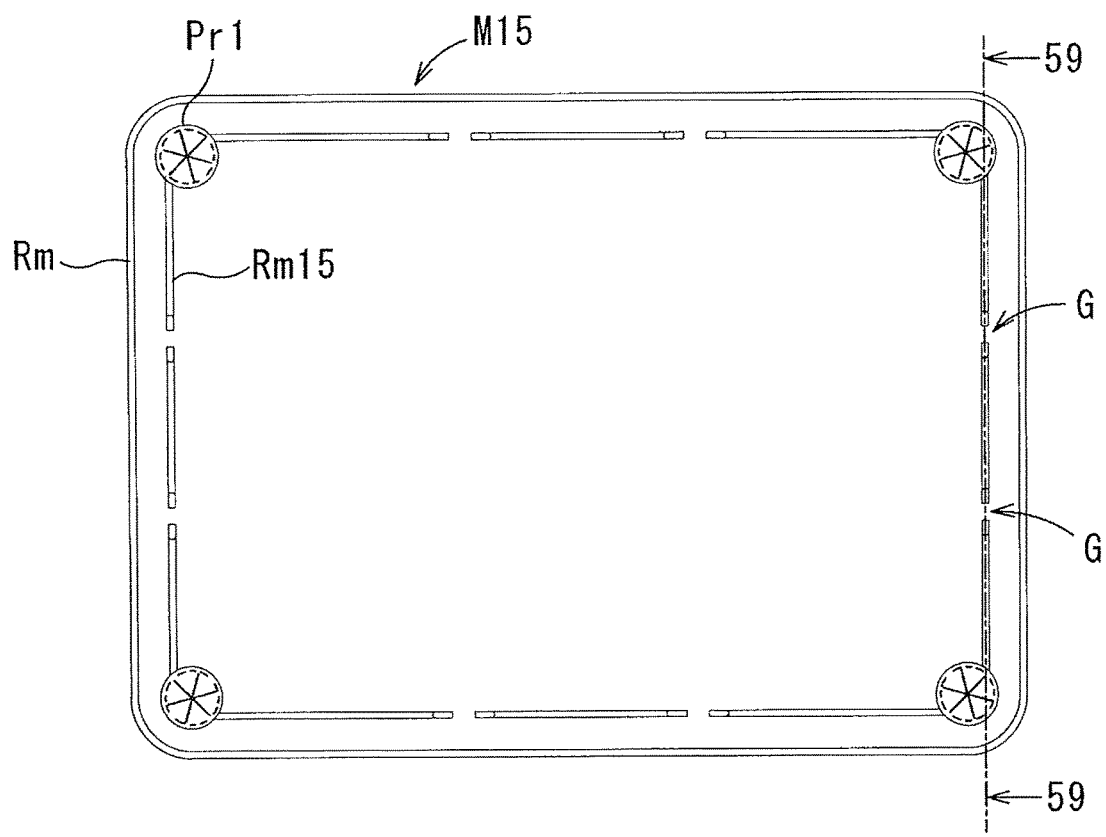
FIG. 58 is a plan view of a water absorbent sheet retaining mat according to a thirteenth embodiment of the present invention.
Figure 59:
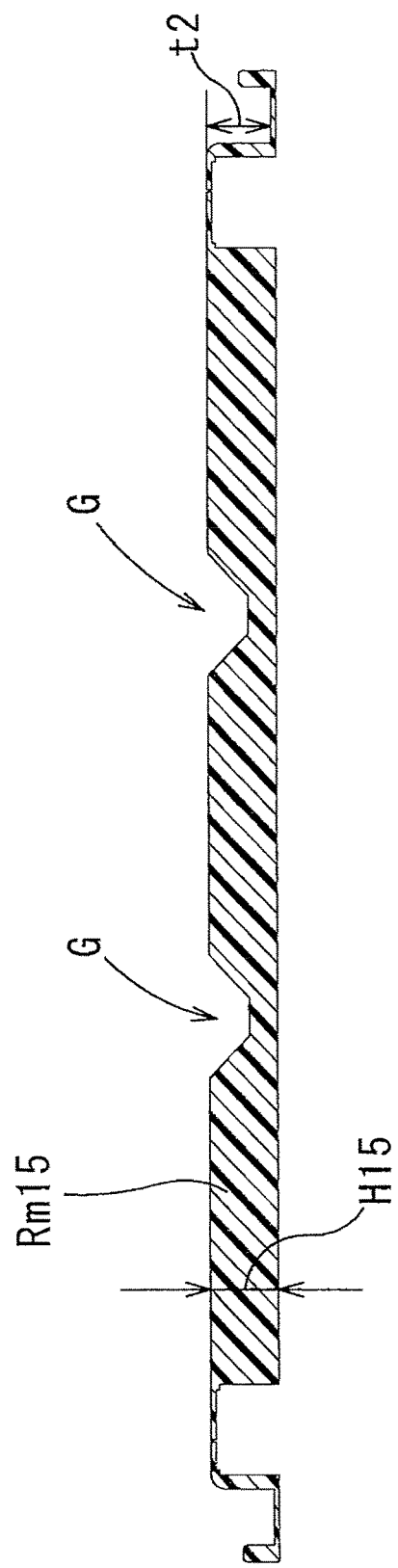
FIG. 59 is a sectional view of the water absorbent sheet retaining mat taken along a line substantially parallel to a short side of a mat member thereof at a position of a frame member in FIG. 58.

With reference to FIG. 58 and FIG. 59, described is a water absorbent sheet retaining mat according to a thirteenth embodiment of the present invention. A water absorbent sheet retaining mat M15 has a construction similar to that of the water absorbent sheet retaining mat M14 except that the mat frame member Rm14 is replaced with a mat frame member Rm15. FIG. 59 shows a state of the water absorbent sheet retaining mat M15 sectioned along with a line almost parallel to the short side Lsm (FIG. 3) of the mat member Pm1 in the position of the mat frame member Rm15 in FIG. 58.

As shown in FIG. 58 and FIG. 59, the mat frame member Rm15 is comprised of a plurality of mat frame members between each a gap G is formed. The end portions of the mat frame members neighbouring the gap G are formed to slope.

In FIG. 59, shown is an example of that a height H15 of the mat frame member Rm15 almost equals to the height t2 of the retaining member Pr1. However, it is allowed to construct such that the height H15 is greater than the height t2 and the top end of the mat frame member neighboring the retaining member Pr1 slopes toward the gap.

Fourteenth Embodiment

Figure 60:
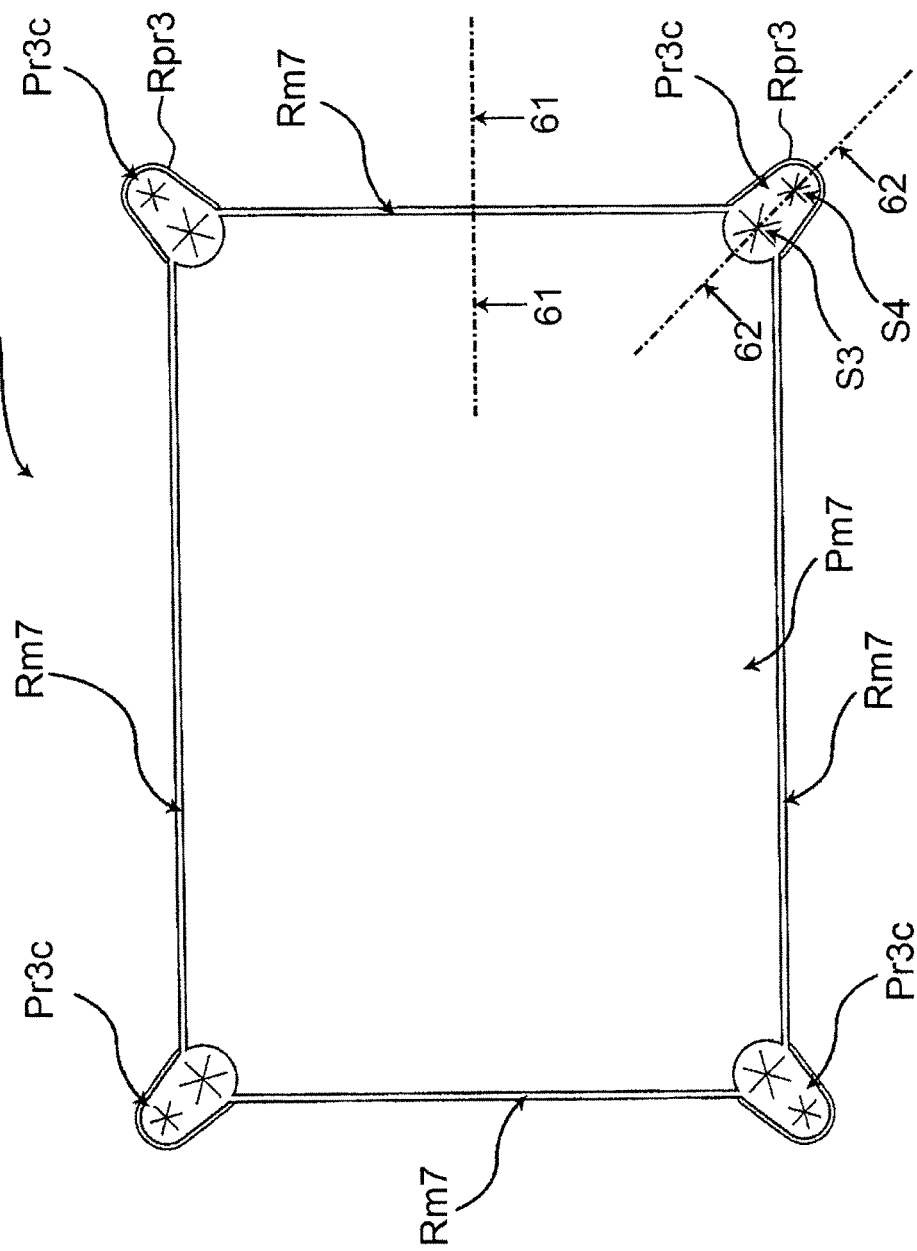
FIG. 60 is a plan view of a water absorbent sheet retaining mat according to a fourteenth embodiment of the present invention.
Figure 61:
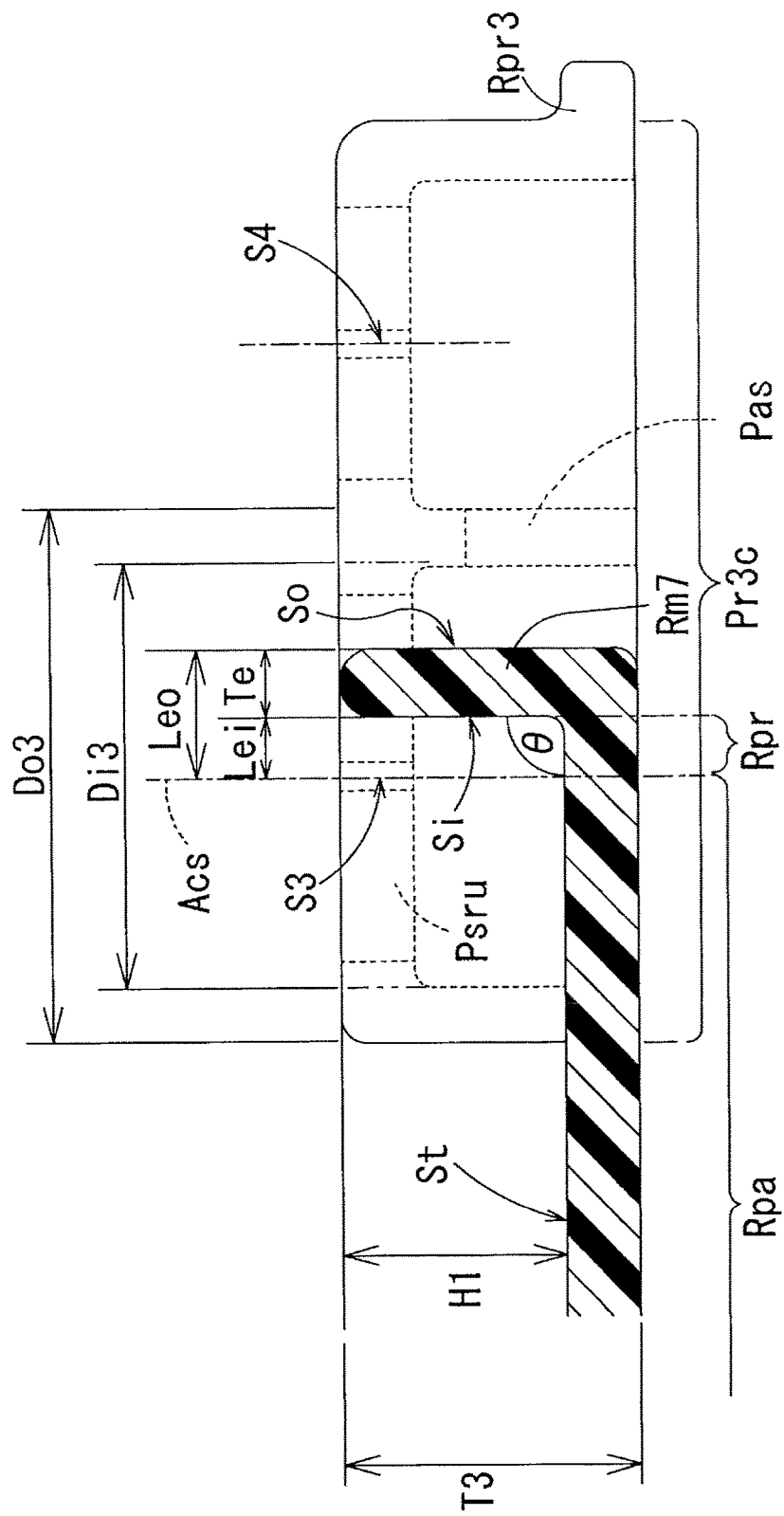
FIG. 61 is a sectional view of the water absorbent sheet retaining mat taken along a center line of a frame member thereof in FIG. 60.
Figure 62:
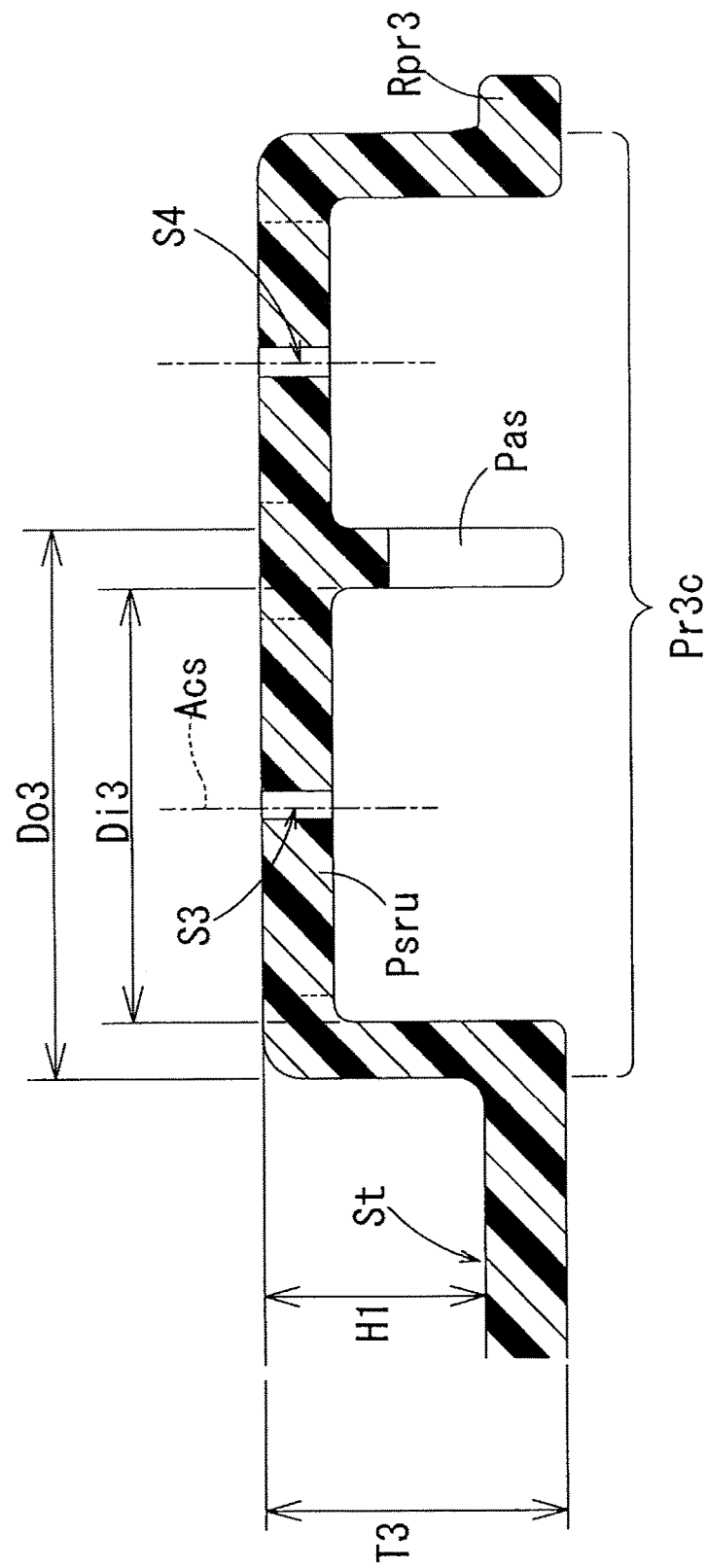
FIG. 62 is a sectional view of the water absorbent sheet retaining mat taken along a center axis of the slit in a retaining member in FIG. 60.

With reference to FIG. 60, FIG. 61, and FIG. 62, described is a water absorbent sheet retaining mat according to a fourteenth embodiment of the present invention. A water absorbent sheet retaining mat M16 is similar to the above described water absorbent sheet retaining mat M7 (FIG. 36) according to the seventh embodiment but the retaining member Pr7 is replaced with a retaining member Pr3c. The retaining member Pr3c is similar to the above described retaining member Pr3 (FIG. 22 to FIG. 25) according to the third embodiment but a frame member Rpr3 is further provided. As described with regard to the third embodiment, a plurality of the slit members S3 and S4 are integrally formed in the retaining member Pr3.

FIG. 61 shows a state of the water absorbent sheet retaining mat M16 sectioned with a focus on the mat frame member Rm7 in FIG. 60. FIG. 62 shows a state of the water absorbent sheet retaining mat M16 sectioned along with the slit center axis Acs of the retaining member Pr3c in FIG. 60. As shown in FIG. 61, among the mat frame member thickness Te, the sheet brim standing region width Lei, the distance between the center axis and the outer peripheral surface Leo, and the inner diameter Di3 and outer diameter Do3 of the slit member S3 of the retaining member Pr3c, there is a relationship expressed by the following equation (6). Among the mat frame member thickness Te, the sheet brim standing region width Lei, and the distance between the center axis and the outer peripheral surface Leo, there is a relationship expressed by the equation (4) already described with regard to the seventh embodiment.

$$0 < Lei < Leo < Di3/2 < Do3/2 \qquad (6)$$

$$Leo - Lei = Te \qquad (4)$$

Figure 63:
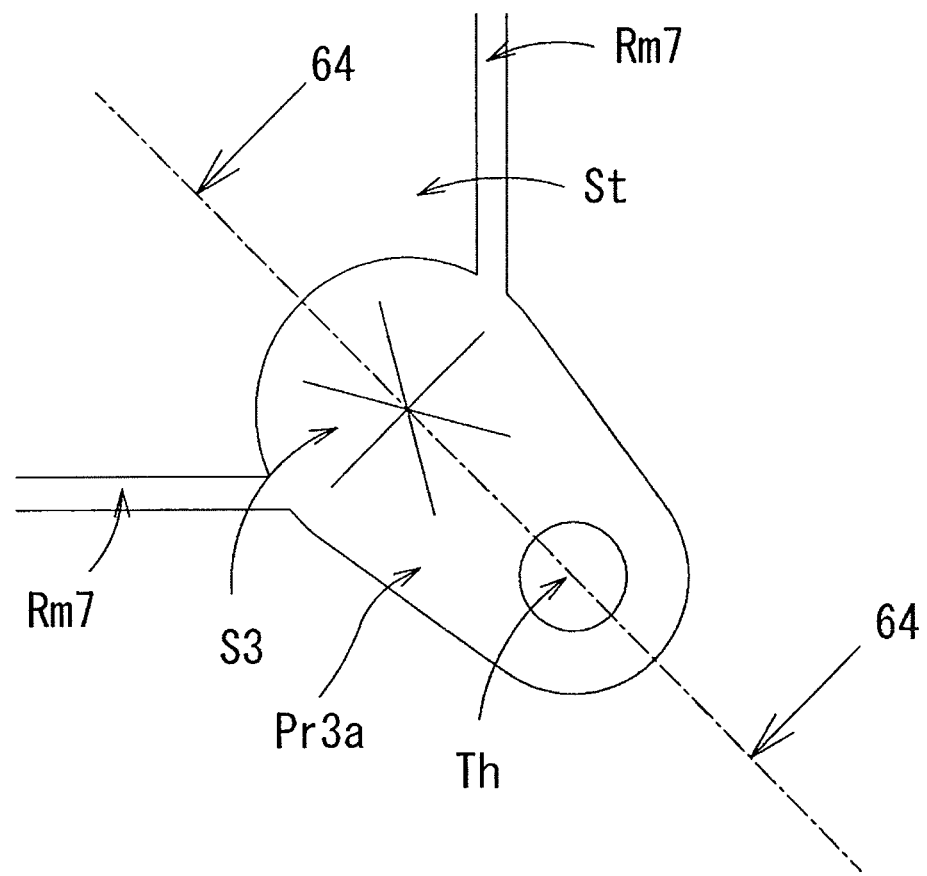
FIG. 63 is a plan view showing an alternative embodiment of the retaining member in FIG. 20.
Figure 64:
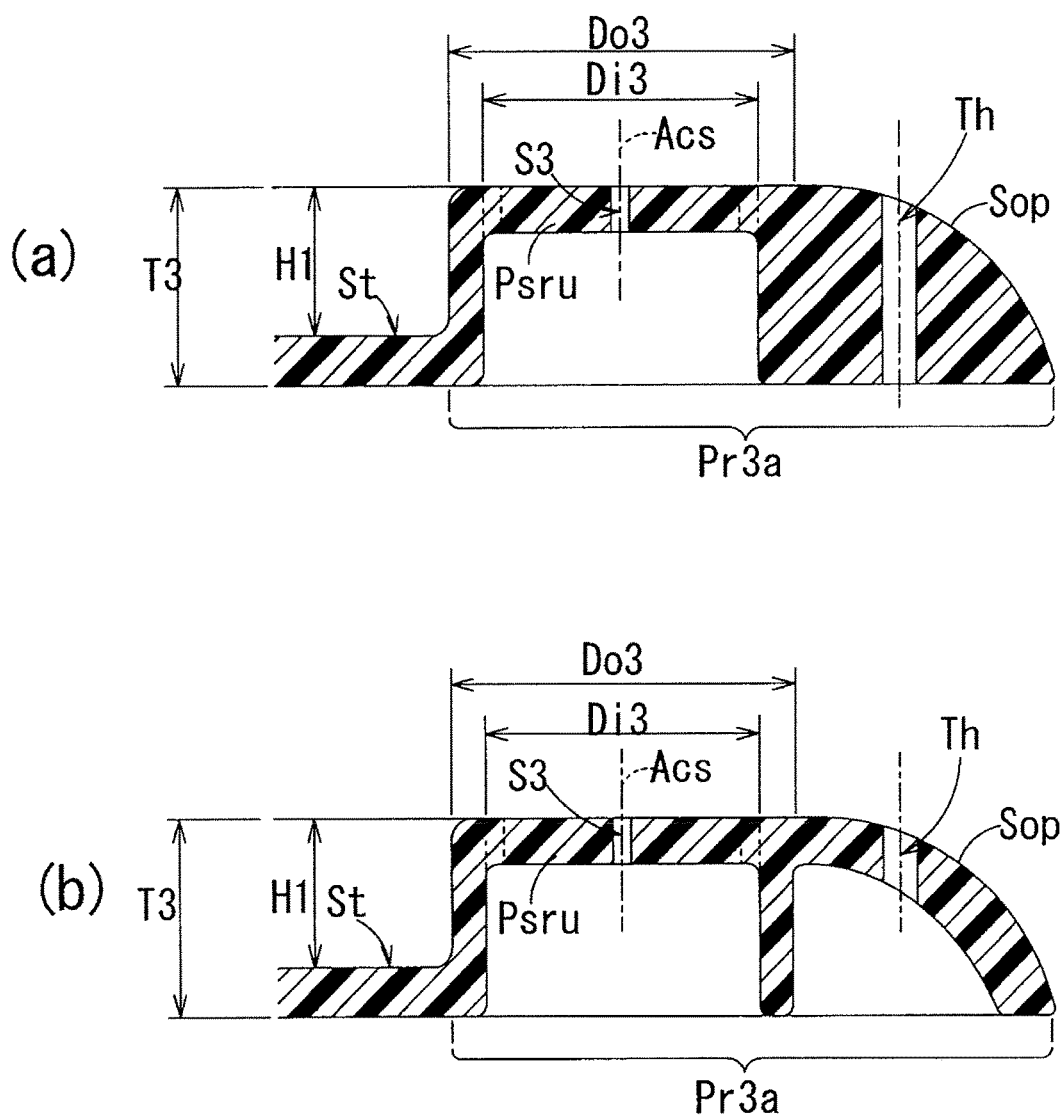
FIG. 64 is a sectional view showing another alternative embodiment of the retaining member taken a line 64-64 in FIG. 63.

With reference to FIG. 63 and FIG. 64, described is an alternative embodiment of the retaining member Pr3. The retaining member Pr3a is similar to the retaining member Pr3 but the slit member S4 is replaced with a through hole Th. As shown in FIG. 64(a), the through hole Th is formed in a direction almost perpendicular to the laying plane St. An outer peripheral surface Sop of the retaining member Pr3a is formed in a convex shape with a curved surface. As shown in FIG. 64(b), it is allowed to provide a space in the bottom of the outer peripheral surface Sop formed in a convex shape with a curved surface.

Figure 65:
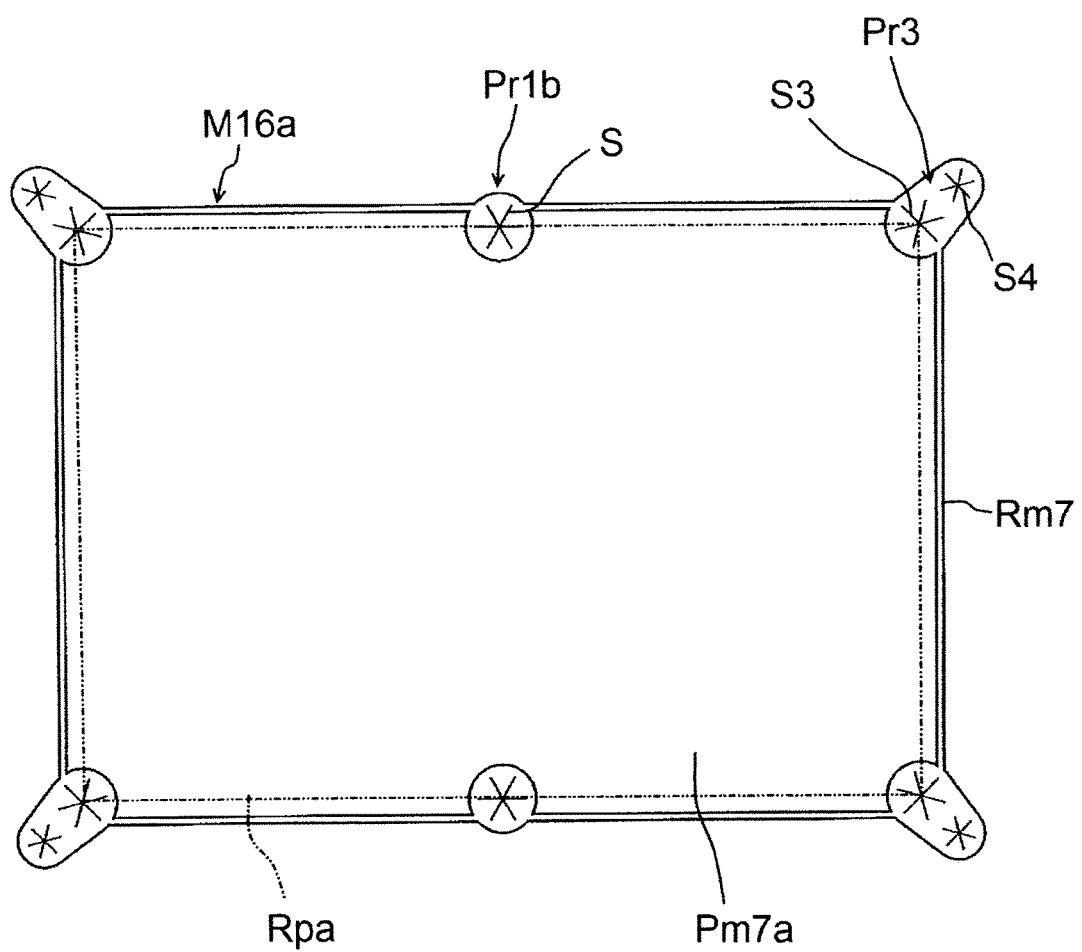
FIG. 65 is a plan view showing a first alternative embodiment of the water absorbent sheet retaining mat shown in FIG. 60.

Next, with reference to FIG. 65, described is a first alternative embodiment of the water absorbent sheet retaining mat M16. A water absorbent sheet retaining mat M16a is used in a state that two pieces of regular sized water absorbent sheets which are arranged side by side overlapping partially are retained on the laying plane St, similarly to the water absorbent sheet retaining mat M1a described with reference to FIG. 11. The water absorbent sheet retaining mat M16a can be used in a state that one piece of wide sized water absorbent sheet is retained on the laying plane St otherwise.

The water absorbent sheet retaining mat M16a has a construction similar to that of the water absorbent sheet retaining mat M16 except that the mat member Pm7 is replaced with a mat member Pm7a as well as a retaining member Pr1b is added. Note that no frame member is formed in the bottom of the retaining member Pr3. Hereafter, the retaining member Pr1b is described mainly.

Two-dot chain lines connecting the center of the slit members S3 and S3 of the neighbouring retaining members Pr3 and Pr3 defines a rectangular area Rpa confined thereby. The retaining members Pr1b are provided such that the centers of the slit members S are located on positions corresponding to almost the center of lines connecting the centers of the slit members S3 and S3 of the neighbouring retaining members Pr3 and Pr3. The retaining member Pr1b is formed such that the top surface thereof is almost the same height as that of the top surface of the mat frame member Rm7.

Figure 66:
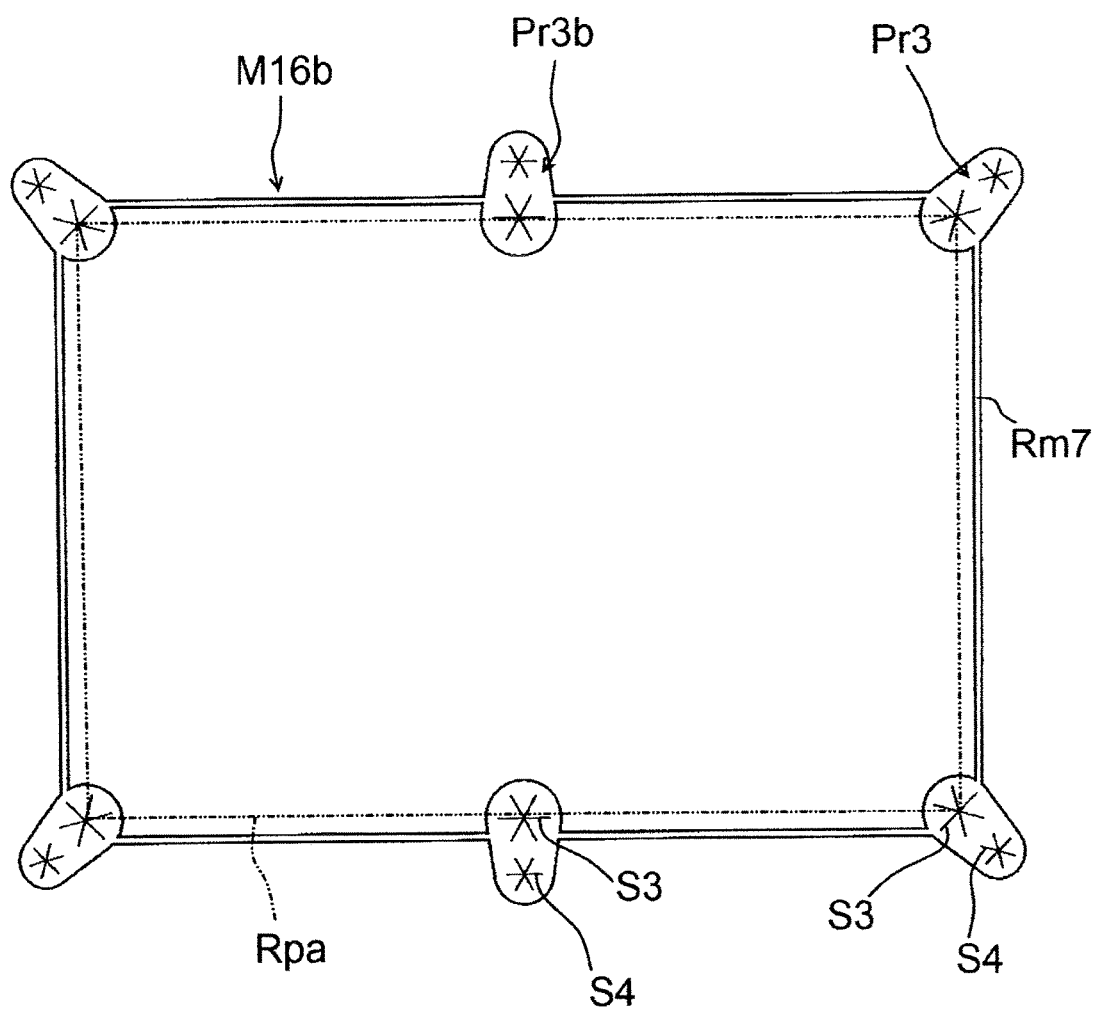
FIG. 66 is a plan view showing a second alternative embodiment of the water absorbent sheet retaining mat in FIG. 60.

Next, with reference to FIG. 66, described is a second alternative embodiment of the water absorbent sheet retaining mat M16. A water absorbent sheet retaining mat M16b has a construction similar to that of the above described water absorbent sheet retaining mat M16a except that the retaining member Pr1b is replaced with a retaining member Pr3b. The retaining member Pr3b is provided such that the center of the slit member S3 is located in a position corresponding about a center of a line connecting each center of the neighbouring retaining members Pr3 and Pr3.

Fifteenth Embodiment

Figure 67:
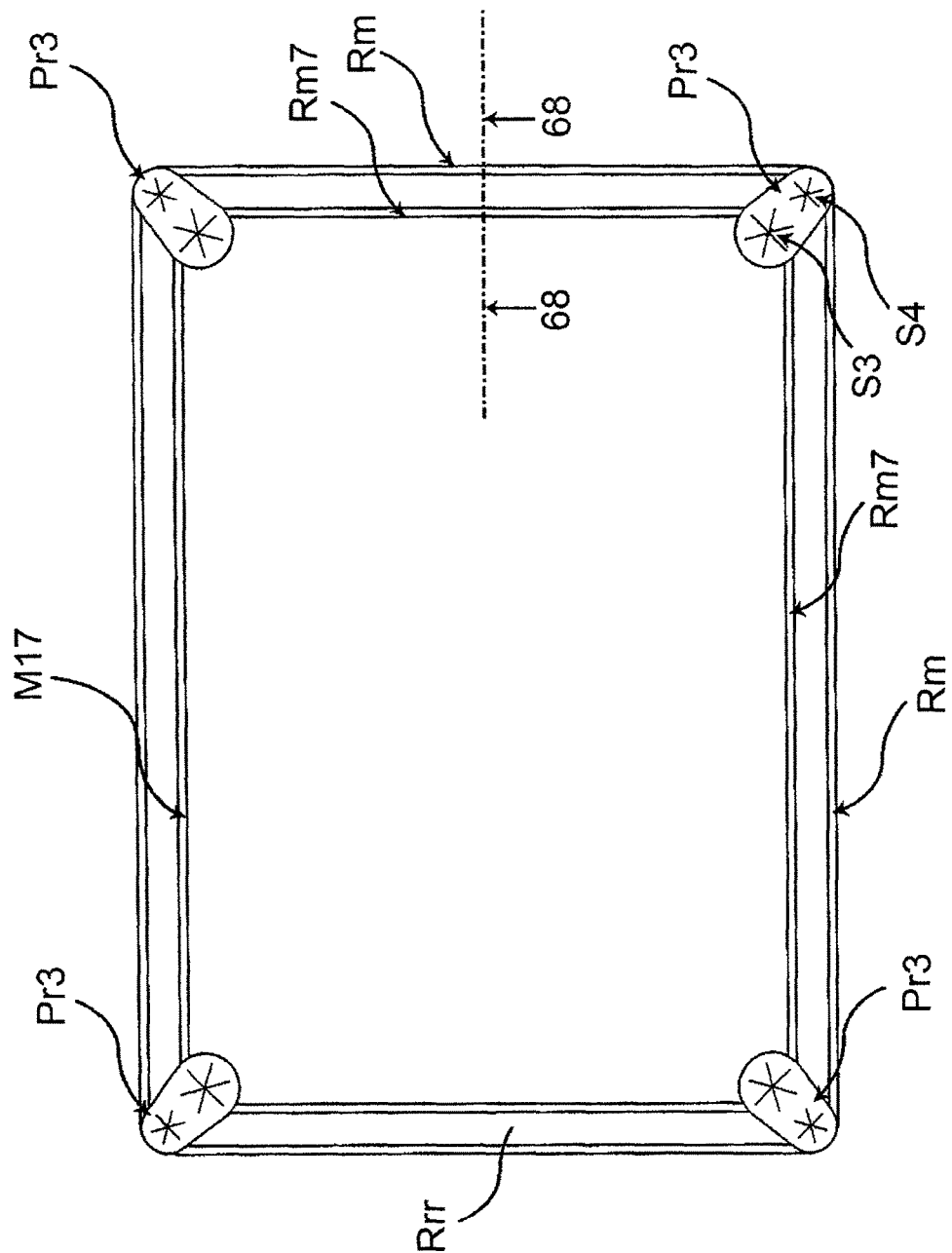
FIG. 67 is a plan view of a water absorbent sheet retaining mat according to a fifteenth embodiment of the present invention.
Figure 68:
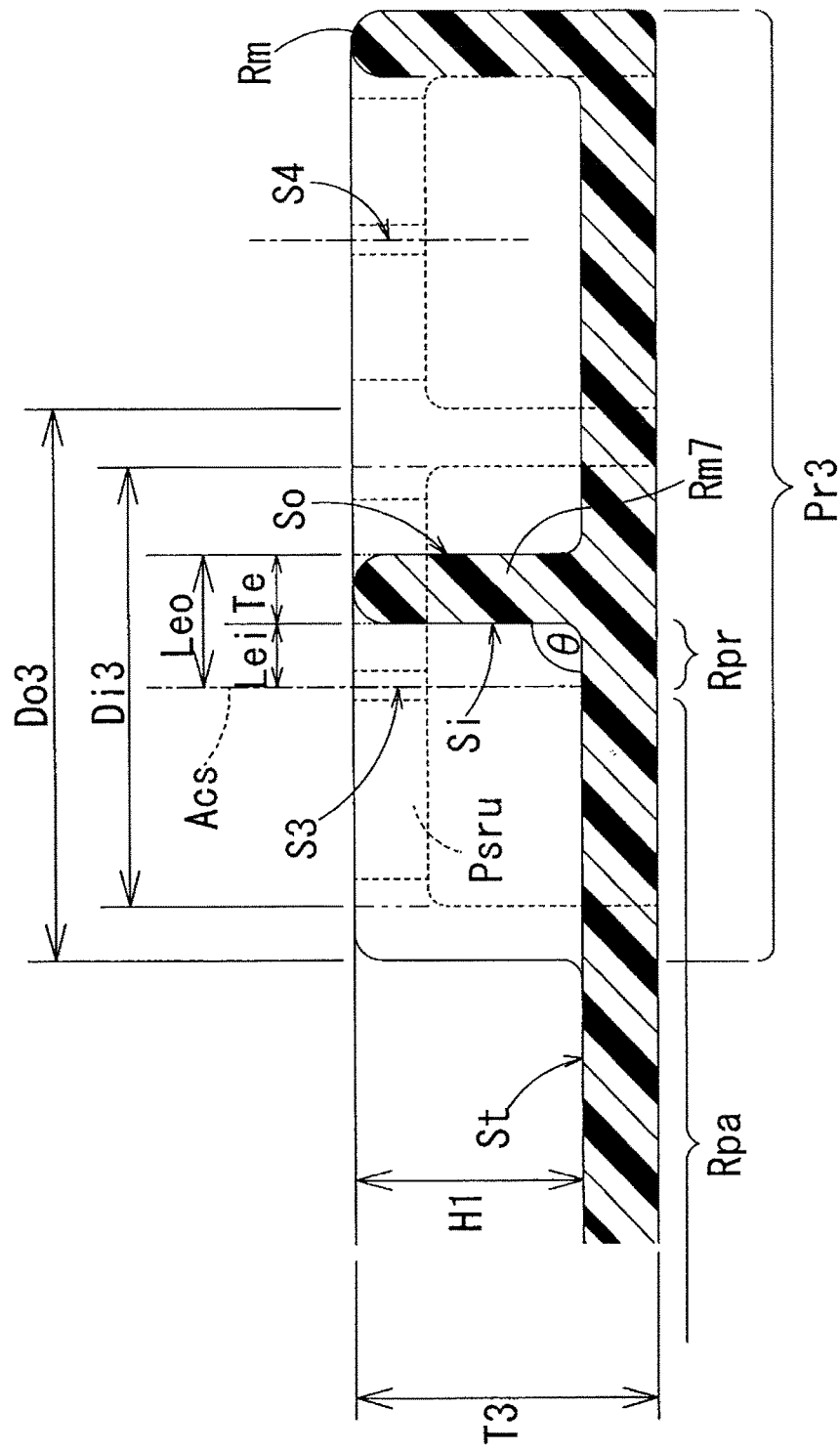
FIG. 68 is a sectional view of the water absorbent sheet retaining mat taken along a center line of a frame member thereof in FIG. 67.

With reference to FIG. 67 and FIG. 68, described is a water absorbent sheet retaining mat according to a fifteenth embodiment of the present invention. A water absorbent sheet retaining mat M17 has a construction similar to that of the above described water absorbent sheet retaining mat M11 (FIG. 46) according to the tenth embodiment except that the retaining member Pr1 is replaced with the above described retaining member Pr3 according to the third embodiment. FIG. 68 shows a state of the water absorbent sheet retaining mat M17 sectioned with a focus on the mat frame member Rm and the mat frame member Rm7 in FIG. 67.

It is allowed that that the retaining member Pr3 is replaced with the above described retaining member Pr3a (FIG. 63, FIG. 64) in the water absorbent sheet retaining mat M17.

Figure 69:
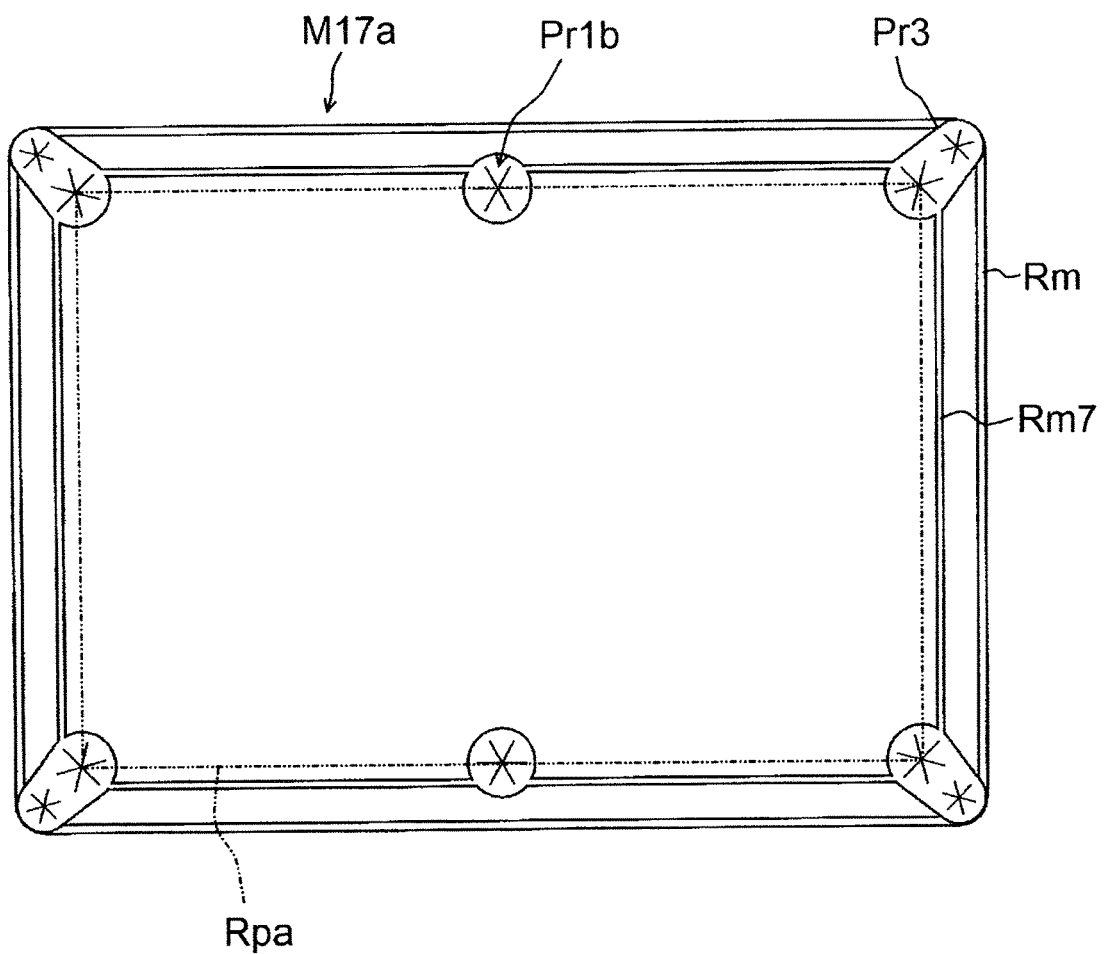
FIG. 69 is a plan view showing a first alternative embodiment of the water absorbent sheet retaining mat in FIG. 67.

Next, with reference to FIG. 69, described is a first alternative embodiment of the water absorbent sheet retaining mat M17. A water absorbent sheet retaining mat M17a is constructed by adding the retaining member Pr1b described with reference to FIG. 65 to the water absorbent sheet retaining mat M17.

Figure 70:
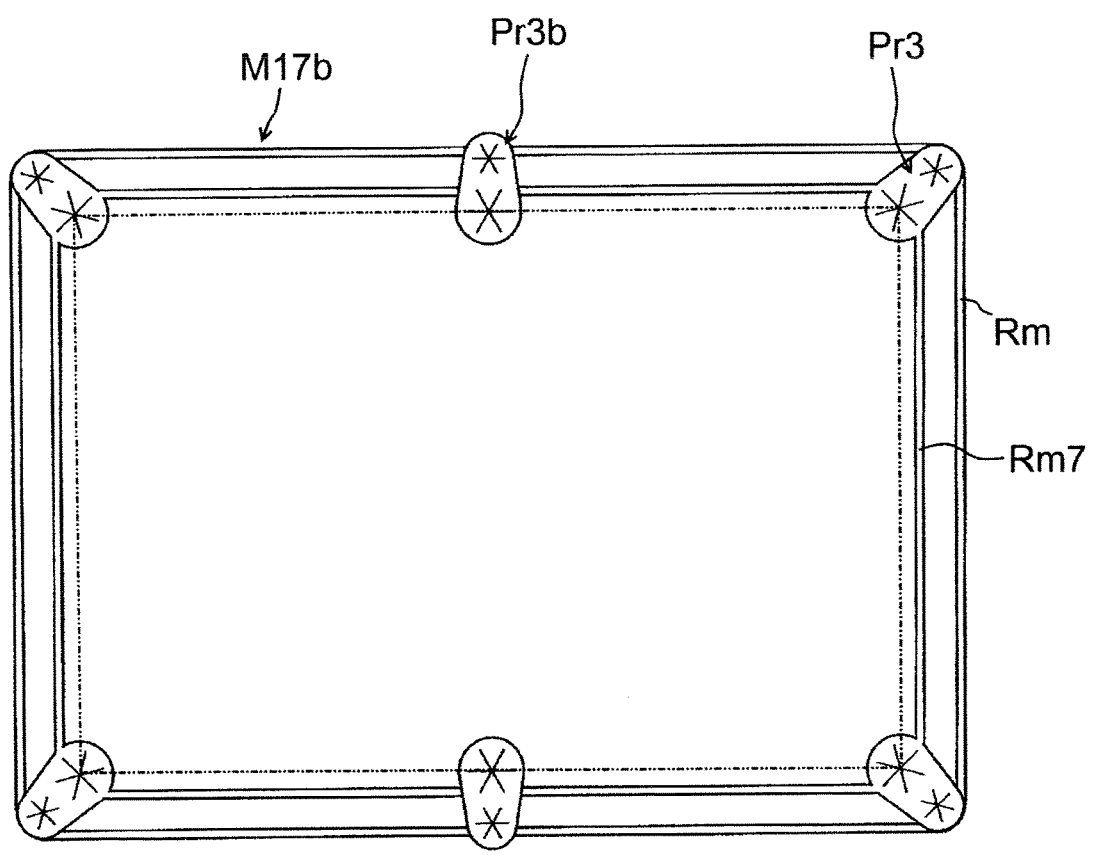
FIG. 70 is a plan view showing a second alternative embodiment of the water absorbent sheet retaining mat in FIG. 67.

Next, with reference to FIG. 70, described is a second alternative embodiment of the water absorbent sheet retaining mat M17. A water absorbent sheet retaining mat M17b has a construction similar to that of the water absorbent sheet retaining mat M17a but the retaining member Pr1b is replaced by the retaining member Pr3b described with reference to FIG. 66. The retaining member Pr3b is formed extending over the mat frame member Rm7 and the mat frame member Rm.

Sixteenth Embodiment

Figure 71:
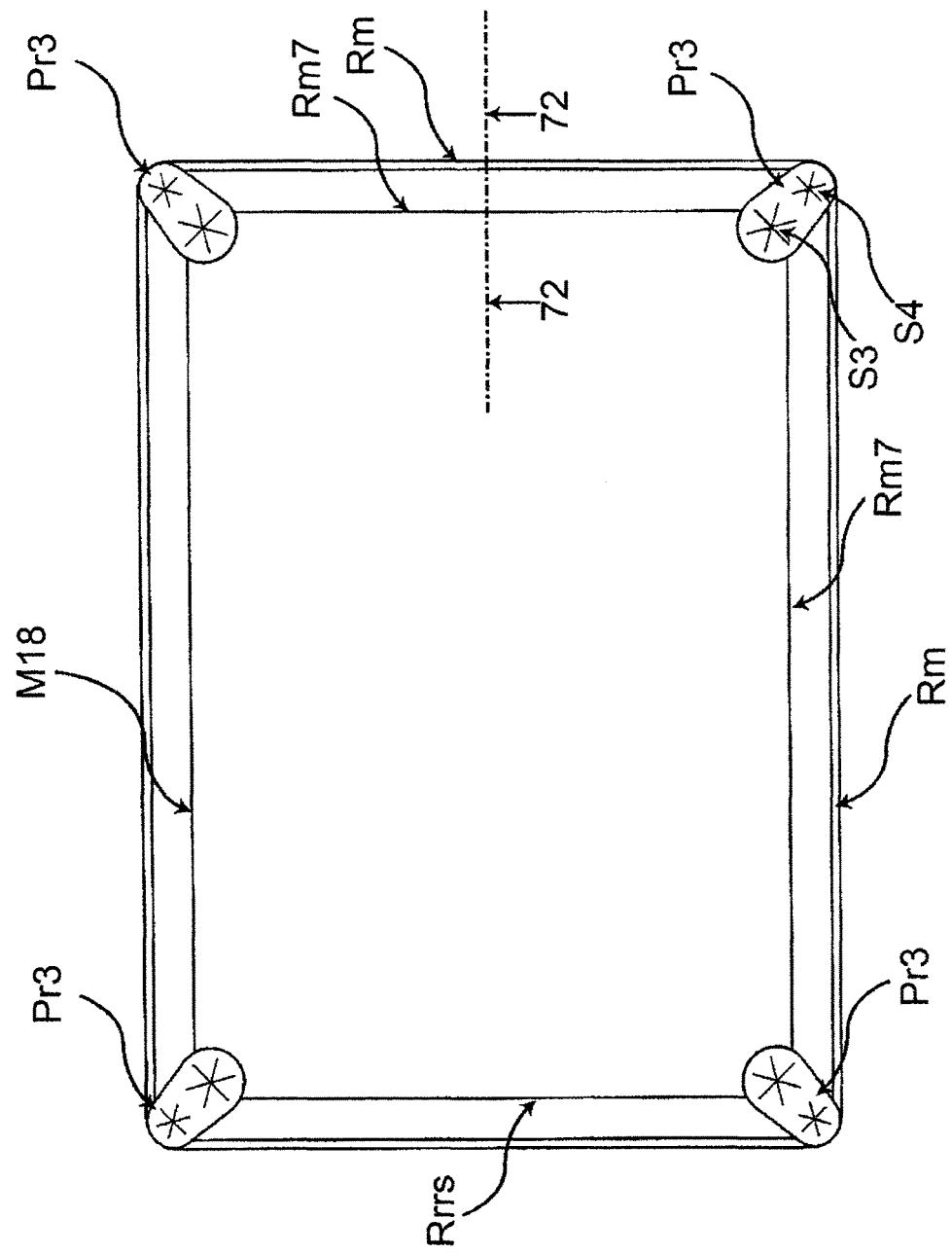
FIG. 71 is a plan view of a water absorbent sheet retaining mat according to a sixteenth embodiment of the present invention.
Figure 72:
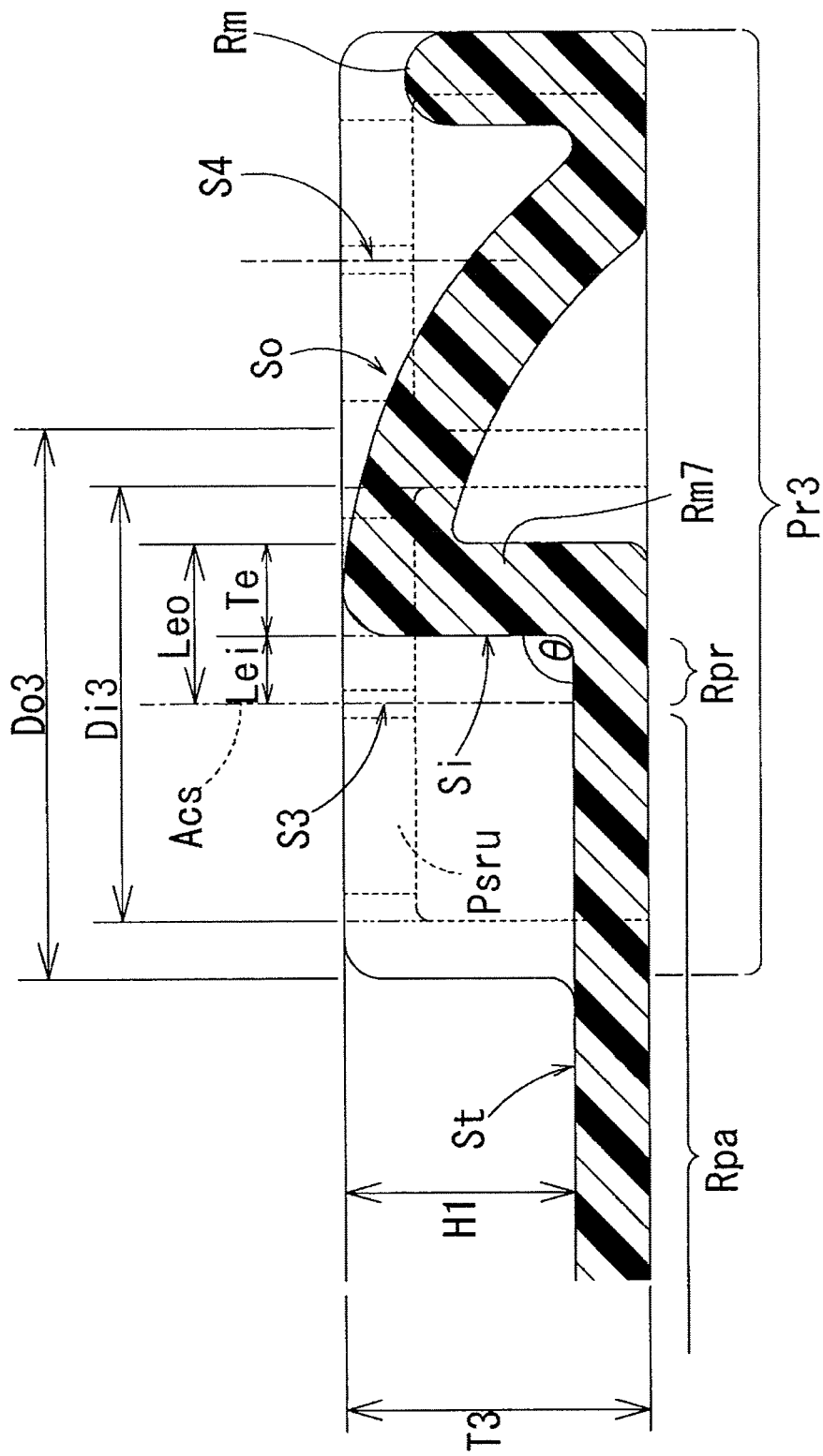
FIG. 72 is a sectional view of the water absorbent sheet retaining mat taken along a center line of a frame member thereof in FIG. 71.

With reference to FIG. 71 and FIG. 72, described is a water absorbent sheet retaining mat according to a sixteenth embodiment of the present invention. A water absorbent sheet retaining mat M18 has a construction similar to that of the above described water absorbent sheet retaining mat M13 (FIG. 50) according to the eleventh embodiment of the present invention except that the retaining member Pr1 is replaced with the above described the retaining member Pr3 according to the third embodiment. FIG. 72 shows a state of the water absorbent sheet retaining mat M18 sectioned with a focus on the mat frame member Rm and the mat frame member Rm7.

Seventeenth Embodiment

Figure 73:
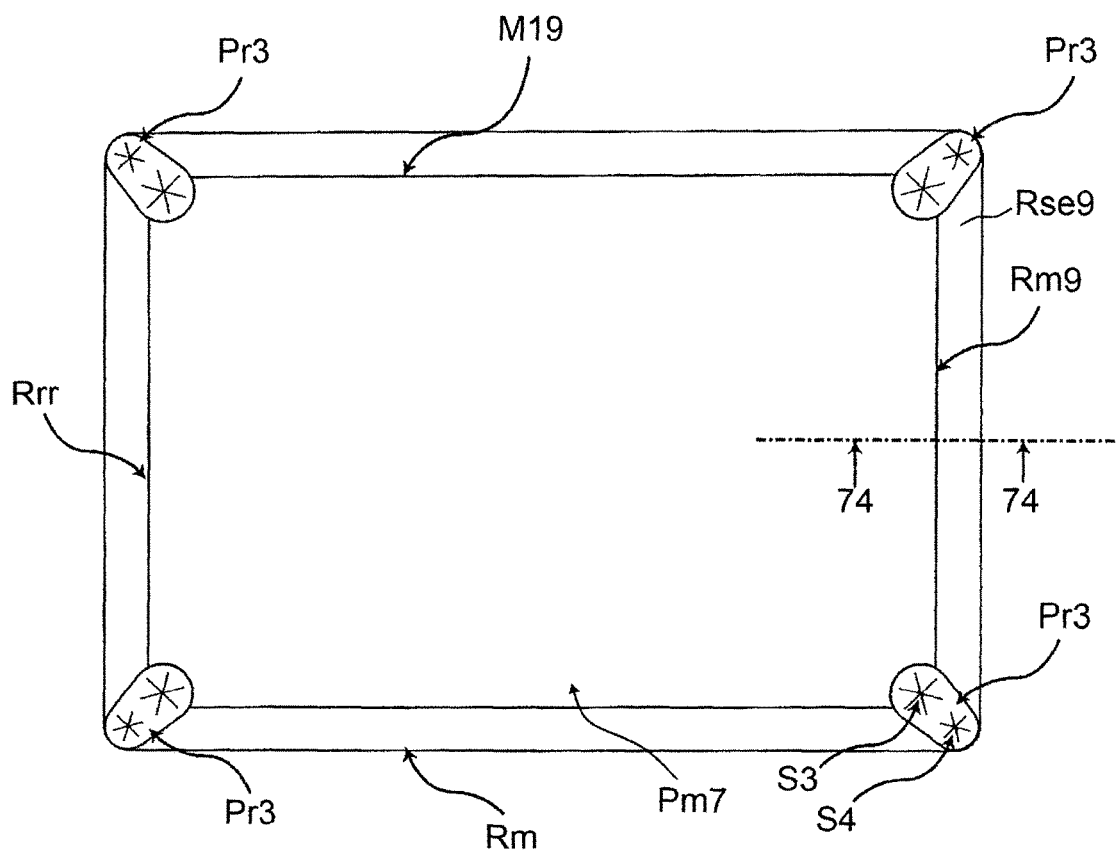
FIG. 73 is a plan view of a water absorbent sheet retaining mat according to a seventeenth embodiment of present invention.
Figure 74:
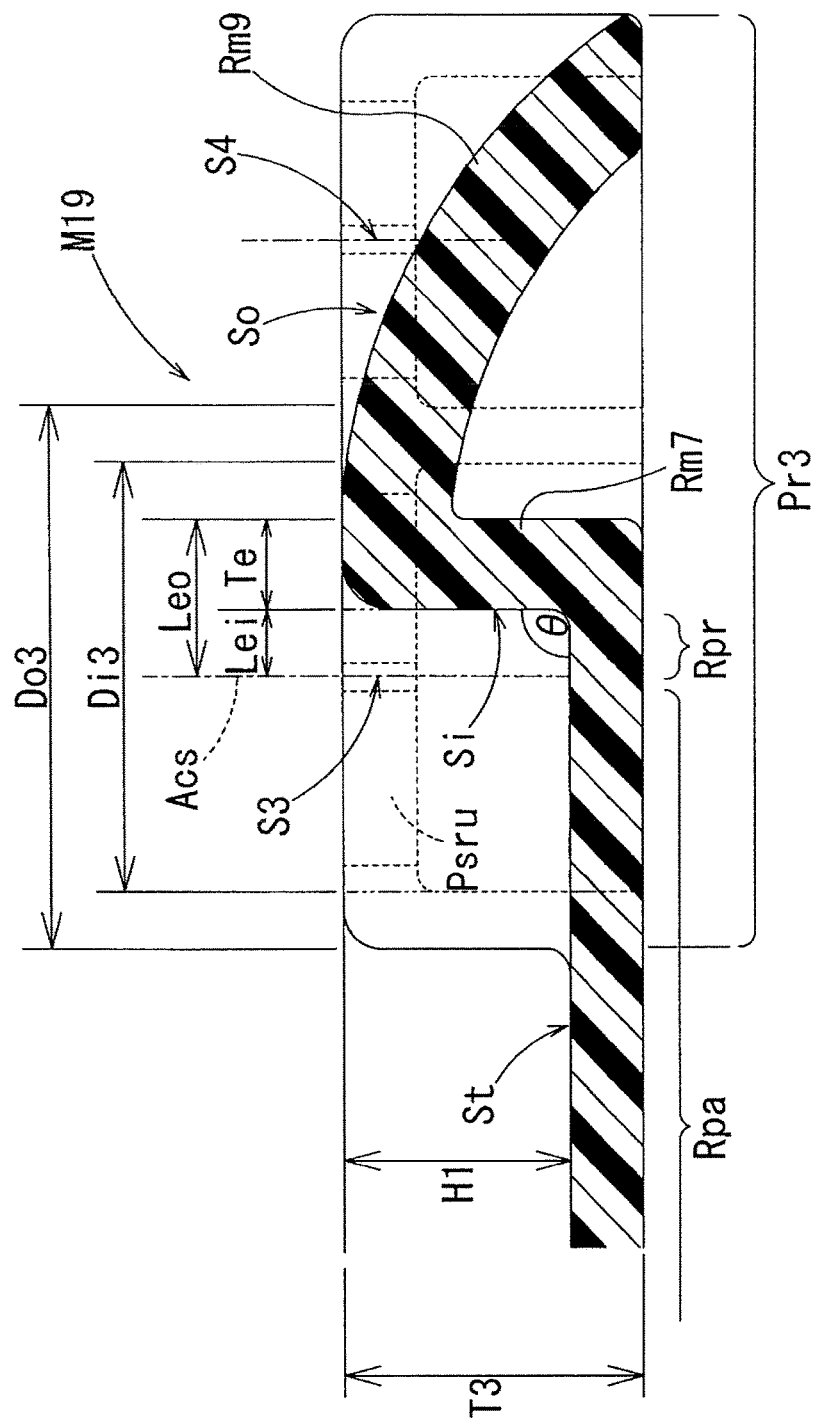
FIG. 74 is a sectional view of the water absorbent sheet retaining mat taken along a center line of a frame member thereof in FIG. 73.

With reference to FIG. 73 and FIG. 74, described is a water absorbent sheet retaining mat according to a seventeenth embodiment of the present invention. A water absorbent sheet retaining mat M19 has a construction similar to that of the above described water absorbent sheet retaining mat M9 (FIG. 41) according to the eighth embodiment except that the retaining member Pr9 is replaced with the above described retaining member Pr3 according to the third embodiment. FIG. 74 shows a state of the water absorbent sheet retaining mat M19 sectioned with a focus on the mat frame member Rm9 in FIG. 73.

It is allowed that the retaining member Pr3 is replaced with the retaining member Pr3a described with reference to FIG. 63.

Figure 75:
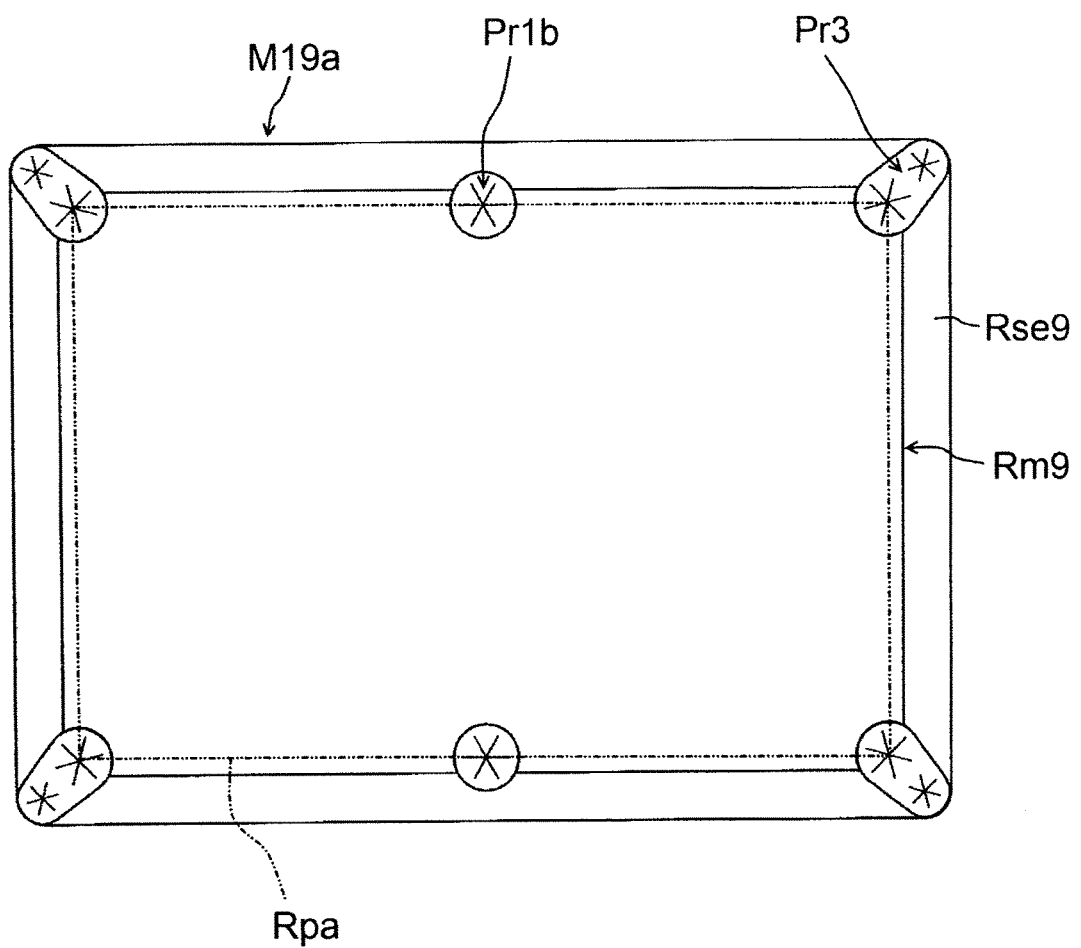
FIG. 75 is a plan view showing a first alternative embodiment of the water absorbent sheet retaining mat in FIG. 73.

Next, with reference to FIG. 75, described is a first alternative embodiment of the water absorbent sheet retaining mat M19. A water absorbent sheet retaining mat M19a is constructed by adding the retaining member Pr1b described with reference to FIG. 65 to the water absorbent sheet retaining mat M19.

Figure 76:
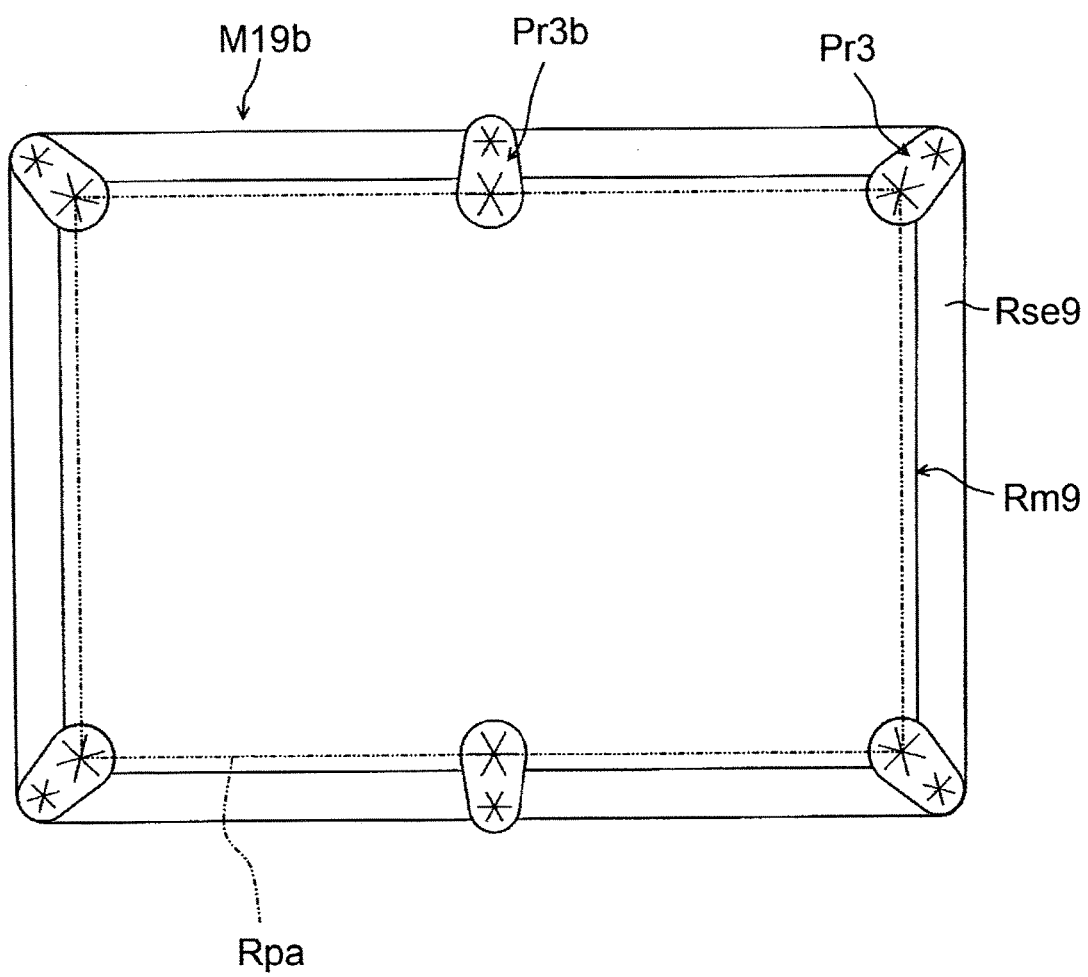
FIG. 76 is a plan view showing a second alternative embodiment of the water absorbent sheet retaining mat in FIG. 73.

Next, with reference to FIG. 76, described is a second alternative embodiment of the water absorbent sheet retaining mat M19. A water absorbent sheet retaining mat M19b is constructed by replacing the retaining member Pr1b with the retaining member Pr3b described with reference to FIG. 66 in the water absorbent sheet retaining mat M19a.

INDUSTRIAL APPLICABILITY

The present invention is applicable to a water absorbent sheet retaining mat which can retain a water absorbent sheet stably.

REFERENCE SIGNS LIST

M, M1, M1a, M1b, M1c, M2, M2a, M3, M3a, M3b, M3c, M4, M5, M6, M7, M9, M10, M11, M13, M14, M15, M16, M16a, M16b, M17, M17a, M17b, M18, M19, M19a, M19b water absorbent sheet retaining mat
Pm, Pm1, Pm1a, Pm2, Pm2a, Pm3, Pm4, Pm7 mat member
St laying plane
Sb sitting plane (main plane)
Rm, Rm7, Rm7a, Rm7b, Rm7c, Rm9, Rm9a, Rm10, Rm10a, Rm12, Rm14, Rm15 mat frame member
Pr, Pr1, Pr1a, Pr1b, Pr2, Pr2a, Pr3, Pr3a, Pr3b, Pr3c, Pr7, Pr8, Pr9, Pr10, Pr10a retaining member
Sru, Sru1, Sru2, Sru3, Sru4 top surface
S cut
S, S1, S2, S3, S4, Sd slit member
SL1, SL2, SL3 slit
Pes, Pes1, Pes2, Pes3, Pes4 end portion of slit
Psru, Psru1, Psru2, Psrud claw
Wr, Wr1, Wr2, Wr3, Wr4 peripheral wall
Sc, Sc1, Sc2, Sc3, Sc4 step
Sr rim
Pas path
Wb1, Wb2 wall
Wrc shared portion
C cap
Sa, Sa1, Sa1a, Sa1b water absorbent sheet
Spa water absorption area
Spr sheet brim member
Spc corner portion
L predetermined distance
Lpr sheet brim width
Lss "short side" of water absorbent sheet
Lls "long side" of water absorbent sheet
Lssa "short side" of water absorption area
Llsa "long side" of water absorption area
Lsm "short side" of mat member
Llm "long side" of mat member
Lar connection line
Dar separation distance
Lo diagonal line
Acs slit center axis
Rpa water absorption region
Rpr sheet brim standing region
Pe7, Pe9, Pe10, Rpe10 outer perimeter
We7 "width" of outer perimeter
Ripe10 first outer peripheral member
Rope10 second outer peripheral member
O opening
Te mat peripheral member thickness
Lei sheet brim standing region width
Leo distance between the center axis and the outer peripheral surface
So, Sop outer peripheral surface
Si inner peripheral surface
Rse9, Rse10 outer peripheral surface
Th through hole
H1, H7 mat frame height
Rrr, Rrrs inter-perimeter region
No notch
Di, Di1, Di2 "inner diameter" of retaining member
Do, Do1, Do2 "outer diameter" of retaining member

The invention claimed is:

1. A water absorbent sheet retaining mat for retaining a water absorbent sheet having a first polygonal contour, comprising:

a mat member having a second polygonal contour defined by mutually opposing a first main plane and a second main plane, the mat member being of silicon rubber and having a solid planar shape;

at least one retaining member having a slit member comprised of at least one slit formed in a top surface at a first predetermined height from the first main plane for accepting a part of perimeter of the water absorbent sheet being inserted therein, and a mat frame member provided around the mat member and vertically extending from an edge of the first main plane to a predetermined mat frame member height, wherein the water absorbent sheet is laid on the first main plane, wherein at least two slit members are located adjacent to each other on the diagonal line of the second polygonal contour in the top surface, and wherein a path communicating the adjacent slit members is formed in the second main plane.

2. The water absorbent sheet retaining mat according to claim 1, the slit member being formed at a position extending over from the first predetermined height to a second predetermined height lower than the first predetermined height.

3. The water absorbent sheet retaining mat according to claim 2, the slit member being formed so as to curve outwards in the middle along a direction apart from the first main plane.

4. The water absorbent sheet retaining mat according to claim 1, wherein the first polygonal contour is smaller than the second polygonal contour, and the retaining member is provided on the mat member.

5. The water absorbent sheet retaining mat according to claim 1, wherein the first polygonal contour is greater than the second polygonal contour, and the retaining member is provided adjacent to the mat member.

6. The water absorbent sheet retaining mat according to claim 5, wherein the mat frame member integrally connects the adjacent retaining members.

7. The water absorbent sheet retaining mat according to claim 6, the water absorbent sheet including:

a water absorption member having a third polygonal contour smaller than the first polygonal contour; and a sheet brim member having the first polygonal contour extending around the water absorption member with a predetermined width, wherein a distance between a line connecting the centers of slit members of the adjacent retaining members and an inner surface of the mat frame member is smaller than the predetermined width.

8. The water absorbent sheet retaining mat according to claim 1, wherein at least two of the retaining members are located adjacent to each other on a diagonal line of the second polygonal contour.

9. The water absorbent sheet retaining mat according to claim 8, wherein a path communicating the adjacent retaining members is formed in the second main plane.

10. The water absorbent sheet retaining mat according to claim 8, the water absorbent sheet including:

a water absorption member having a third polygonal contour smaller than the first polygonal contour; and a sheet brim member having the first polygonal contour and surrounding the water absorption member, wherein a distance between the centers of the adjacent retaining members is smaller than a distance between the third polygonal contour and the first polygonal contour.

11. A water absorbent sheet retaining mat for retaining a water absorbent sheet having a first polygonal contour, comprising:

a mat member having a second polygonal contour defined by mutually opposing a first main plane and a second main plane, the mat member being of silicon rubber and having a solid planar shape;

at least one retaining member having a slit member comprised of at least one slit formed in a top surface at a first predetermined height from the first main plane for accepting a part of perimeter of the water absorbent sheet being inserted therein, and a mat frame member provided around the mat member and vertically extending from an edge of the first main plane to a predetermined mat frame member height, wherein the water absorbent sheet is laid on the first main plane, wherein at least two slit members are located adjacent to each other on the diagonal line of the second polygonal contour in the top surface, and the water absorbent sheet including:

a water absorption member having a third polygonal contour smaller than the first polygonal contour; and a sheet brim member having the first polygonal contour and surrounding the water absorption member, wherein a distance between the centers of the adjacent slit members is smaller than a distance between the third polygonal contour and the first polygonal contour.

* * * * *